(12) United States Patent
Tagami

(10) Patent No.: US 11,100,947 B1
(45) Date of Patent: Aug. 24, 2021

(54) MAGNETIC DISK DEVICE AND SERVO GATE GENERATION METHOD

(71) Applicants: Kabushiki Kaisha Toshiba, Tokyo (JP); Toshiba Electronic Devices & Storage Corporation, Tokyo (JP)

(72) Inventor: Naoki Tagami, Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 0 days.

(21) Appl. No.: 17/009,913

(22) Filed: Sep. 2, 2020

(30) Foreign Application Priority Data

Feb. 20, 2020 (JP) .............................. JP2020-027269

(51) Int. Cl.
*G11B 5/596* (2006.01)
(52) U.S. Cl.
CPC ...... *G11B 5/59655* (2013.01); *G11B 5/59638* (2013.01); *G11B 5/59672* (2013.01); *G11B 5/59683* (2013.01)
(58) Field of Classification Search
CPC .................................................... G11B 20/10
See application file for complete search history.

(56) References Cited

U.S. PATENT DOCUMENTS

| | | | |
|---|---|---|---|
| 7,046,465 B1 * | 5/2006 | Kupferman | G11B 5/59688 360/48 |
| 8,462,454 B1 * | 6/2013 | Katchmart | G11B 5/59688 360/48 |
| 8,477,444 B1 * | 7/2013 | Zou | G11B 5/746 360/51 |
| 8,711,507 B1 | 4/2014 | Katchmart | |
| 9,025,269 B1 | 5/2015 | Wong et al. | |
| 10,748,569 B1 | 8/2020 | Ogawa et al. | |
| 2020/0286517 A1 * | 9/2020 | Tagami | G11B 5/012 |

FOREIGN PATENT DOCUMENTS

| | | |
|---|---|---|
| JP | 2015-38788 A | 2/2015 |
| JP | 2020-144965 A | 9/2020 |
| JP | 2020-155172 A | 9/2020 |

* cited by examiner

*Primary Examiner* — K. Wong
(74) *Attorney, Agent, or Firm* — White & Case LLP

(57) ABSTRACT

According to one embodiment, a magnetic disk device includes a disk including a servo sector including burst data, a head including a write head which writes data to the disk, and a read head which reads data from the disk, and a controller which generates a first normal servo gate for applying servo read to the servo sector, wherein when a short servo gate for at least applying servo read to the burst data is generated, the controller generates the short servo gate and the first normal servo gate, and when the short servo gate is not generated, the controller generates the first normal servo gate and a second normal servo gate different from the first normal servo gate.

20 Claims, 26 Drawing Sheets

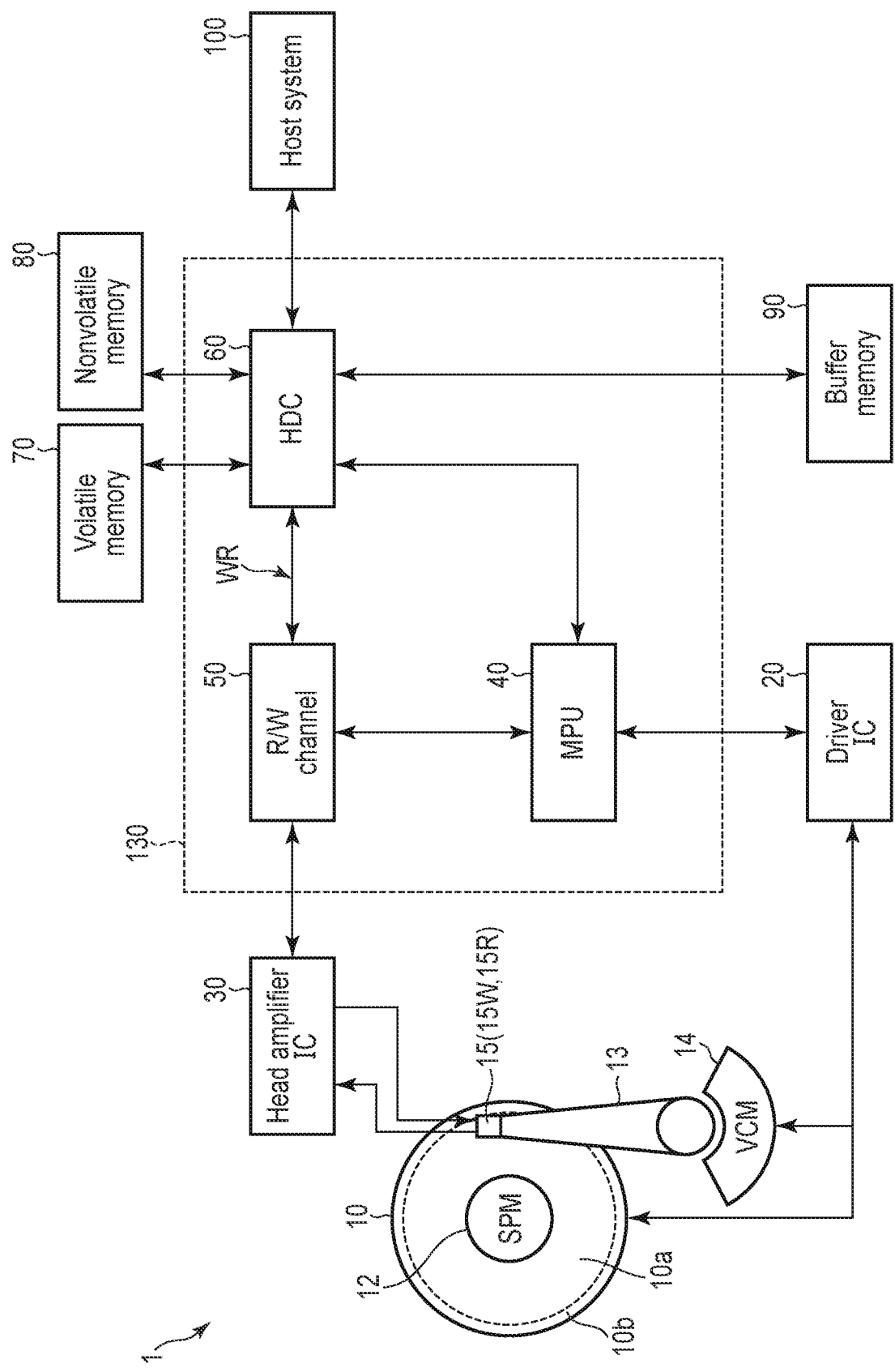
F I G. 1

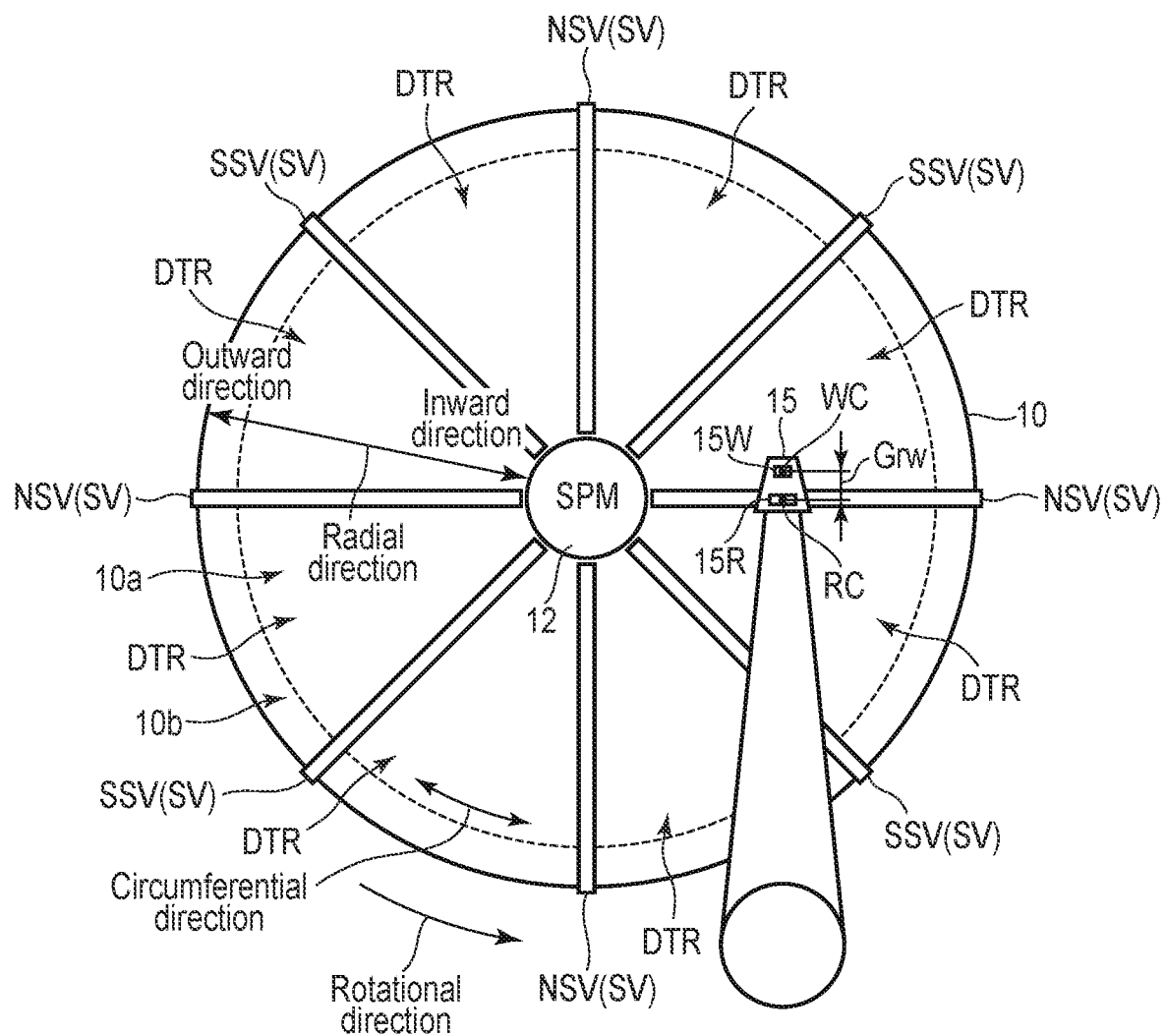
F I G. 2

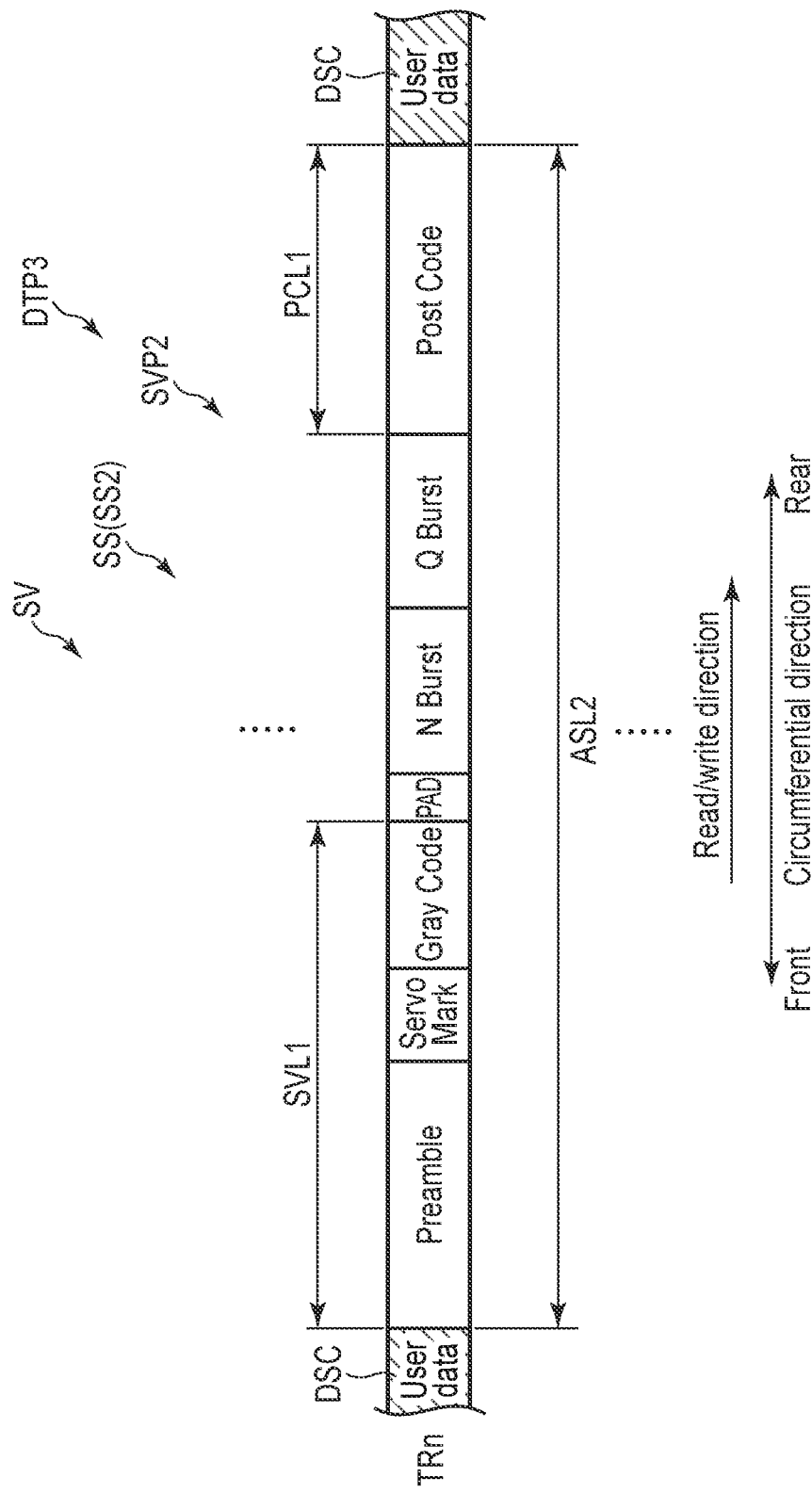
F I G. 5

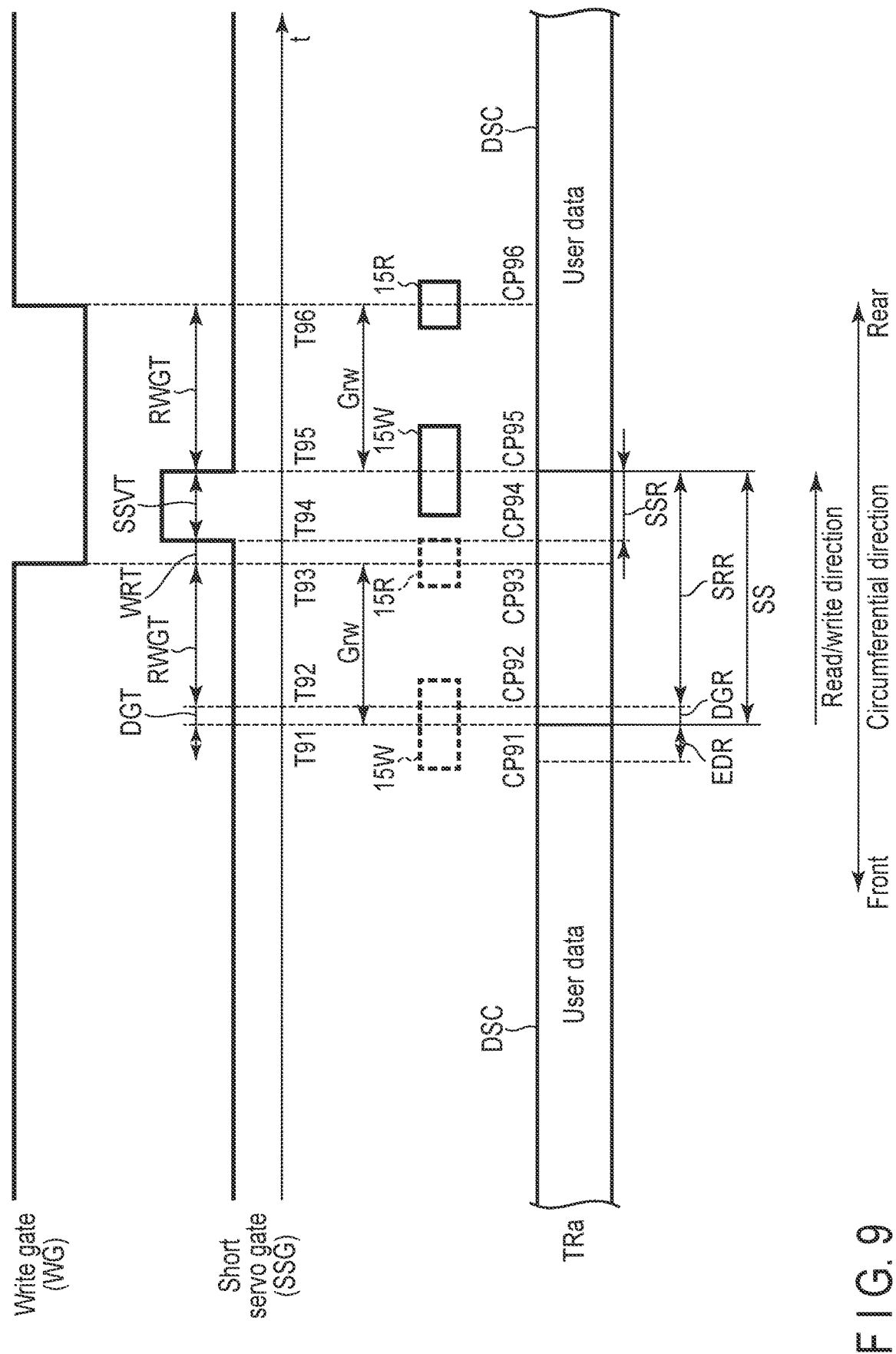
F I G. 9

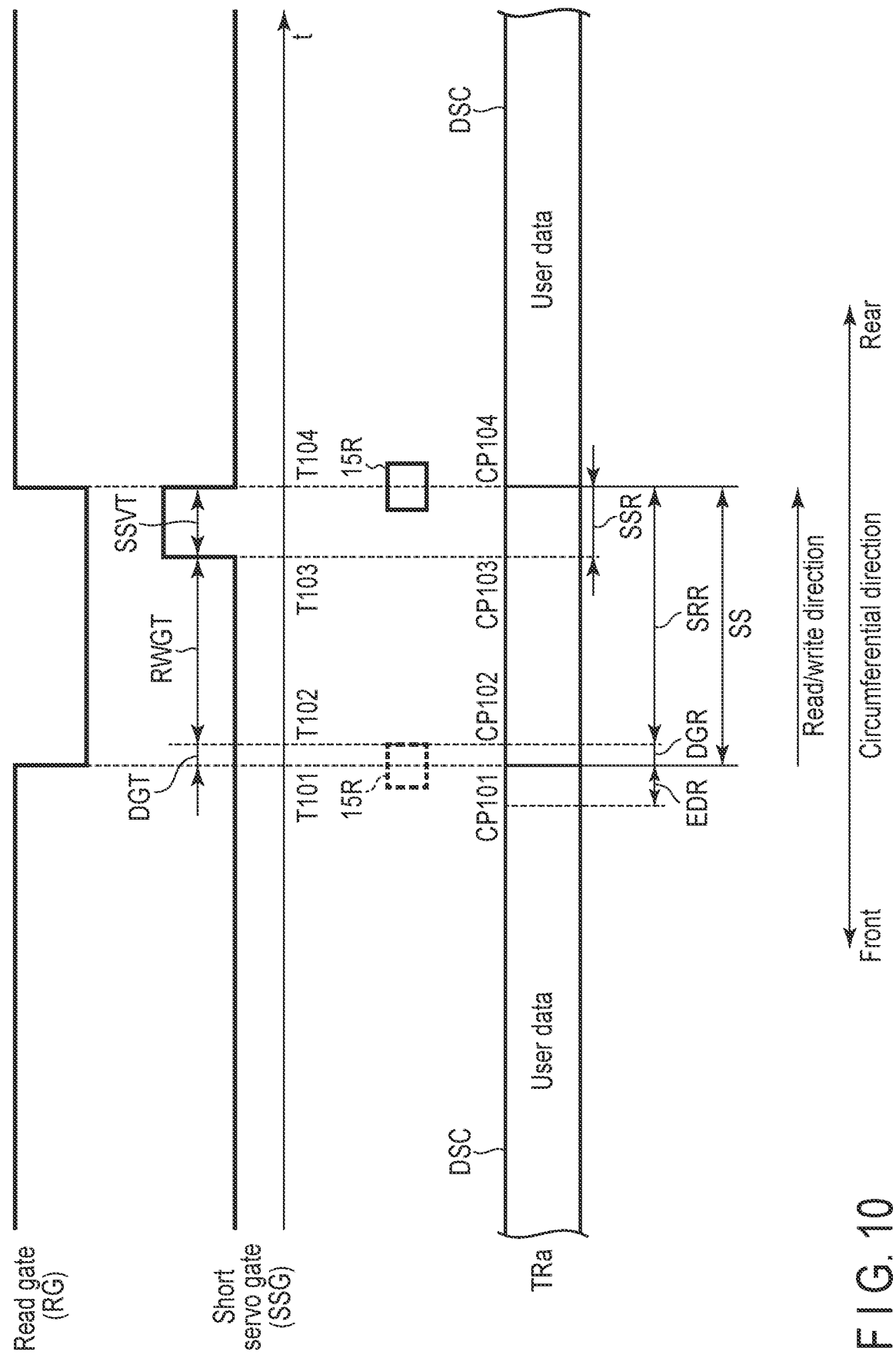
F I G. 10

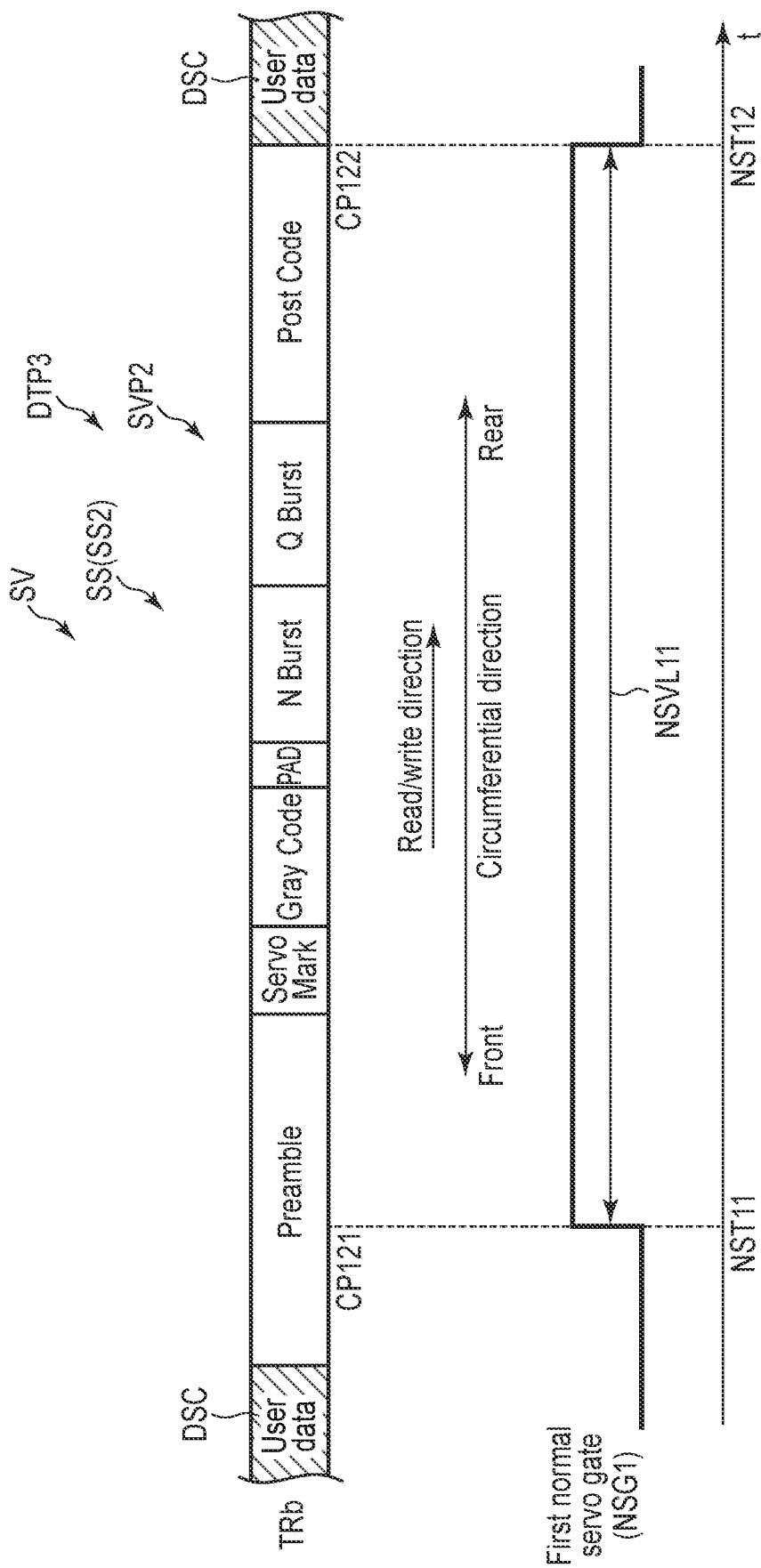
F I G. 12

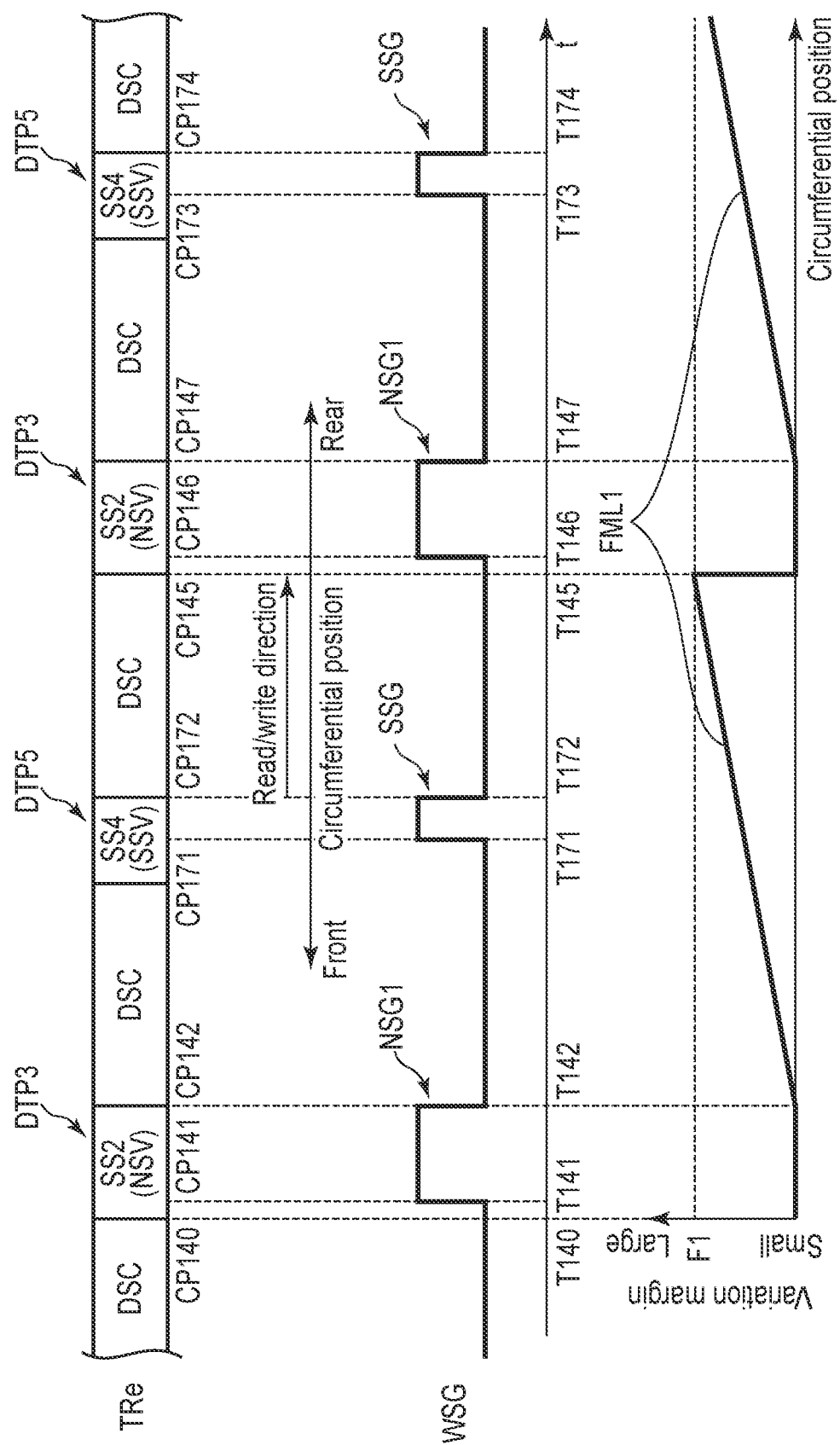
F I G. 17

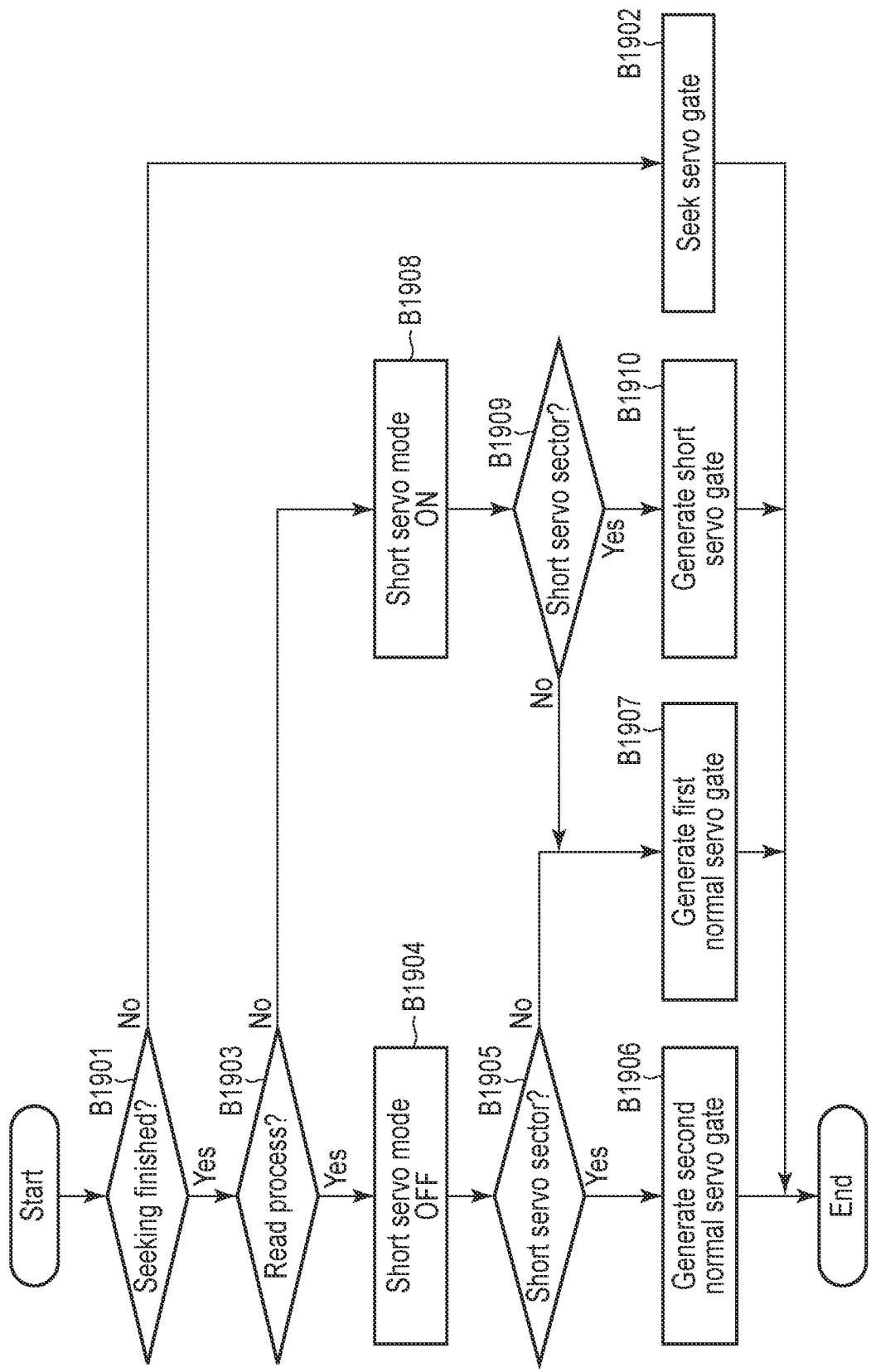
F I G. 19

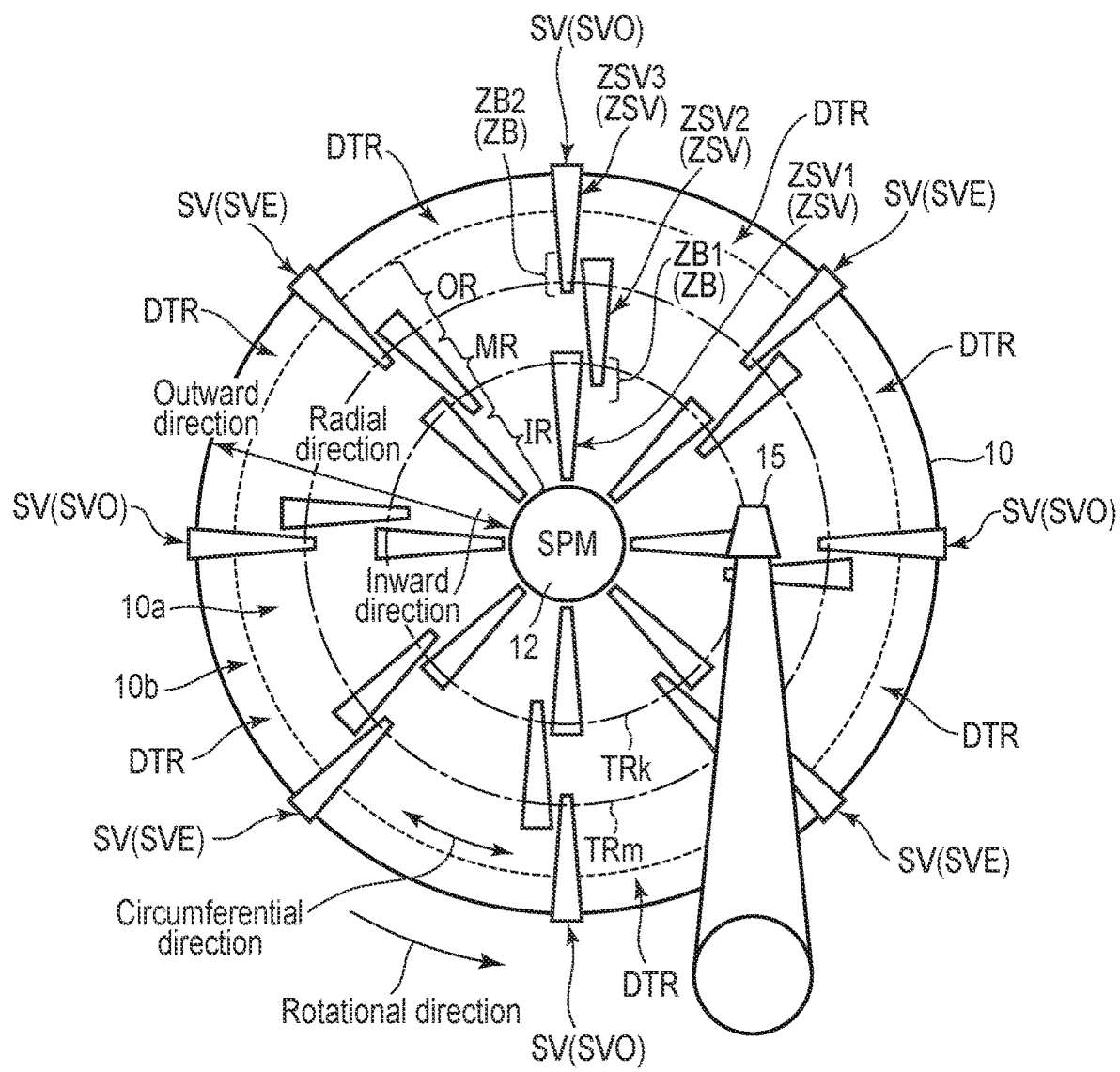
F I G. 20

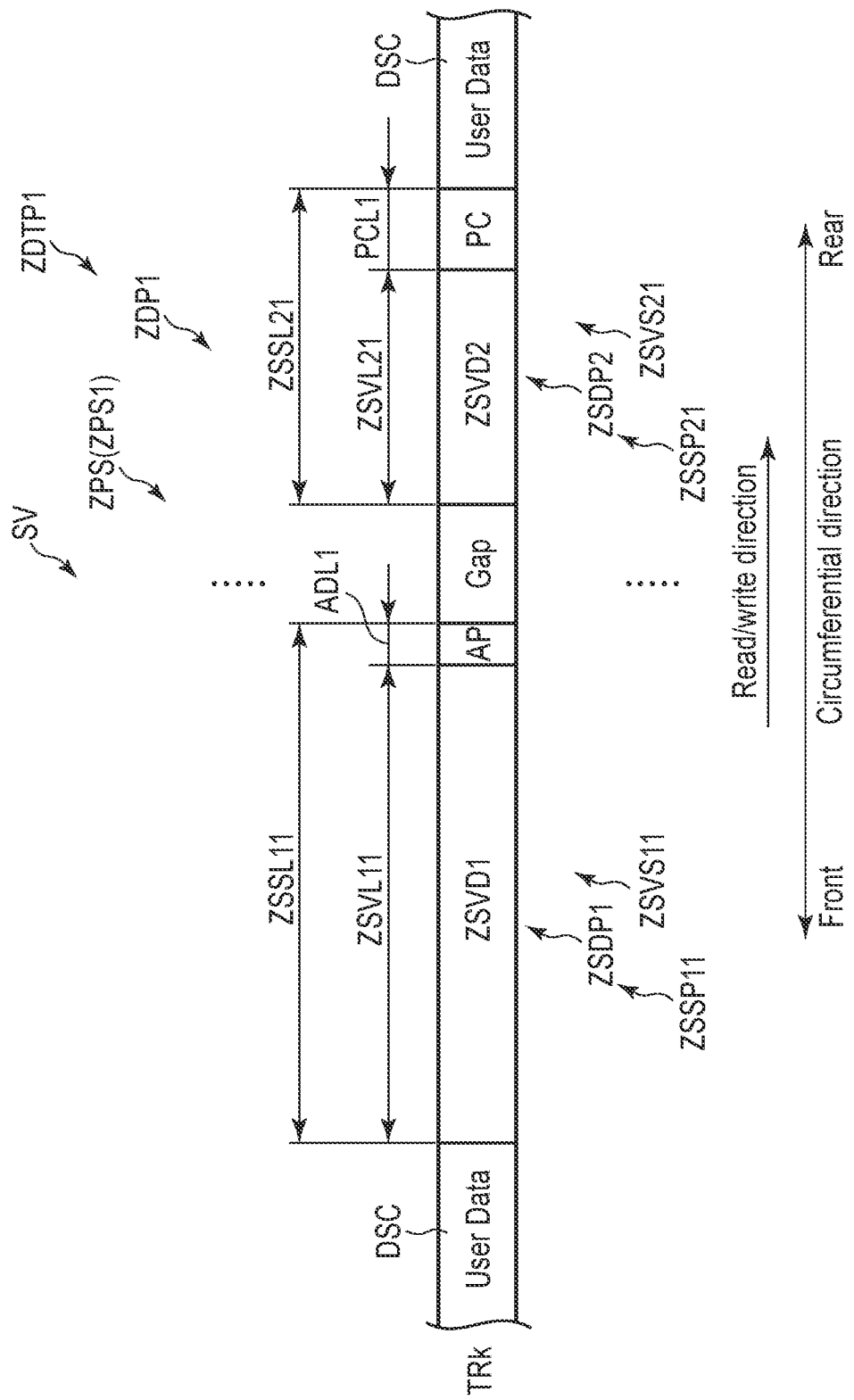
F I G. 21

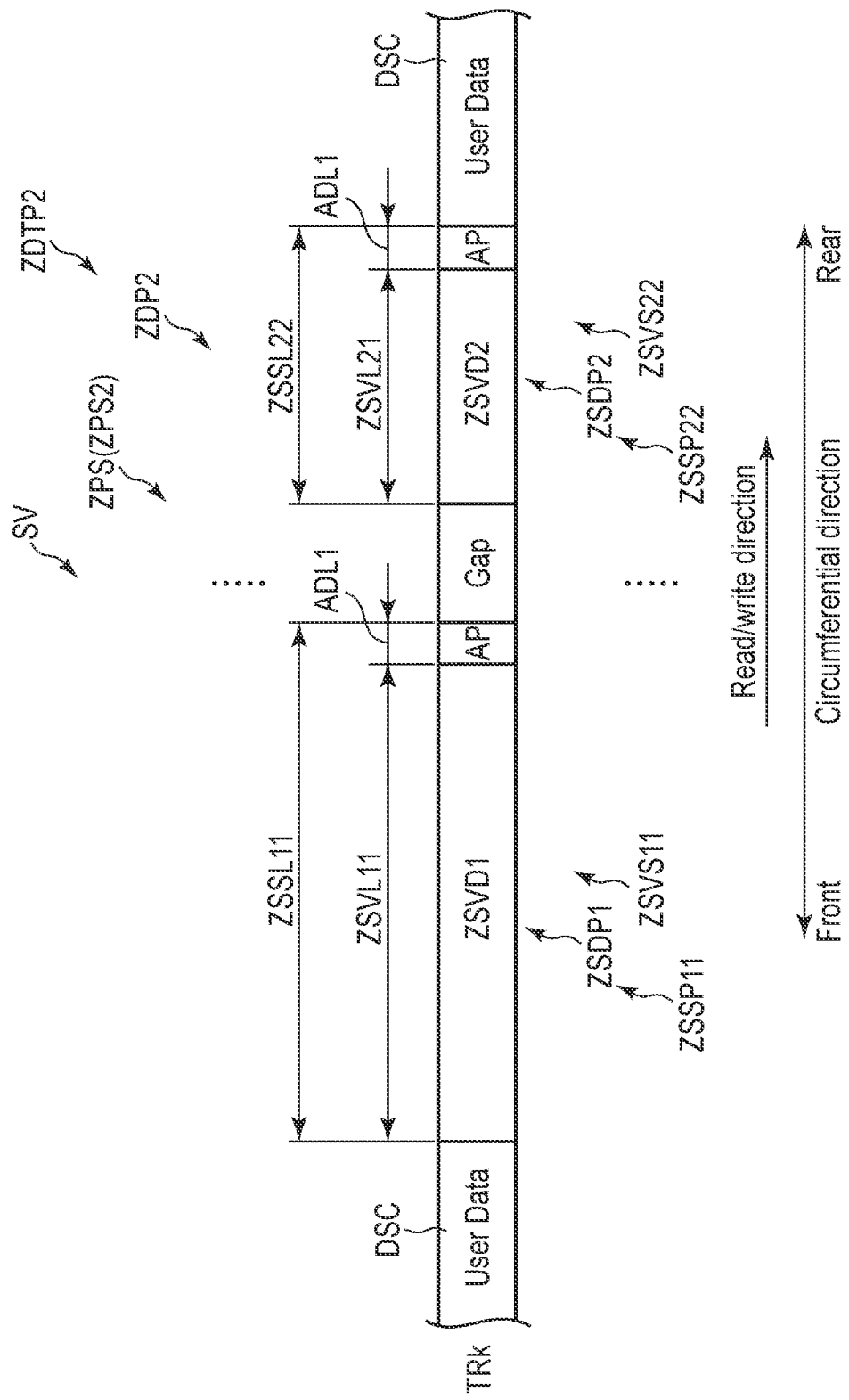
F I G. 22

MAGNETIC DISK DEVICE AND SERVO GATE GENERATION METHOD

CROSS-REFERENCE TO RELATED APPLICATIONS

This application is based upon and claims the benefit of priority from Japanese Patent Application No. 2020-027269, filed Feb. 20, 2020, the entire contents of which are incorporated herein by reference.

FIELD

Embodiments described herein relate generally to a magnetic disk device and a servo gate generation method.

BACKGROUND

A technology for improving the efficiency of data format in a magnetic disk (simply, a disk) and increasing the region to which data can be written has been developed. A technology for improving the efficiency of data format and increasing the region to which data can be written includes a servo read processing technology (short servo mode) different from a normal servo read process, a technology for permitting the read process of a servo sector while data is written to a disk, etc. A magnetic disk comprising a read processing technology for reading a servo sector in a short servo mode performs a write process and a read process by reading at least burst data and determining the position of a head without reading servo data such as a preamble, a servo mark, a gray code and a post code in some of the servo sectors arranged in the circumferential direction of the disk.

BRIEF DESCRIPTION OF THE DRAWINGS

FIG. 1 is a block diagram showing the configuration of a magnetic disk device according to a first embodiment.

FIG. 2 is a schematic diagram showing an example of the layout of servo regions of a disk according to the first embodiment.

FIG. 5 is a schematic diagram showing an example of the data pattern of the track of the disk.

FIG. 9 is a diagram showing an example of a short servo read process at the time of a write process.

FIG. 10 is a diagram showing an example of a short servo read process at the time of a read process.

FIG. 12 is a diagram showing an example of a normal servo read process.

FIG. 17 is a diagram showing an example of a servo read process at the time of a write process.

FIG. 19 is a flowchart showing an example of the generation method of a servo gate according to the first embodiment.

FIG. 20 is a schematic diagram showing an example of the layout of servo regions of a disk according to a second embodiment.

FIG. 21 is a schematic diagram showing an example of the data pattern of the track of the disk.

FIG. 22 is a schematic diagram showing an example of the data pattern of the track of the disk.

DETAILED DESCRIPTION

Figure 3:
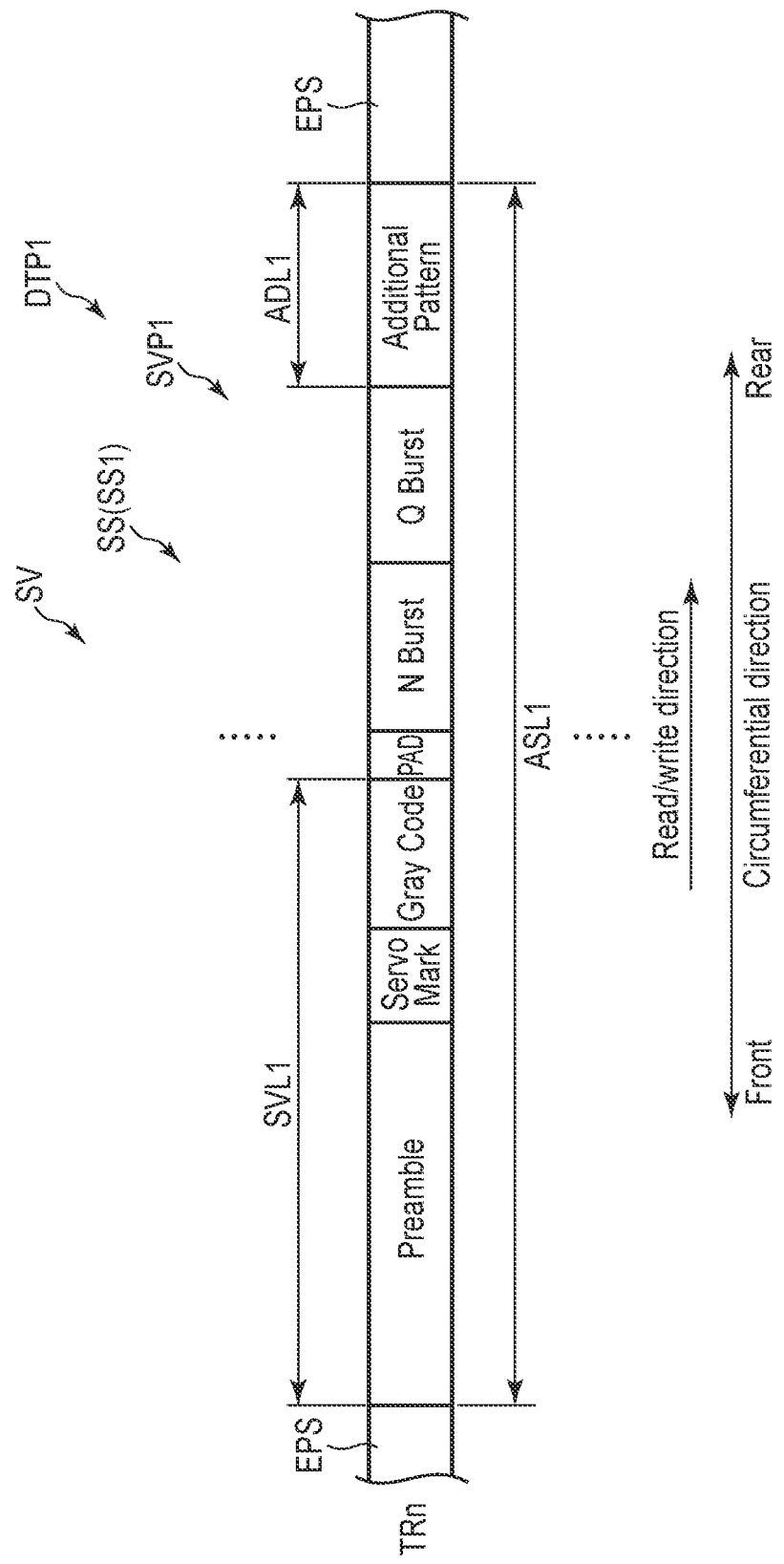
FIG. 3 is a schematic diagram showing an example of the data pattern of the track of the disk.

In general, according to one embodiment, a magnetic disk device comprises: a disk comprising a servo sector including burst data; a head comprising a write head which writes data to the disk, and a read head which reads data from the disk; and a controller which generates a first normal servo gate for applying servo read to the servo sector, wherein when a short servo gate for at least applying servo read to the burst data is generated, the controller generates the short servo gate and the first normal servo gate, and when the short servo gate is not generated, the controller generates the first normal servo gate and a second normal servo gate different from the first normal servo gate.

Embodiments will be described hereinafter with reference to the accompanying drawings. Note that the drawings are merely examples and do not limit the scope of the invention.

First Embodiment

FIG. 1 is a block diagram showing the configuration of a magnetic disk device 1 according to a first embodiment.

The magnetic disk device 1 comprises a head disk assembly (HDA) to be described later, a driver IC 20, a head amplifier integrated circuit (a head amplifier IC or a preamplifier) 30, a volatile memory 70, a nonvolatile memory 80, a buffer memory (buffer) 90, and a system controller 130 which is a single-chip integrated circuit. The magnetic disk device 1 is connected to a host system (simply, a host) 100.

The HDA comprises a magnetic disk (disk) 10, a spindle motor (SPM) 12, an arm 13 on which a head 15 is mounted, and a voice coil motor (VCM) 14. The disk 10 is attached to the SPM 12 and is rotated by driving the SPM 12. The arm 13 and the VCM 14 constitute an actuator. The actuator performs movement control such that the head 15 mounted on the arm 13 is moved to a particular position of the disk 10 by driving the VCM 14. Two or more disks 10 and two or more heads 15 may be provided.

In the disk 10, a user data region 10a available for a user and a system region 10b for writing information necessary for system management are allocated to a region to which data can be written. Hereinafter, a direction perpendicular to the radial direction of the disk 10 is referred to as a circumferential direction. In addition, a particular position of the disk 10 in a radial direction may be referred to as a radial position, and a particular position of the disk 10 in a circumferential direction may be referred to as a circumferential position. A radial position corresponds to, for example, a track, and a circumferential position corresponds to, for example, a sector. A radial position and a circumferential position may be collectively referred to simply as a position. The disk 10 (for example, the user data region 10a) is divided into a plurality of regions in a particular range in a radial direction. The divisional regions of the disk 10 in a particular range in a radial direction may be referred to as zones. Each zone includes a plurality of tracks. Each track includes a plurality of sectors. The term "track" is used as one of the divisional regions in the radial direction of the disk 10, the path of the head 15 at a particular radial position, data extending in the circumferential direction of the disk 10, data written to a particular radial position for one track of the disk 10, data written to a track or various other meanings. The term "sector" is used as one of the divisional regions in the circumferential direction of a track, data written to a particular position of the disk 10, data written to a sector or various other meanings. The width of a particular track in a radial direction may be referred to as a track width. The path passing through the center position of the track width of a particular track is referred to as a track center.

The head 15 comprises a slider as a main body, and a write head 15W and a read head 15R mounted on the slider. The write head 15W writes data onto the disk 10. Hereinafter, the matter in which data is written may be referred to as data write, a write process, etc. The read head 15R reads data recorded on the disk 10. Hereinafter, the matter in which data is read may be referred to as data read or a read process. Note that the write head 15W may be simply referred to as the head 15. The read head 15R may be simply referred to as the head 15. The write head 15W and the read head 15R may be collectively referred to as the head 15.

The central portion of the head 15 may be simply referred to as the head 15. The central portion of the write head 15W may be simply referred to as the write head 15W. The central portion of the read head 15R may be simply referred to as the read head 15R. The central portion of the write head 15W may be simply referred to as the head 15. The central portion of the read head 15R may be simply referred to as the head 15. The matter in which the position of the central portion of the head 15 is determined at the track center of a particular track may be expressed as, for example, "to determine the position of the head 15 in a particular track", "to provide the head 15 in a particular track" or "to position the head 15 in a particular track". FIG. 2 is a schematic diagram showing an example of the layout of servo regions SV in the disk 10 according to the present embodiment. As shown in FIG. 2, in a radial direction, a direction toward the outer circumference of the disk 10 is referred to as an outward direction (external side), and a direction opposite to an outward direction is referred to as an inward direction (internal side). As shown in FIG. 2, in a circumferential direction, the direction in which the disk 10 rotates is referred to as a rotational direction. In the example shown in FIG. 2, the rotational direction is counterclockwise. However, the rotational direction may be the opposite direction (clockwise).

The disk 10 comprises a plurality of servo regions SV and a plurality of data regions DTR. The servo regions SV may radially extend in the radial direction of the disk 10 and be discretely provided at particular intervals in a circumferential direction. For example, the servo regions SV may extend in a spiral manner from the inner circumference to the outer circumference and be discretely provided at particular intervals in a circumferential direction. For example, the servo regions SV may be provided in an island shape in a radial direction and be discretely provided at particular intervals in a circumferential direction. Hereinafter, one servo region SV in a particular track may be referred to as a servo sector. A servo region SV may be referred to as a servo sector SV. Each servo sector includes servo data. Hereinafter, the layout of some servo data items constituting a servo sector may be referred to as a servo pattern. Servo data written to a servo sector may be referred to as a servo sector.

Each data region DTR is provided between servo regions SV. For example, each data region DTR is equivalent to a region between two successive servo regions SV in a circumferential direction. Hereinafter, one data region DTR in a particular track may be referred to as a data sector. A data region DTR may be referred to as a data sector DTR. Each data sector includes user data. User data written to a data sector may be referred to as a data sector. A data sector may be referred to as user data. The pattern including some data items may be referred to as a data pattern. In the example shown in FIG. 2, the data pattern of a particular track includes servo data (servo sector) and user data (data sector).

The servo regions SV comprise, for example, servo regions (normal servo regions) NSV and servo regions (short servo regions) SSV different from servo regions NSV. Hereinafter, one normal servo region NSV in a particular track may be referred to as a normal servo sector. One short servo region SSV in a particular track may be referred to as a short servo sector SSV. A normal servo region NSV may be referred to as a normal servo sector NSV. A short servo region SSV may be referred to as a short servo sector SSV. Each normal servo sector and each short servo sector include servo data. Hereinafter, the servo data of a normal servo sector may be referred to as normal servo data. The servo data of a short servo sector may be referred to as short servo data. Normal servo data may be referred to as a normal servo sector. Short servo data may be referred to as a short servo sector. The servo pattern of normal servo data (in other words, a normal servo pattern) may be the same as or different from the servo pattern of a short servo sector (in other words, a short servo pattern). The terms "same", "equal", "match" and "equivalent" include the meaning of "completely the same" as a matter of course. However, the terms also include the meaning of "different from each other to the extent that they are considered to be substantially the same as each other". For example, the length of each short servo sector SSV in a circumferential direction is less than that of each normal servo sector NSV in a circumferential direction. Hereinafter, the length in a circumferential direction may be simply referred to as the length. For example, the length of each short servo sector SSV may be equal to that of each normal servo sector NSV, or may be greater than that of each normal servo sector NSV.

In the example shown in FIG. 2, the normal servo regions NSV and the short servo regions SSV are alternately provided in a circumferential direction. In other words, in a circumferential direction, one short servo region SSV is provided between two normal servo regions NSV successively arranged at an interval. For example, when successive numbers are added to all the servo regions SV of the disk 10 in order, the normal servo regions NSV are equivalent to odd-numbered servo regions SV, and the short servo regions SSV are equivalent to even-numbered servo regions SV. In a circumferential direction, two or more short servo regions SSV may be provided between two normal servo regions NSV successively arranged at an interval.

The head 15 comprises the write head 15W and the read head 15R such that a particular distance (in other words, a read write gap) Grw is defined between them in a circumferential direction. The read write gap Grw is equivalent to the distance between central portion WC of the write head 15W and central portion RC of the read head 15R in a circumferential direction. In the example shown in FIG. 2, the head 15 is not inclined in an outward direction or inward direction (in other words, the state in which the skew angle is 0 degrees). However, the head 15 may be inclined in an outward direction or inward direction. In this case, the read write gap is equivalent to the distance between the write head 15W and the read head 15R in a circumferential direction in the head 15 inclined in an outward direction or inward direction.

Now, this specification explains examples of the data pattern of a particular track of the disk 10 with reference to FIG. 3, FIG. 4, FIG. 5, FIG. 6 and FIG. 7.

FIG. 3 is a schematic diagram showing an example of data pattern DTP1 of track TRn of the disk 10. As shown in FIG. 3, in a circumferential direction, a direction toward the distal end of the front arrow is referred to as a front side (the front end or a forward direction), and a direction toward the distal end of the rear arrow is referred to as a rear side (or a backward direction). For example, in a circumferential direction, a direction for read/write (in other words, a read/write direction) is equivalent to a direction from the front side to the rear side. The read/write direction is equivalent to, for example, a direction opposite to the rotational direction shown in FIG. 2.

In the example shown in FIG. 3, track TRn comprises data pattern DTP1. Data pattern DTP1 is equivalent to an example of the data pattern written in a self-servo write process. Data pattern DTP1 includes servo sector SS1. In the example shown in FIG. 3, data pattern DTP1 comprises servo sector SS1 between two regions (free regions) which are arranged at an interval in a circumferential direction and in which no data is written. Servo sector SS1 includes servo pattern SVP1. Servo pattern SVP1 includes at least one servo data item, for example, a preamble, a servo mark or servo address mark, a gray code, PAD, burst data and an additional pattern. In servo pattern SVP1, the preamble, the servo mark, the gray code, the PAD, the burst data and the additional pattern are arranged in this order in a read/write direction. Servo sector SS1 may not include an additional pattern. FIG. 3 shows length ASL1 of servo sector SS1, length SVL1 of the preamble, the servo mark and the gray code, and length ADL1 of the additional pattern. The preamble includes preamble information for synchronization with a reproduction signal of the servo pattern including the servo mark, the gray code, etc. The servo mark (or servo address mark) includes servo mark information indicating the start of the servo pattern. The gray code includes the address (cylinder address) of a particular track and the address of a servo sector of a particular track. The burst data is data (relative position data) used to detect the positional gap (positional difference) in the radial direction and/or circumferential direction of the head 15 with respect to the track center of a particular track, and is structured by the repetitive pattern of a particular cycle. The PAD includes the PAD information of a synchronization signal of a gap and servo AGC. The burst data is written with a data pattern in which the phase of the burst data is inverted 180 degrees in one servo track cycle in the radial direction of the disk 10. The servo track (servo cylinder) is equivalent to the target track of a write process or a read process by a command from the host 100, etc. The burst data is used to, for example, obtain the position (in other words, head position) of the head 15 in a radial direction and/or circumferential direction in the disk 10. The burst data includes, for example, N burst and Q burst. The N burst and Q burst are written with a data pattern in which the phases deviate from each other by 90 degrees in the radial direction of the disk 10. The additional pattern is equivalent to, for example, the pattern for determining the time lag when data written to the disk 10 is read and demodulated. The phase data obtained by reading the additional pattern could be used to, for example, determine whether or not the time point for reading burst data is shifted. Hereinafter, the term "time point" may be used as the time point a particular time after the reference time point at which the read head 15 read particular data, the time point at which the read head 15R is provided at a particular circumferential position, etc. The additional pattern is, for example, data different from a post code as described later. For example, the frequency of the additional pattern is different from that of the preamble. In other words, the frequency of the additional pattern is different from that of the post code. For example, the frequency of the additional pattern is equal to that of the burst data, for example, that of the N burst and that of the Q burst. The phase of the additional pattern periodically changes in a circumferential direction. The additional pattern is written with a data pattern in which equalization is applied to the phase in one servo track cycle in the radial direction of the disk 10. In other words, the phase of a particular additional pattern is equal to that of an additional pattern adjacent to the particular additional pattern in a radial direction. Length ADL1 of the additional pattern is, for example, less than the length of the post code described later. The expression "adjacent to each other" includes the meaning of "continuous with each other" and "arranged so as to be in contact with each other" in a particular direction as a matter of course, and also includes the meaning of "spaced apart from each other to the extent that they are considered to be substantially continuous with each other".

Figure 4:
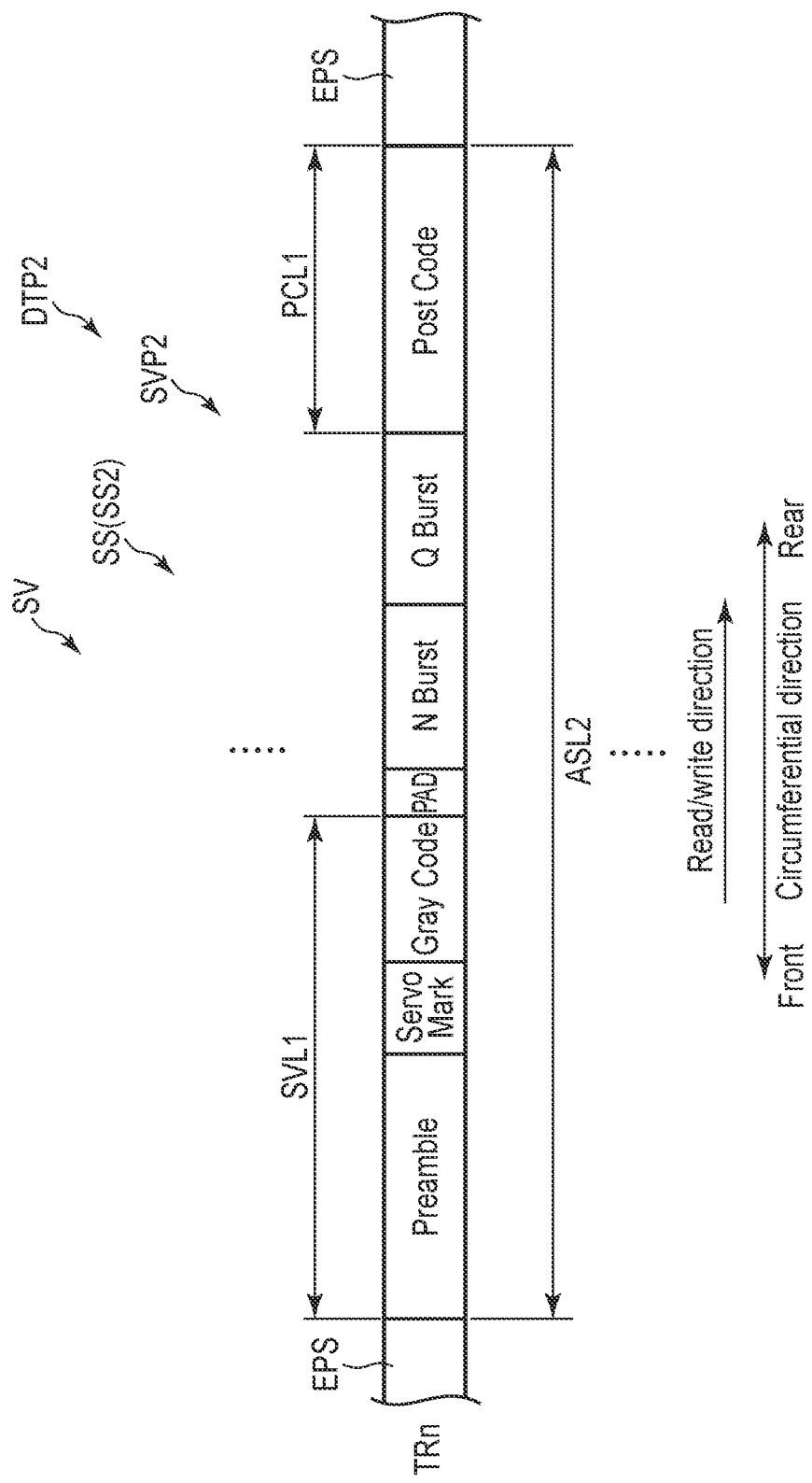
FIG. 4 is a schematic diagram showing an example of the data pattern of the track of the disk.

FIG. 4 is a schematic diagram showing an example of data pattern DTP2 of track TRn of the disk 10.

In the example shown in FIG. 4, track TRn comprises data pattern DTP2. Data pattern DTP2 is equivalent to an example of the data pattern in which a post code is written to a servo sector in the write process of the post code after the determination of the data format. Data pattern DTP2 includes servo sector SS2. In the example shown in FIG. 4, data pattern DTP2 comprises servo sector SS2 between two free regions EPS arranged at an interval in a circumferential direction. Servo sector SS2 includes servo pattern SVP2. Servo pattern SVP2 includes at least one servo data item, for example, a preamble, a servo mark, a gray code, PAD, burst data and a post code. In servo pattern SVP2, the preamble, the servo mark, the gray code, the PAD, the burst data and the post code are arranged in this order in a read/write direction. Servo pattern SVP2 may not include a post code. FIG. 4 shows length ASL2 of servo sector SS2 and length PCL1 of the post code. Length PCL1 of the post code is, for example, greater than length ADL1 of the additional pattern shown in FIG. 3. Length ASL2 of servo sector SS2 is greater than length ASL1 of servo sector SS1. Length PCL1 of the post code may be, for example, less than or equal to additional pattern ADM. Length ASL2 of servo sector SS2 may be less than or equal to length ASL1 of servo sector SS1. The post code includes data (in other words, repeatable run out [RRO] correction data), etc., for correcting an error caused by track distortion with respect to the target path of the head 15, for example, the track center, provided concentrically with the disk 10. The track distortion is caused by a shake (RRO) synchronized with the rotation of the disk 10 when servo data is written to the disk. Hereinafter, for convenience sake, an error caused by track distortion with respect to the target path because of RRO may be simply referred to as RRO.

FIG. 5 is a schematic diagram showing an example of data pattern DTP3 of track TRn of the disk 10.

In the example shown in FIG. 5, track TRn comprises data pattern DTP3. Data pattern DTP3 is equivalent to an example of the data pattern in which user data is written to the free regions EPS of data pattern DTP2 shown in FIG. 4. Data pattern DTP3 includes servo sector SS2 and data sectors DSC. In the example shown in FIG. 5, data pattern DTP3 comprises servo sector SS2 between two data sectors DSC arranged at an interval in a circumferential direction.

Figure 6:
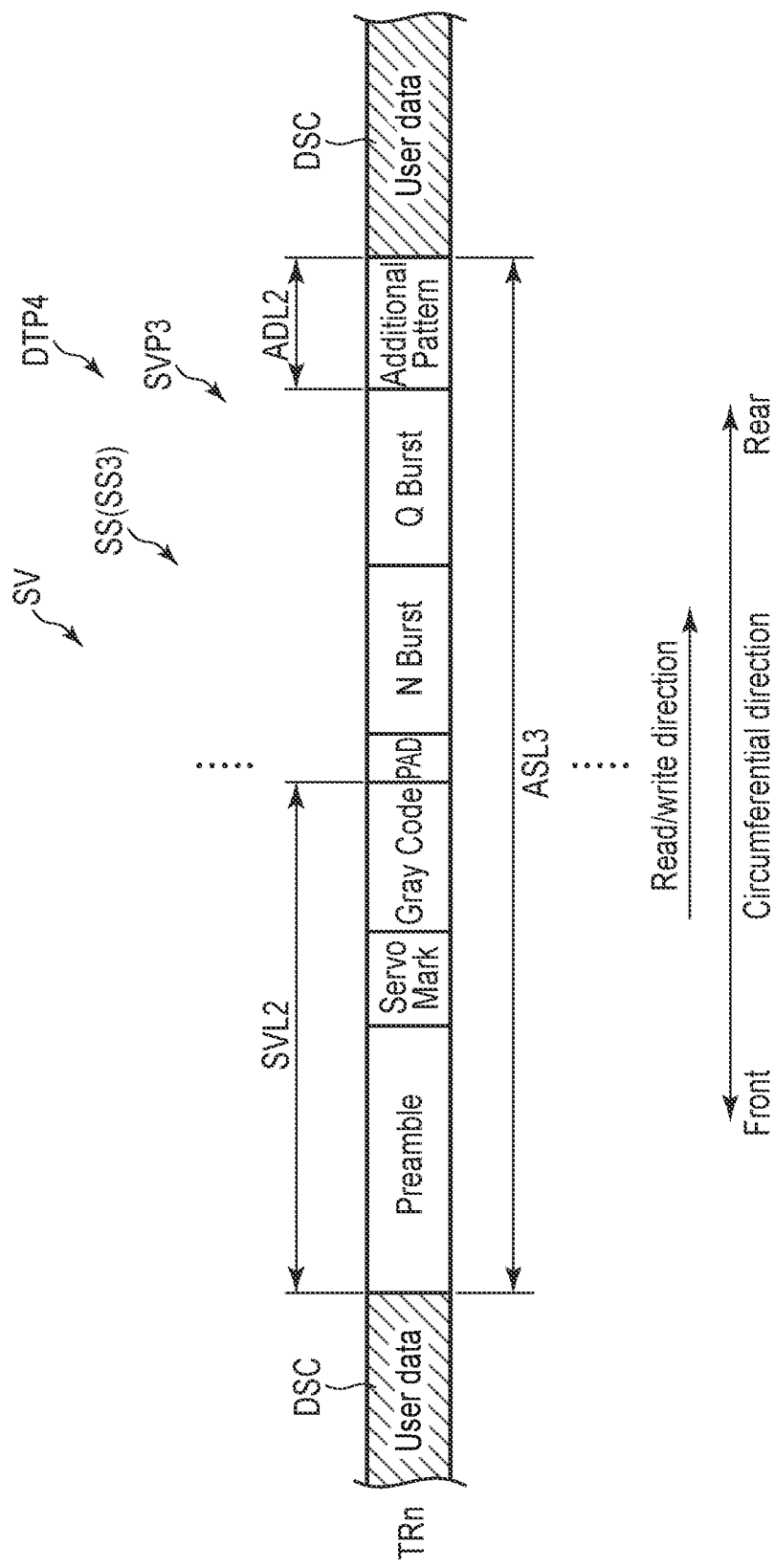
FIG. 6 is a schematic diagram showing an example of the data pattern of the track of the disk.

FIG. 6 is a schematic diagram showing an example of data pattern DTP4 of track TRn of the disk 10.

In the example shown in FIG. 6, track TRn comprises data pattern DTP4. Data pattern DTP4 is equivalent to an example of the data pattern in which user data is written to the free regions EPS of data pattern DTP1 shown in FIG. 3. Data pattern DTP4 includes servo sector SS3. In the example shown in FIG. 6, data pattern DTP4 comprises servo sector SS3 between two data sectors DSC arranged at an interval in a circumferential direction. Servo sector SS3 includes servo pattern SVP3. Servo pattern SVP3 includes at least one servo data item, for example, a preamble, a servo mark, a gray code, PAD, burst data and an additional pattern. In servo pattern SVP3, the preamble, the servo mark, the gray code, the PAD, the burst data and the additional pattern are arranged in this order in a read/write direction. Servo sector SS3 may not include an additional pattern. FIG. 6 shows length ASL3 of servo sector SS3, length SVL2 of the preamble, the servo mark and the gray code, and length ADL2 of the additional pattern. For example, length ASL3 of servo sector SS3 is less than length ASL1 of servo sector SS1, and less than length ASL2 of servo sector SS2. For example, length SVL2 is less than length SLV1. For example, length ADL2 of the additional pattern is less than length ADL1 of the additional pattern. For example, the additional pattern shown in FIG. 6 is equivalent to a pattern in which a portion which is not used in a servo read process in the additional pattern shown in FIG. 3 is overwritten with user data.

Figure 7:
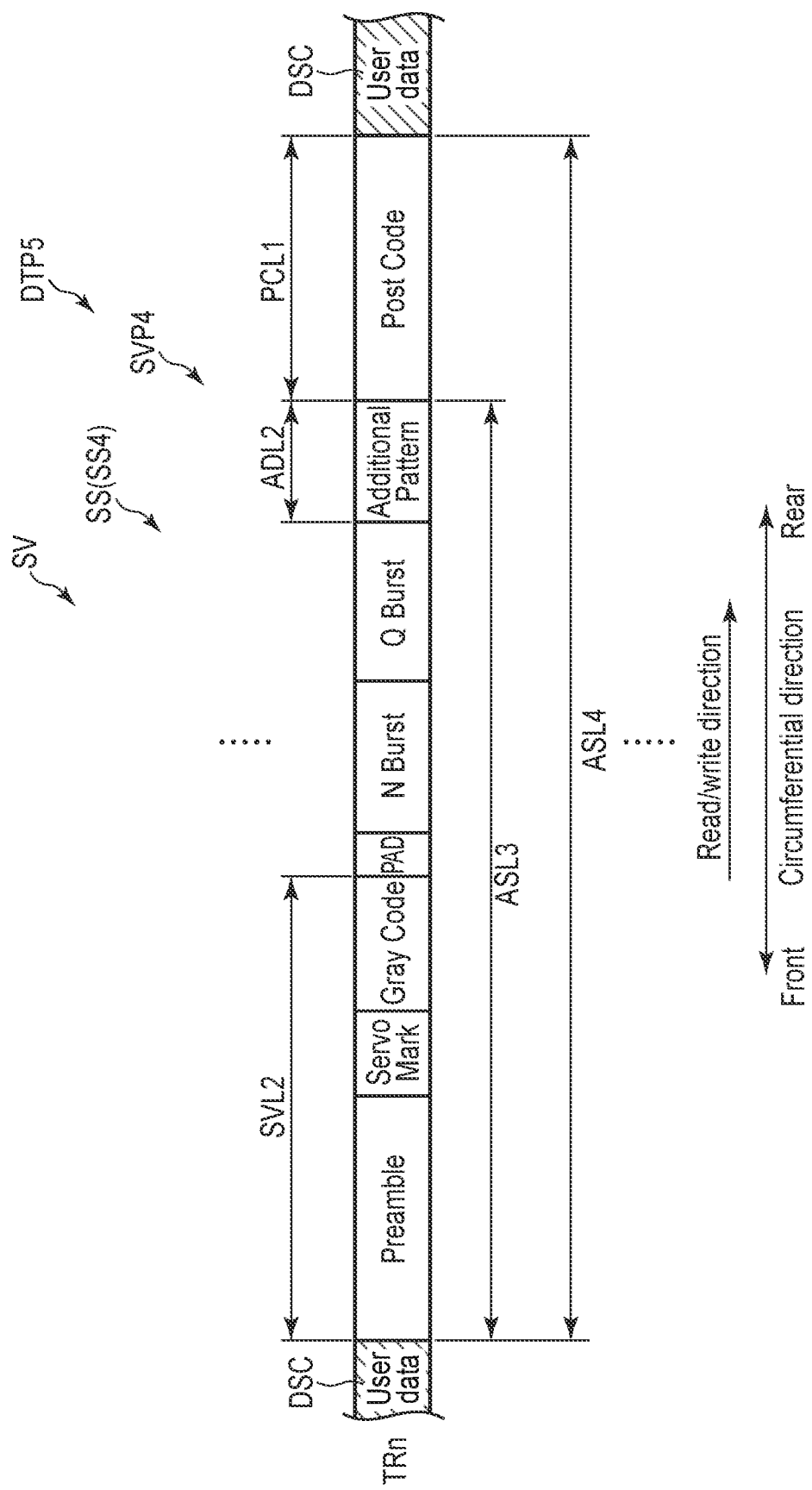
FIG. 7 is a schematic diagram showing an example of the data pattern of the track of the disk.

FIG. 7 is a schematic diagram showing an example of data pattern DTP5 of track TRn of the disk 10.

In the example shown in FIG. 7, track TRn comprises data pattern DTP5. Data pattern DTP5 is equivalent to an example of the data pattern in which the post code adjacent to the additional pattern in an rear direction is written and user data is written to the free regions EPS in data pattern DTP1 shown in FIG. 3. Data pattern DIPS includes servo sector SS4. In the example shown in FIG. 7, data pattern DTP5 comprises servo sector SS4 between two data sectors DSC arranged at an interval in a circumferential direction. Servo sector SS4 includes servo pattern SVP4. Servo pattern SVP4 includes at least one servo data item, for example, a preamble, a servo mark, a gray code, PAD, burst data, an additional pattern and a post code. In servo pattern SVP4, the preamble, the servo mark, the gray code, the PAD, the burst data, the additional pattern and the post code are arranged in this order in a read/write direction. FIG. 7 shows length ASL4 of servo sector SS4. For example, length ASL4 of servo sector SS4 is greater than length ASL3 of servo sector SS3.

The driver IC 20 controls the drive of the SPM 12 and the VCM 14 under control of the system controller 130 (specifically, an MPU 40 to be explained later).

The head amplifier IC (preamplifier) 30 comprises a read amplifier and a write driver. The read amplifier amplifies a read signal read from the disk 10 and outputs the amplified read signal to the system controller 130 (specifically, a read/write [R/W] channel 50 to be described later). The write driver outputs, to the head 15, a write current corresponding to a signal output from the R/W channel 50.

The volatile memory 70 is a semiconductor memory where stored data is lost when power supply is cut off. The volatile memory 70 stores data and the like necessary for the process of each unit of the magnetic disk device 1. The volatile memory 70 is, for example, a dynamic random access memory (DRAM) or a synchronous dynamic random access memory (SDRAM).

The nonvolatile memory 80 is a semiconductor memory which records stored data even when power supply is cut off. The nonvolatile memory 80 is, for example, a NOR type or NAND type flash read only memory (FROM).

The buffer memory 90 is a semiconductor memory which temporarily records data and the like transmitted and received between the magnetic disk device 1 and the host 100. The buffer memory 90 may be structured integrally with the volatile memory 70. The buffer memory 90 is, for example, a DRAM, a static random access memory (SRAM), an SDRAM, a ferroelectric random access memory (FeRAM) or a magnetoresistive random access memory (MRAM).

The system controller (controller) 130 is realized by, for example, using a large scale integrated circuit (LSI) called a system-on-a-chip (SoC) in which a plurality of elements are integrated on a single chip. The system controller 130 includes the microprocessor (MPU) 40, the read/write (R/W) channel 50 and a hard disk controller (HDC) 60. The system controller 130 is electrically connected to, for example, the driver IC 20, the head amplifier IC 30, the volatile memory 70, the nonvolatile memory 80, the buffer memory 90 and the host 100.

The MPU 40 is a main controller which controls each unit of the magnetic disk device 1. The MPU 40 controls the VCM 14 through the driver IC 20, and performs servo control for determining the position of the head 15. In addition, the MPU 40 controls the SPM 12 through the driver IC 20 to rotate the disk 10. The MPU 40 controls the operation of writing data to the disk 10 and selects the storage destination of write data. Further, the MPU 40 controls the operation of reading data from the disk 10 and controls the processing of read data. The MPU 40 is connected to each unit of the magnetic disk device 1. The MPU 40 is electrically connected to, for example, the driver IC 20, the R/W channel 50 and the HDC 60.

The R/W channel 50 performs the signal process of read data transmitted from the disk 10 to the host 100 and write data transmitted from the host 100 in accordance with an instruction from the MPU 40, such as a modulation process, a demodulation process, a coding process and a decoding process. The R/W channel 50 comprises a circuit or function for measuring the signal quality of read data. The R/W channel 50 detects various gates such as a write gate equivalent to a signal for writing data, a read gate equivalent to a signal for reading data and a servo gate equivalent to a signal for reading a servo. The R/W channel 50 performs the signal process of write data in accordance with a write gate, performs the signal process of read data in accordance with a read gate, and performs the signal process of servo data in accordance with a servo gate. The R/W channel 50 performs the read process of servo data (a process for demodulating servo data from a read signal input from the head amplifier IC 30, in other words, servo read or a servo read process), and performs a process for writing data to the disk 10 (a process for outputting write data to the head amplifier IC 30). The R/W channel 50 performs a servo read process and performs a process for reading data from the disk 10. The R/W channel 50 outputs a write fault signal (a fault signal) for stopping write to the HDC 60 and immediately stops the signal process of write data.

For example, the R/W channel 50 applies servo read to a servo sector in accordance with a servo gate for applying servo read to the whole servo data of a servo sector in a particular region of the disk 10, and applies a write process to the region based on the servo data obtained by servo read based on the servo gate. Hereinafter, a servo gate for applying servo read to the whole servo data of a servo sector may be referred to as a normal servo gate. The matter in which a servo read process is performed in accordance with a normal servo gate may be referred to as normal servo read or a normal servo read process.

For example, the R/W channel 50 applies servo read to a servo sector in accordance with a servo gate for applying servo read to a part of the servo data of a servo sector in a particular region of the disk 10, for example, servo data in a circumferential range smaller than the circumferential range of servo data to be obtained by servo read by a normal servo gate, and applies a write process to the region based on the servo data obtained by the servo read in accordance with the servo gate. Hereinafter, a servo gate for applying servo read to a part of the servo data of a servo sector, for example, servo data in a circumferential range smaller than the circumferential range of servo data to be obtained by servo read by a normal servo gate may be referred to as a short servo gate. The matter in which a servo read process is performed in accordance with a short servo gate may be referred to as short servo read or a short servo read process. The length of the time from the start of an assertion (active, valid or on) state to the start of a negation (inactive, invalid or off) state (in other words, the servo gate length) differs between a normal servo gate and a short servo gate. For example, the servo gate length of a normal servo gate is greater than that of a short servo gate.

For example, the R/W channel 50 applies normal servo read to a servo sector in a particular region of the disk 10, and applies a read process to the region based on the servo data obtained by the normal servo read. The R/W channel may apply short servo read to a servo sector in a particular region of the disk 10 and apply a read process to the region based on the servo data obtained by the short servo read.

The R/W channel 50 is allowed to determine whether or not a short servo read process should be performed in a particular region of the disk 10. Hereinafter, a mode for performing a short servo read process may be referred to as a short servo mode. The matter in which a short servo read process is performed may be expressed as "turning on a short servo mode". The matter in which a short servo read process is not performed may be expressed as "turning off a short servo mode". Thus, the R/W channel 50 is allowed to switch a short servo mode between on and off. For example, the R/W channel 50 switches a short servo mode between on and off based on whether the current mode is a mode for performing a write process (in other words, a write mode) or a mode for performing a read process (in other words, a read mode). Hereinafter, a write mode and a read mode may be collectively referred to as an access mode. The term "access" includes the meanings of "a process for writing data to a particular region of the disk 10" and "a process for reading data from a particular region of the disk 10". Thus, the R/W channel 50 switches a short servo mode between on and off in accordance with an access mode.

For example, at the time of the write process of the disk 10, the R/W channel 50 turns on a short servo mode, applies normal servo read to a normal servo sector and applies short servo read to a short servo sector. At the time of the read process of the disk 10, the R/W channel 50 turns off a short servo mode, applies normal servo read to a normal servo sector and applies normal servo read to a short servo sector. For example, at the time of the read process of the disk 10, the R/W channel 50 turns off a short servo mode, applies servo read to a particular normal servo sector based on a particular normal servo gate (a first normal servo gate), and applies servo read to a particular short servo sector based on a normal servo gate (a second normal servo gate) different from the first normal servo gate. For example, the servo gate length of the first normal servo gate is different from that of the second normal servo gate.

The R/W channel 50 is electrically connected to, for example, the head amplifier IC 30, the MPU 40 and the HDC 60. For example, the R/W channel 50 is electrically connected to the HDC 60 via a wire WR.

The HDC 60 controls data transfer between the host 100 and the R/W channel 50 in accordance with an instruction from the MPU 40. The HDC 60 outputs various gates such as a write gate, a read gate and a servo gate to the R/W channel 50 in accordance with an instruction from the MPU 40. The HDC 60 is electrically connected to, for example, the MPU 40, the R/W channel 50, the volatile memory 70, the nonvolatile memory 80 and the buffer memory 90.

Figure 8:
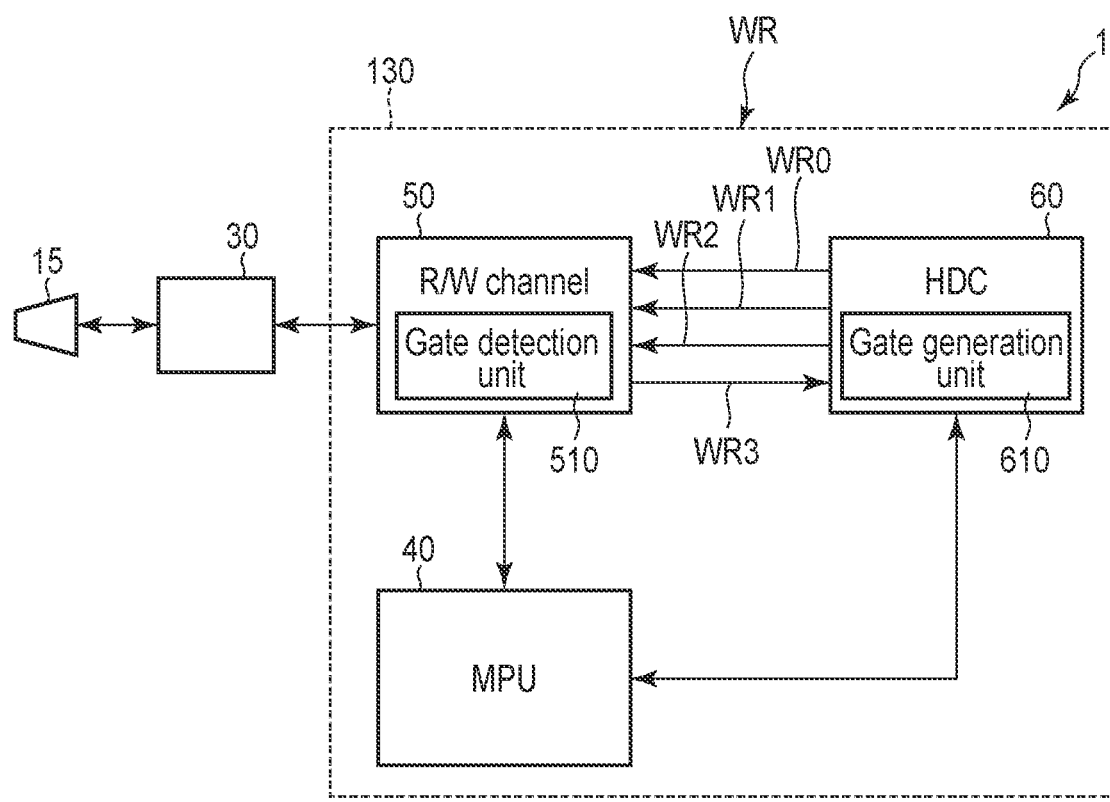
FIG. 8 is a diagram showing an example of the input/output of various gates according to the first embodiment.

FIG. 8 is a diagram showing an example of the input/output of various gates according to the present embodiment.

In the example shown in FIG. 8, the wire WR includes wires WR0, WR1 and WR3. Wires WR0 to WR3 may be physical wires or the communication paths of signals. For example, wire WR0 indicates a wire or communication path for transferring a servo gate (SG) from the HDC 60 to the R/W channel 50. Wire WR1 indicates a wire or communication path for transferring a write gate (WG) from the HDC 60 to the R/W channel 50. Wire WR2 indicates a wire or communication path for transferring a read gate (RG) from the HDC 60 to the R/W channel 50. Wire WR3 indicates a wire or communication path for transferring a fault signal to the R/W channel 50.

The R/W channel 50 comprises a gate detection unit 510. The gate detection unit 510 detects whether various gates such as a write gate, a read gate and a servo gate are in an assertion state or a negation state. For example, the gate detection unit 510 performs a write process when it is detected that a write gate is asserted. The gate detection unit 510 stops a write process when it is detected that a write gate is negated. The gate detection unit 510 performs a read process when it is detected that a read gate is asserted. The gate detection unit 510 stops a read process when it is detected that a read gate is negated. The gate detection unit 510 performs a servo read process when it is detected that a servo gate is asserted. The gate detection unit 510 stops a servo read process when it is detected that a servo gate is negated. When it is detected that a write gate and a servo gate are asserted, the gate detection unit 510 outputs a fault signal to the HDC 60 via wire WR3 and stops the signal process of write data. The gate detection unit may be provided in the HDC 60.

The HDC 60 comprises a gate generation unit 610. The gate generation unit 610 generates various gates such as a write gate, a read gate and a servo gate in accordance with a command from the host 100, an instruction from the MPU 40, etc., and outputs them to the R/W channel 50, for example, the gate detection unit 510, via the wire RW, etc. For example, the gate generation unit 610 outputs a servo gate to the R/W channel 50, for example, the gate detection unit 510, via wire WR0, outputs a write gate to the R/W channel 50, for example, the gate detection unit 510, via wire RW1, and outputs a read gate to the R/W channel 50, for example, the gate detection unit 510, via wire WR2. A fault signal is input to the gate generation unit 610 from the R/W channel, for example, the gate detection unit 510, via wire WR3. Hereinafter, the expression "to assert and negate a particular gate" is used to refer to "to raise and turn down a particular gate" as a matter of course, and may be used to refer to "to generate a particular gate". The matter in which a particular gate is asserted and negated may be expressed as "to generate a particular gate".

When the head 15 is in a seeking state, the gate generation unit 610 generates a servo gate (a seek servo gate) corresponding to the head 15 in a seeking state. When the head 15 is not in a seeking state, for example, when the head 15 is allocated in a particular track, the gate generation unit 610 generates a servo gate (in other words, an on-track servo gate) corresponding to the head 15 allocated in the particular track. Hereinafter, the matter in which the head is allocated in a particular track may be referred to as "on-track". The term "servo gate" is used to indicate an on-track servo gate when no particular explanation is added.

When a short servo mode is in an on-state, the gate generation unit 610 generates a normal servo gate and a short servo gate and outputs the short servo gate to the gate detection unit 510 via the wire WR, etc. For example, when a short servo mode is in an on-state, the gate generation unit 610 generates a first normal servo gate and a short servo gate and outputs the first normal servo gate and the short servo gate to the gate detection unit 510 via the wire WR, etc. When a short servo mode is in an off-state, the gate generation unit 610 generates a plurality of different normal servo gates and outputs the normal servo gates to the gate detection unit 510 via the wire, etc. For example, when a short servo mode is in an off-state, the gate generation unit 610 generates a first normal servo gate and a second normal servo gate and outputs the first normal servo gate and the second normal servo gate to the gate detection unit 510 via the wire WR, etc. The gate generation unit 610 may further generate a normal servo gate different from the first normal servo gate and the second normal servo gate or may generate another short servo gate different from the above short servo gate.

FIG. 9 shows an example of a short servo read process at the time of a write process. FIG. 9 shows a write gate WG and a short servo gate SSG. These gates are asserted when they rise. The gates are negated when they fall. In FIG. 9, the horizontal axes of these gates indicate time t. In the horizontal axes of FIG. 9, time points T91, T92, T93, T94, T95 and T96 are shown. For example, time points T91 to T96 are equivalent to the time points particular times after the reference time points, respectively. Time points T91 to T96 may be equivalent to absolute time points, respectively. Time point T92 is equivalent to a time point after time point T91. Time point T93 is equivalent to a time point after time point T92. Time point T94 is equivalent to a time point after time point T93. Time point T95 is equivalent to a time point after time point T94. Time point T96 is equivalent to a time point after time point T95. Time point T93 is equivalent to the time point at which the write gate WG is negated. Time point T91 is equivalent to the time point at which degauss is started at the time of the negation of the write gate WG at time point T93. Time point T92 is equivalent to the time point at which degauss ends at the time of the negation of the write gate WG at time point T93. Degauss indicates that a recording current which is gradually damped is supplied from the head amplifier IC 30 to the write head 15W at short times when a write process is stopped. Time point T94 is equivalent to the time point at which the short servo gate SSG is asserted. Time point T95 is equivalent to the time point at which the short servo gate SSG is negated. Time point T96 is equivalent to the time point at which the write gate WG is asserted.

The difference value between time points T91 and T92 is equivalent to time DGT of degauss (in other words, degauss time). The difference value between time points T93 and T94 is equivalent to difference time WRT between the time of the negation of the write gate WG and the time of the assertion of the short servo gate SSG. The difference value between time points T94 and T95 is equivalent to time SSVT of short servo read (in other words, short servo read time). The difference value between time points T92 and T93 and the difference value between time points T95 and T96 are equivalent to time (read write gap time) RWGT corresponding to a read write gap. Difference time WRT is equivalent to the time (write transition time WRT) of the transition from a write process to a servo read process.

FIG. 9 also shows track TRa of the disk 10. Track TRa includes data sectors DSC and servo sectors SS. In track TRa, the data sectors DSC and the servo sectors SS are alternately provided in a circumferential direction. The data sectors DSC and the servo sectors SS are adjacent to each other in a circumferential direction and do not include a gap, etc., between them. Each data sector DSC includes an extended data region EDR. The extended data region EDR is equivalent to the region of the servo sector SS overwritten with user data in a write process in a short servo mode. For example, the extended data region EDR is a region which is not used in a servo read process in the servo sector SS. For example, the extended data region EDR is a region which is not used in a short servo read process in the servo sector SS. The servo sector SS includes a degauss region DGR. The degauss region DGR is a particular region overwritten with particular data by degauss in the servo sector SS. For example, the degauss region DGR is a region which is not used in a servo read process in the servo sector SS. For example, the degauss region DGR is a region which is not used in a short servo read process in the servo sector SS. For example, the extended data region EDR and the degauss region DGR are equivalent to regions to which a preamble is written before overwriting with particular data is applied. In the example shown in FIG. 9, the extended data region EDR is adjacent to the degauss region DGR in a circumferential direction. In the servo sector SS, the region SRR excluding the degauss region DGR may be referred to as a servo read region SRR. The servo read region SRR is a region which is used in a servo read process in the servo sector SS. The servo read region SRR includes a short servo read region SSR. The servo read region SRR includes, for example, a preamble, a servo mark, a gray code, PAD and burst data. The short servo read region SSR is a region to which short servo read is applied in the servo sector SS. The short servo read region SSR includes, for example, burst data. The length of the short servo read region SSR is less than that of the servo read region SRR.

FIG. 9 shows circumferential positions CP91, CP92, CP93, CP94, PC95 and CP96 of track TRa. Circumferential positions CP91 to CP96 are arranged in a read/write direction in this order. Circumferential position CP91 is equivalent to the distal end portion of the servo sector SS in a forward direction (simply, the distal end portion) and is equivalent to the distal end portion of the degauss region DGR. Circumferential position CP92 is equivalent to a circumferential position between circumferential positions CP91 and CP93 and is equivalent to the distal end portion of the degauss region DGR in a backward direction (simply, the rear end portion). Circumferential position CP93 is equivalent to a circumferential position between circumferential positions CP92 and CP94. Circumferential position CP94 is equivalent to a circumferential position between circumferential positions CP93 and CP95 and is equivalent to the distal end portion of the short servo read region SSR. Circumferential position CP95 is equivalent to a circumferential position between circumferential positions CP94 and CP96, is equivalent to the rear end portion of the short servo region SSR and is equivalent to the rear end portion of the servo sector SS. Circumferential position CP96 is equivalent to a circumferential position behind circumferential position CP95. For example, the read head 15R is located at circumferential position CP91 at time point T91. The read head 15R is located at circumferential position CP92 at time point T92. The read head 15R is located at circumferential position CP93 at time point T93. The read head 15R is located at circumferential position CP94 at time point T94. The read head 15R is located at circumferential position CP95 at time point T95. The read head 15R is located at circumferential position CP96 at time point T96. FIG. 9 shows the read head 15R with respect to track TRa at time point T93 when the write gate WG is negated, the write head 15W corresponding to the read head 15R at time point T93, the read head 15R with respect to track TRa at time point T96 when the write gate WG is asserted, and the write head 15W corresponding to the read head 15R at time point T96.

In the example shown in FIG. 9, the system controller 130 negates the write gate WG at time point T93 so as not to write particular data to the servo sector SS, for example, the servo read region SRR, in a write process. The system controller 130 asserts the short servo gate SSG at time point T94 the write transition time WRT after time point T93 at which the write gate WG is negated. The system controller 130 negates the short servo gate SSG at time point T95 the short servo read time SSVT after time point T94 at which the short servo gate SSG is asserted. The system controller 130 asserts the write gate WG at time point T96 the read write gap time RWGT after time point T95 at which the short servo gate SSG is negated.

FIG. 10 shows an example of a short servo read process at the time of a read process. FIG. 10 shows a read gate RG and a short servo gate SSG. These gates are asserted when they rise. The gates are negated when they fall. In FIG. 10, the horizontal axes of these gates indicate time t. In the horizontal axes of FIG. 10, time points T101, T102, T103 and T104 are shown. For example, time points T101 to T104 are equivalent to the time points from the time point at which particular data is read at a particular circumferential position. For example, time points T101 to T104 are equivalent to the time points particular times after the reference time points, respectively. Time points T101 to T104 may be equivalent to absolute time points, respectively. Time point T102 is equivalent to a time point after time point T101. Time point T103 is equivalent to a time point after time point T102. Time point T104 is equivalent to a time point after time point T103. Time point T101 is equivalent to the time point at which the read gate RG is negated and a time point corresponding to the start position of the degauss region DGR. Time point T102 is equivalent to a time point corresponding to the end position of the degauss region DGR. Time point T103 is equivalent to the time point at which the short servo gate SSG is asserted. Time point T104 is equivalent to the time point at which the short servo gate SSG is negated.

The difference value between time points T101 and T102 is equivalent to the degauss time DGT. The difference value between time points T102 and T103 is equivalent to the sum of the read write gap time RWGT and the write transition time WRT. The difference value between time points T103 and T104 is equivalent to the short servo read time SSVT.

FIG. 10 shows a particular track TRa of the disk 10. FIG. 10 shows circumferential positions CP101, CP102, CP103 and CP104 of track TRa. Circumferential positions CP101 to CP104 are arranged in a read/write direction in this order. Circumferential position CP101 is equivalent to the distal end portion of the servo sector SS and is equivalent to the distal end portion of the degauss region DGR. Circumferential position CP102 is equivalent to a circumferential position between circumferential positions CP101 and CP103 and is equivalent to the rear end portion of the degauss region DGR. Circumferential position CP103 is equivalent to a circumferential position between circumferential positions CP102 and CP104 and is equivalent to the distal end portion of the short servo read region. Circumferential position CP104 is equivalent to a circumferential position behind circumferential position CP103, is equivalent to the rear end portion of the short servo read region SSR and is equivalent to the rear end portion of the servo sector SS. For example, the read head 15R is located at circumferential position CP101 at time point T101. The read head 15R is located at circumferential position CP102 at time point T102. The read head 15R is located at circumferential position CP103 at time point T103. The read head 15R is located at circumferential position CP104 at time point T104. FIG. 10 shows the read head 15R with respect to track TRa at time point T101 when the read gate RG is negated, and the read head 15R with respect to track TRa at time point T104 when the read gate RG is asserted and further when the short servo gate SSG is negated.

In the example shown in FIG. 10, the system controller 130 negates the read gate RG at time point T101 in a read process. The system controller 130 asserts the short servo gate at time point T103 the degauss time DGT, the read write gap time RWGT and the write transition time WRT after time point T101 at which the read gate RG is negated. The system controller 130 negates the short servo gate SSG at time point T104 the short servo read time SSVT after time point T103 at which the short servo gate SSG is asserted.

Figure 11:
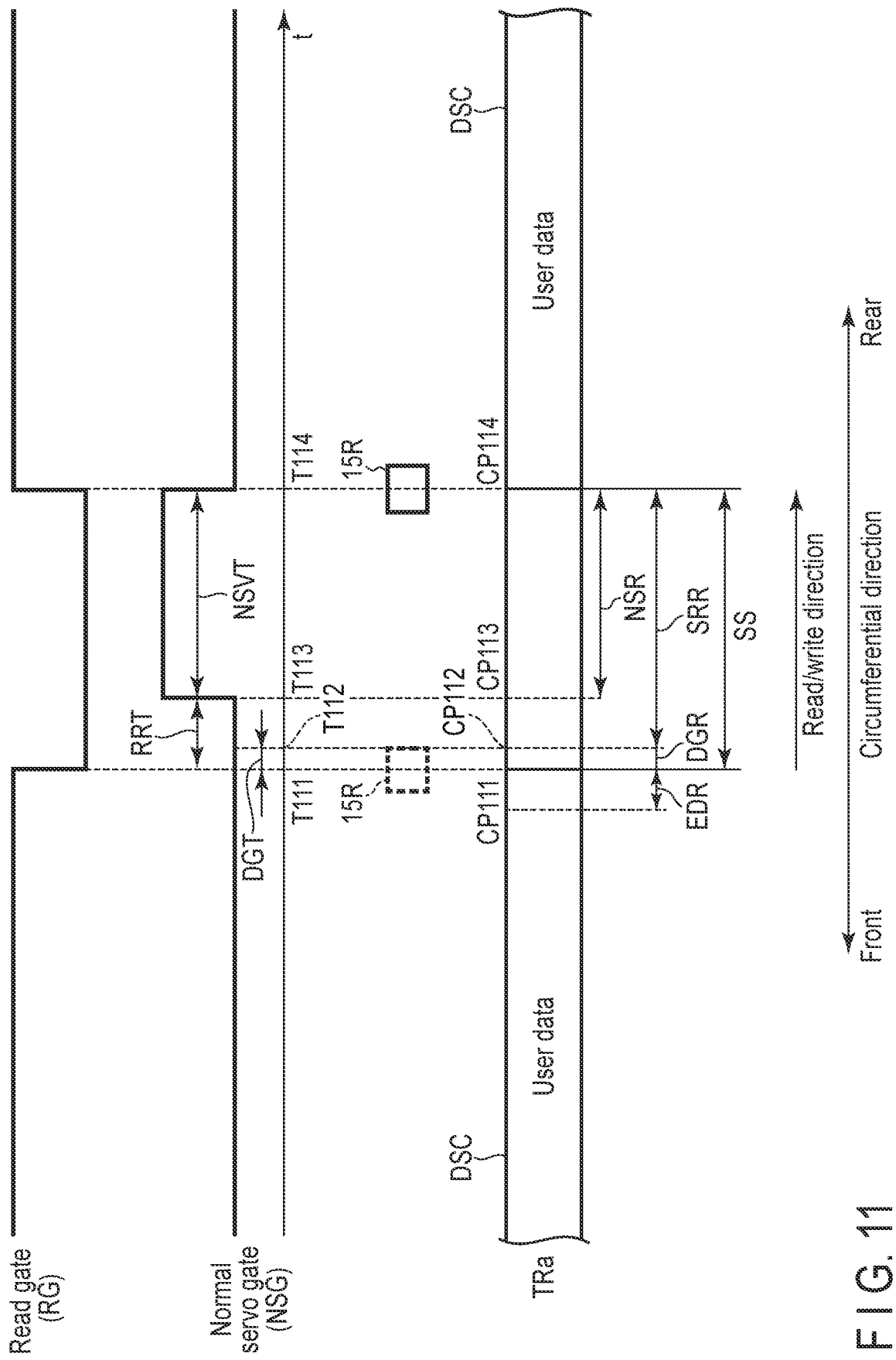
FIG. 11 is a diagram showing an example of a normal servo read process at the time of a read process.

FIG. 11 is a diagram showing an example of a normal servo read process at the time of a read process. FIG. 11 shows a read gate RG and a normal servo gate NSG. These gates are asserted when they rise. The gates are negated when they fall. In FIG. 11, the horizontal axes of these gates indicate time t. In the horizontal axes of FIG. 11, time points T111, T112, T113 and T114 are shown. For example, time points T111 to T114 are equivalent to the time points particular times after the reference time points, respectively. Time points T111 to T114 may be equivalent to absolute time points, respectively. Time point T112 is equivalent to a time point after time point T111. Time point T113 is equivalent to a time point after time point T112. Time point T114 is equivalent to a time point after time point T113. Time point T111 is equivalent to the time point at which the read gate RG is negated and a time point corresponding to the start position of the degauss region DGR. Time point T112 is equivalent to a time point corresponding to the end position of the degauss region DGR. Time point T113 is equivalent to the time point at which the normal servo gate NSG is asserted. Time point T114 is equivalent to the time point at which the normal servo gate NSG is negated.

The difference value between time points T111 and T112 is equivalent to the degauss time DGT. The difference value between time points T111 and T113 is equivalent to time (read transition time) RRT of the transition from the read process to the servo read process of user data. The difference value between time points T113 and T114 is equivalent to time (normal servo read time) NSVT of normal servo read.

FIG. 11 shows a particular track TRa of the disk 10. In the example shown in FIG. 11, the servo region SRR includes a normal servo read region NSR. For example, the normal servo read region NSR is a region to which normal servo read is applied in the servo sector SS. The normal servo read region NSR includes, for example, a preamble, a servo mark, a gray code, PAD and burst data. The length of the normal servo read region NSR is less than that of the servo read region SRR and greater than that of the short servo read region SSR.

FIG. 11 shows circumferential positions CP111, CP112, CP113 and CP114 of track TRa. Circumferential positions CP111 to CP114 are arranged in a read/write direction in this order. Circumferential position CP111 is equivalent to the distal end portion of the servo sector SS and is equivalent to the distal end portion of the degauss region DGR. Circumferential position CP112 is equivalent to a circumferential position between circumferential positions CP111 and CP113 and is equivalent to the rear end portion of the degauss region DGR. Circumferential position CP113 is equivalent to a circumferential position between circumferential positions CP112 and CP114 and is equivalent to the distal end portion of the normal servo read region NSR. Circumferential position CP114 is equivalent to a circumferential position behind circumferential position CP113 and is equivalent to the rear end portion of the normal servo read region NSR. For example, the read head 15R is located at circumferential position CP111 at time point T111. The read head 15R is located at circumferential position CP112 at time point T112. The read head 15R is located at circumferential position CP113 at time point T113. The read head 15R is located at circumferential position CP114 at time point T114. FIG. 11 shows the read head 15R with respect to track TRa at time point T111 when the read gate RG is negated, and the read head 15R with respect to track TRa at time point T114 when the read gate RG is asserted and further when the normal servo gate NSG is negated.

In the example shown in FIG. 11, the system controller 130 negates the read gate RG at time point T111 in a read process. The system controller 130 asserts the normal servo gate NSG at time point T113 the read transition time RRT after time point T111 at which the read gate RG is negated. The system controller 130 negates the normal servo gate NSG at time point T114 the normal servo read time NSVT after time point T113 at which the normal servo gate NSG is asserted.

FIG. 12 shows an example of a normal servo read process. FIG. 12 shows a first normal servo gate NSG1. The first normal servo gate NSG1 is asserted when it rises. The first normal servo gate NSG1 is negated when it falls. In FIG. 12, the horizontal axis of the first normal servo gate NSG1 indicates time t. In the horizontal axis of FIG. 12, time points NST11 and NST12 are shown. For example, time points NST11 and NST12 are equivalent to the time points particular times after the reference time points, respectively. Time points NST11 and NST12 may be equivalent to absolute time points, respectively. Time point NST12 is equivalent to a time point after time point NST11. Time point NST11 is equivalent to the time point at which the first normal servo gate NSG1 is asserted. Time point NST12 is equivalent to the time point at which the first normal servo gate NSG1 is negated. In FIG. 12, servo gate length NSVL11 of the first normal servo gate NSG1 is equivalent to the time from time point NST11 to time point NST12.

FIG. 12 shows track TRb of the disk 10. Track TRb includes data sectors DSC and servo sectors SS2. In FIG. 12, each servo sector SS2 is equivalent to a normal servo sector NSV. In track TRb, the data sectors DSC and servo sectors SS2 are alternately provided in a circumferential direction. The data sectors DSC and servo sectors SS2 are adjacent to each other in a circumferential direction and do not include a gap, etc., between them. FIG. 12 shows circumferential positions CP121 and CP122 of track TRb. Circumferential positions CP121 and CP122 are arranged in a read/write direction in this order. Circumferential position CP121 is equivalent to the circumferential position of the distal end portion of normal servo sector SS2. Circumferential position CP122 is equivalent to the circumferential position of the rear end portion of normal servo sector SS2. Circumferential position CP122 is equivalent to a circumferential position behind circumferential position CP121 and is equivalent to the circumferential position of the rear end portion of the post code. For example, the read head 15R is located at circumferential position CP121 at time point NST11 and is located at circumferential position CP122 at time point NST12.

In the example shown in FIG. 12, the system controller 130 asserts the first normal servo gate NSG1 at time point NST11 and starts the normal servo read of normal servo sector SS2 from the distal end portion of the preamble. The system controller 130 applies normal servo read to the preamble, servo mark, gray code, PAD, N burst, Q burst and post code of normal servo sector SS2 in this order. The system controller 130 negates the first normal servo gate NSG1 at time point NST12 and finishes the normal servo read of normal servo sector SS2 in the rear end portion of the post code.

Figure 13:
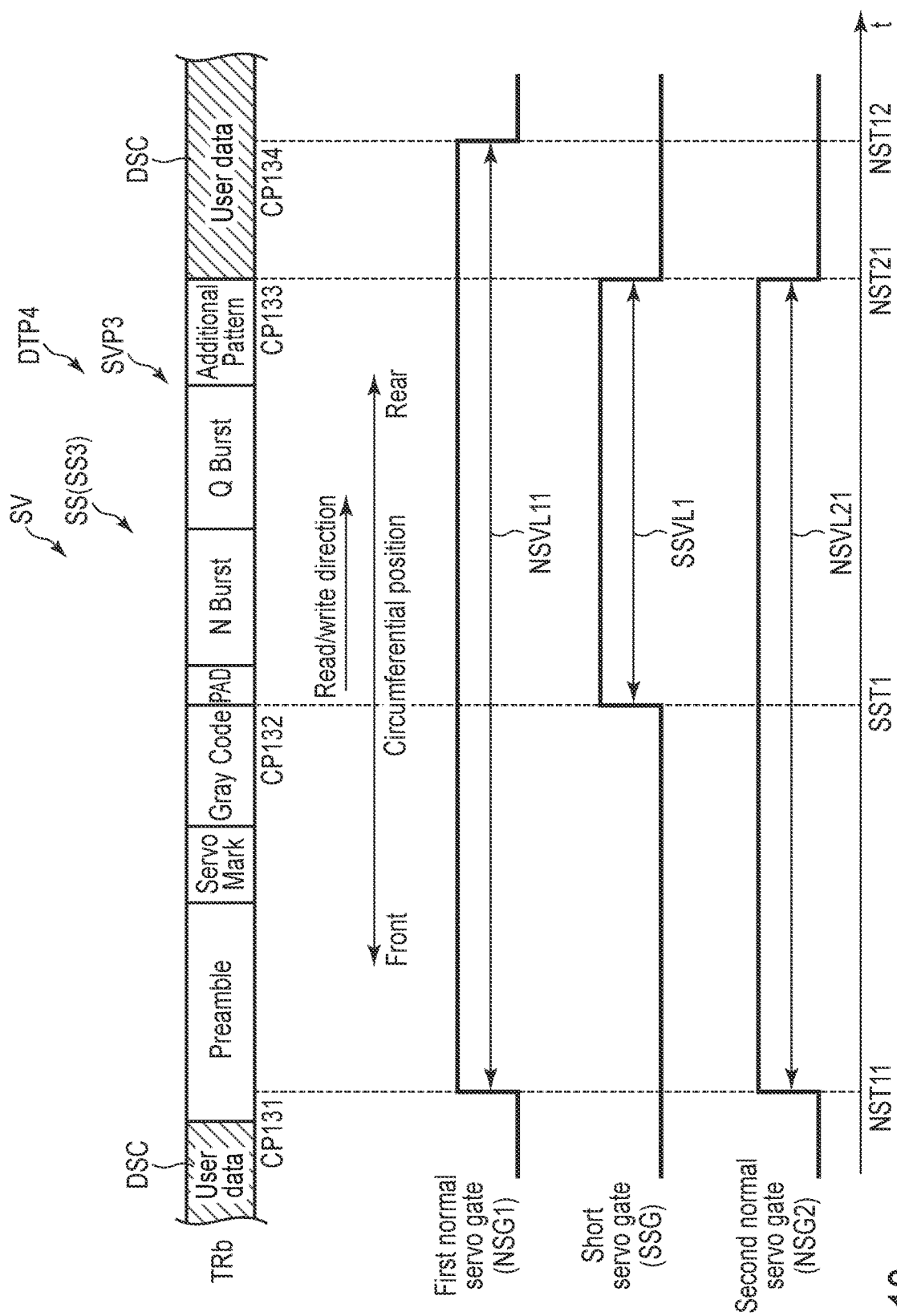
FIG. 13 is a diagram showing an example of a short servo read process and a normal servo read process.

FIG. 13 is a diagram showing an example of a short servo read process and a normal servo read process. FIG. 13 shows a second normal servo gate NSG2 and a short servo gate SSG. FIG. 13 also shows the first normal servo gate NSG1 shown in FIG. 12 for comparison. These gates are asserted when they rise. The gates are negated when they fall. In FIG. 13, the horizontal axes of these gates indicate time t. In the horizontal axes of FIG. 13, time points NST11, SST1, NST21 and NST12 are shown. For example, time points SST1 and NST21 are equivalent to the time points particular times after the reference time points, respectively. Time points SST1 and NST21 may be equivalent to absolute time points, respectively. Time point SST1 is equivalent to a time point after time point NST11. Time point NST21 is equivalent to a time point after time point SST1. Time point NST12 is equivalent to a time point after time point NST21. Time point NST11 is equivalent to the time point at which the first normal servo gate NSG1 and the second normal servo gate NSG2 are asserted. Time point SST1 is equivalent to the time point at which the short servo gate SSG is asserted. Time point NST21 is equivalent to the time point at which the short servo gate SSG and the second normal servo gate NSG2 are negated. In FIG. 13, servo gate length NSVL21 of the second normal servo gate NSG2 is equivalent to the time from time point NST11 to time point NST21. In FIG. 13, servo gate length SSVL1 of the short servo gate SSG is equivalent to the time from time point SST1 to time point NST21. Servo gate length NSVL21 is greater than servo gate length SSVL1. Servo gate length NSVL11 is greater than servo gate length NSVL21. The difference value between servo gate length NSVL11 and servo gate length NSVL21 is equivalent to a time corresponding to the difference value between the length of the post code and the length of the additional pattern. The servo gate length of the first normal servo gate NSG1 may be equal to that of the second normal servo gate NSG2 or may be less than that of the second normal servo gate NSG2.

FIG. 13 shows track TRb of the disk 10. Track TRb includes data sectors DSC and servo sectors SS3. In FIG. 13, each servo sector SS3 is equivalent to a short servo sector SSV. In track TRb, the data sectors DSC and servo sectors SS3 are alternately provided in a circumferential direction. The data sectors DSC and servo sectors SS3 are adjacent to each other in a circumferential direction and do not include a gap, etc., between them. FIG. 13 shows circumferential positions CP131, CP132, CP133 and CP134 of track TRb. Circumferential positions CP131 to CP134 are arranged in a read/write direction in this order. Circumferential position CP131 is equivalent to the distal end portion of short servo sector SS3. Circumferential position CP132 is equivalent to a circumferential position between circumferential positions CP131 and CP133 and is equivalent to the circumferential position of the distal end portion of the PAD. Circumferential position CP133 is equivalent to a circumferential position between circumferential positions CP132 and CP134 and is equivalent to the circumferential position of the rear end portion of the additional pattern. Circumferential position CP134 is equivalent to a circumferential position behind circumferential position CP133. For example, the read head 15R is located at circumferential position CP131 at time point NST11. The read head 15R is located at circumferential position CP132 at time point SST1. The read head 15R is located at circumferential position CP133 at time point NST21. The read head 15R is located at circumferential position CP134 at time point NST12.

In the example shown in FIG. 13, the system controller 130 asserts the short servo gate SSG at time point SST1 and starts the short servo read of short servo sector SS3 from the PAD in track TRb. In the example shown in FIG. 13, the system controller 130 may assert the short servo gate SSG at a time point corresponding to the gray code before time point SST1 in track TRb. The system controller 130 applies short servo read to the PAD, N burst, Q burst and additional pattern of short servo sector SS3 in this order in track TRb. The system controller 130 negates the short servo gate SSG at time point NST21 and ends the short servo read of short servo sector SS3 in the rear end portion of the additional pattern in track TRb.

In the example shown in FIG. 13, the system controller 130 asserts the second normal servo gate NSG2 at time point NST11 and starts the normal servo read of short servo sector SS3 from the distal end portion of the preamble in track TRb. The system controller 130 applies normal servo read to the preamble, servo mark, gray code, PAD, N burst, Q burst and additional pattern of short servo sector SS3 in this order in track TRb. The system controller 130 negates the second normal servo gate NSG2 at time point NST21 and ends the normal servo read of short servo sector SS3 in the rear end portion of the additional pattern in track TRb.

In the example shown in FIG. 13, the length of the servo data subjected to normal servo read in accordance with the second normal servo gate NSG2 is less than that of the servo data subjected to normal servo read in accordance with the first normal servo gate NSG1. In other words, the time in which normal servo read is performed in accordance with the second normal servo gate NSG2 is shorter than the time in which normal servo read is performed in accordance with the first normal servo gate NSG1.

Figure 14:
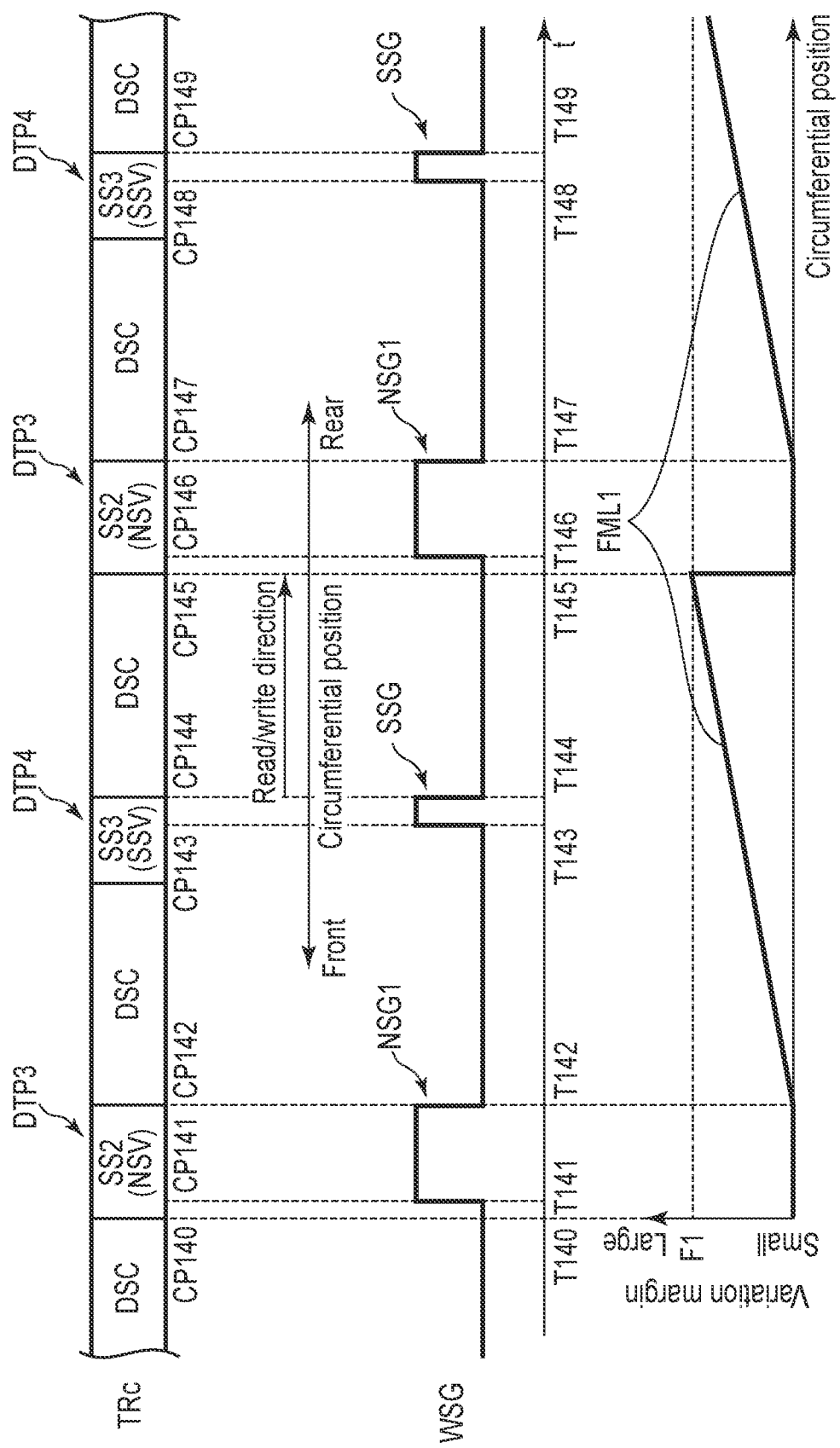
FIG. 14 is a diagram showing an example of a servo read process at the time of a write process.

FIG. 14 is a diagram showing an example of a servo read process at the time of a write process. FIG. 14 shows a servo gate WSG at the time of a write process. In FIG. 14, servo gate WSG includes a plurality of first normal servo gates NSG1 and a plurality of short servo gates SSG. In servo gate WSG shown in FIG. 14, the first normal servo gates NSG1 and the short servo gates SSG are alternately generated at intervals between them. In FIG. 14, each first normal servo gate NSG1 corresponds to servo sector SS2, and each short servo sector SSG corresponds to servo sector SS3. In FIG. 14, the horizontal axis of servo gate WSG indicates time t. In the horizontal axis of FIG. 14, time points T140, T141, T142, T143, T144, T145, T146, T147, T148 and T149 are shown. For example, time points T140 to T149 are equivalent to the time points particular times after the reference time points, respectively. Time points T140 to T149 may be equivalent to absolute time points, respectively. Time point T141 is equivalent to a time point after time point T140. Time point T142 is equivalent to a time point after time point T141. Time point T143 is equivalent to a time point after time point T142. Time point T144 is equivalent to a time point after time point T143. Time point T145 is equivalent to a time point after time point T144. Time point T146 is equivalent to a time point after time point T145. Time point T147 is equivalent to a time point after time point T146. Time point T148 is equivalent to a time point after time point T147. Time point T149 is equivalent to a time point after time point T148. Time point T141 is equivalent to the time point at which a first normal servo gate NSG1 is asserted. Time point T142 is equivalent to the time point at which the first normal servo gate NSG1 is negated. Time point T143 is equivalent to the time point at which a short servo gate SSG is asserted. Time point T144 is equivalent to the time point at which the short servo gate SSG is negated. Time point T146 is equivalent to the time point at which a first normal servo gate NSG1 is asserted. Time point T147 is equivalent to the time point at which the first normal servo gate NSG1 is negated. Time point T148 is equivalent to the time point at which a short servo gate SSG is asserted. Time point T149 is equivalent to the time point at which the short servo gate SSG is negated.

FIG. 14 shows track TRc of the disk 10. Track TRc includes a plurality of sectors SS2, a plurality of sectors SS3 and a plurality of data sectors DSC. In track TRc shown in FIG. 14, sectors SS2 and sectors SS3 are alternately provided across the intervening data sectors DSC. In FIG. 14, each sector SS2 is equivalent to a normal servo sector NSV, and each sector SS3 is equivalent to a short servo sector SSV. In the example shown in FIG. 14, data patterns DTP3 and data patterns DTP4 are alternately provided in track TRc. In other words, in track TRc, in a circumferential direction, normal servo sectors SS2 and short servo sectors SS3 are alternately provided at intervals, and the data sectors DSC are provided between normal servo sectors SS2 and short servo sectors SS3. For example, when successive numbers are added to all the servo sectors of track TRc in order, normal servo sectors SS2 are equivalent to odd-numbered servo sectors, and short servo sectors SS3 are equivalent to even-numbered servo sectors.

FIG. 14 shows circumferential positions CP140, CP141, CP142, CP143, CP144, CP145, CP146, CP147, CP148 and CP149 of track TRc. Circumferential positions CP140 to CP149 are arranged in a read/write direction in this order. Circumferential position CP140 is equivalent to the circumferential position of the distal end portion of normal servo sector SS2. Circumferential position CP141 is equivalent to a circumferential position between circumferential positions CP140 and CP142. Circumferential position CP142 is equivalent to a circumferential position between circumferential positions CP141 and CP143 and is equivalent to the circumferential position of the rear end portion of normal servo sector SS2. Circumferential position CP143 is equivalent to a circumferential position between circumferential positions CP142 and CP144 and is equivalent to a particular circumferential position of short servo sector SS3. Circumferential position CP144 is equivalent to a circumferential position between circumferential positions CP143 and CP145 and is equivalent to the circumferential position of the rear end portion of short servo sector SS3. Circumferential position CP145 is equivalent to a circumferential position between circumferential positions CP144 and CP146 and is equivalent to the circumferential position of the distal end portion of normal servo sector SS2. Circumferential position CP146 is equivalent to a circumferential position between circumferential positions CP145 and CP147 and is equivalent to a particular circumferential position of normal servo sector SS2. Circumferential position CP147 is equivalent to a circumferential position between circumferential positions CP146 and CP148 and is equivalent to the circumferential position of the rear end portion of normal servo sector SS2. Circumferential position CP148 is equivalent to a circumferential position between circumferential positions CP147 and CP149 and is equivalent to a particular circumferential position of short servo sector SS3. Circumferential position CP149 is equivalent to a circumferential position behind circumferential position CP148 and is equivalent to the circumferential position of the rear end portion of short servo sector SS3. For example, the read head 15R is located at circumferential position CP140 at time point T140. The read head 15R is located at circumferential position CP141 at time point T141. The read head 15R is located at circumferential position CP142 at time point T142. The read head 15R is located at circumferential position CP143 at time point T143. The read head 15R is located at circumferential position CP144 at time point T144. The read head 15R is located at circumferential position CP145 at time point T145. The read head 15R is located at circumferential position CP146 at time point T146. The read head 15R is located at circumferential position CP147 at time point T147. The read head 15R is located at circumferential position CP148 at time point T148. The read head 15R is located at circumferential position CP149 at time point T149.

FIG. 14 shows change FML1 in the shift (variation margin) of a write/read process with respect to the disk 10 in a circumferential direction (in other words, change FML1 in the variation margin). In change FML1 in the variation margin shown in FIG. 14, the horizontal axis indicates the circumferential position, and the vertical axis indicates the absolute value of the variation margin. In FIG. 14, the position moves in a read/write direction toward the distal end of the arrow of the horizontal axis. In FIG. 14, the absolute value of the variation margin is increased toward the distal end of the arrow of the vertical axis, and is decreased toward the side opposite to the distal end of the arrow of the vertical axis. In the vertical axis of FIG. 14, absolute value F1 of the variation margin is shown.

In the example shown in FIG. 14, in the write process of track TRc, the system controller 130 turns on a short servo mode, applies normal servo read to normal servo sector SS2 based on a first normal servo gate NSG1 and applies short servo read to short servo sector SS3 based on a short servo gate SSG.

In the example shown in FIG. 14, in the write process of track TRc, the system controller 130 writes user data to the data sector DSC in a read/write direction until time point T141. In the write process of track TRc, the system controller 130 asserts the first normal servo gate NSG1 of servo gate WSG of FIG. 14 at time point T141, starts the normal servo read of the servo data of normal servo sector SS2, negates the first normal servo gate NSG1 of servo gate WSG of FIG. 14 at time point T142, and finishes the normal servo read of the servo data of normal servo sector SS2.

In the write process of track TRc, the system controller 130 writes user data to the data sector DSC in a read/write direction until time point T143. In the write process of track TRc, the system controller 130 asserts the short servo gate SSG of servo gate WSG of FIG. 14 at time point T143, starts the normal servo read of the servo data of short servo sector SS3, negates the short servo gate SSG of servo gate WSG of FIG. 14 at time point T144, and finishes the normal servo read of the servo data of short servo sector SS3.

In the write process of track TRc, the system controller 130 writes user data to the data sector DSC in a read/write direction until time point T146. In the write process of track TRc, the system controller 130 asserts the first normal servo gate NSG1 of servo gate WSG of FIG. 14 at time point T146, starts the normal servo read of the servo data of normal servo sector SS2, negates the first normal servo gate NSG1 of servo gate WSG of FIG. 14 at time point T147, and finishes the normal servo read of the servo data of normal servo sector SS2.

In the write process of track TRc, the system controller 130 writes user data to the data sector DSC in a read/write direction until time point T148. In the write process of track TRc, the system controller 130 asserts the short servo gate SSG of servo gate WSG of FIG. 14 at time point T148, starts the short servo read of the servo data of short servo sector SS3, negates the short servo gate SSG of servo gate WSG of FIG. 14 at time point T149, and finishes the short servo read of the servo data of short servo sector SS3.

The change in the variation margin becomes the absolute value of the minimum variation margin immediately after the normal servo read of servo data, and becomes the absolute value of the maximum variation margin immediately before the normal servo read of servo data. For example, the change in the variation margin becomes the absolute value (in other words, the minimum margin) of the minimum variation margin immediately after a servo mark (or servo address mark) is read, and becomes the absolute value (in other words, the maximum margin) of the maximum variation margin immediately before the normal servo read of a servo mark. In the example shown in FIG. 14, in change FML1 in the variation margin, the absolute value of the variation margin is 0 at time points T142 and T147 immediately after the normal servo read of normal servo sector SS2, and the absolute value of the variation margin is maximum margin F1 at time point T145 immediately before the normal servo read of normal servo sector SS2. If the variation margin (the shift in a rotational direction) is large, the data region end portion approaches the servo region start portion. Thus, in the data length in view of the maximum variation margin, the data length is designed so as not to overwrite the region to be subjected to servo read. If the variation margin is large, the format efficiency is decreased. Thus, the variation margin should be preferably small.

Figure 15:
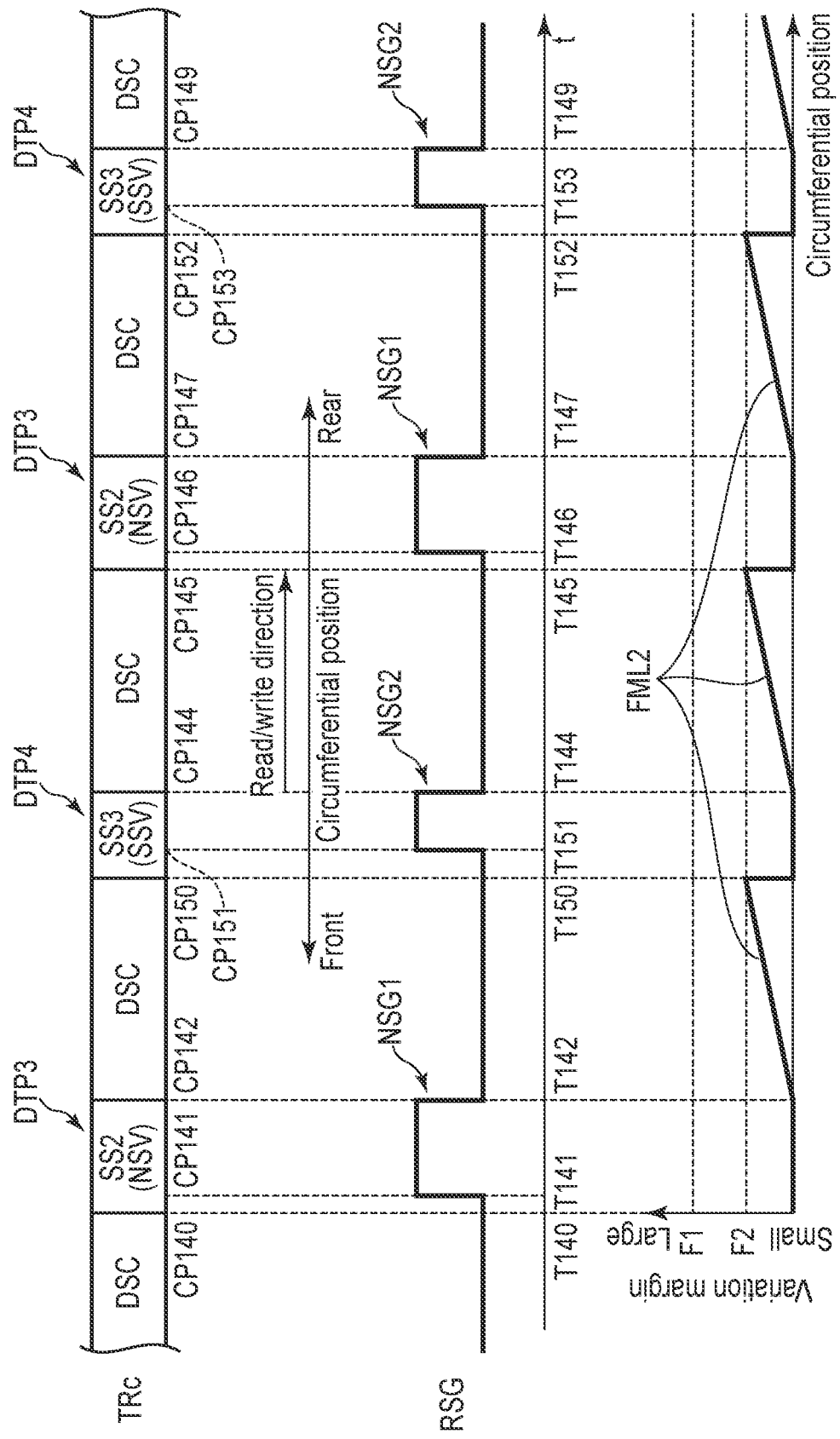
FIG. 15 is a diagram showing an example of a servo read process at the time of a read process according to the first embodiment.

FIG. 15 is a diagram showing an example of a servo read process at the time of a read process according to the present embodiment. FIG. 15 shows a servo gate RSG at the time of a read process. In FIG. 15, servo gate RSG includes a plurality of first normal servo gates NSG1 and a plurality of second normal servo gates NSG2. In servo gate RSG shown in FIG. 15, the first normal servo gates NSG1 and the second normal servo gates NSG2 are alternately generated at intervals between them. In FIG. 15, each first normal servo gate NSG1 corresponds to normal sector SS2, and each second normal servo gate NSG2 corresponds to short servo sector SS3. In FIG. 15, the horizontal axis of servo gate RSG indicates time t. In the horizontal axis of FIG. 11, time points T150, T151, T152 and T153 are further shown. For example, time points T150 to T153 are equivalent to the time points particular times after the reference time points, respectively. Time points T150 to T153 may be equivalent to absolute time points, respectively. Time point T150 is equivalent to a time point after time point T142 and before time point T151. Time point T151 is equivalent to a time point after time point T150 and before time point T144. Time point T152 is equivalent to a time point after time point T147 and before time point T153. Time point T153 is equivalent to a time point after time point T152 and before time point T149. Time point T151 is equivalent to the time point at which a second normal servo gate NSG2 is asserted. Time point T144 is equivalent to the time point at which the second normal servo gate NSG2 is negated. Time point T153 is equivalent to the time point at which a second normal servo gate NSG2 is asserted. Time point T149 is equivalent to the time point at which the second normal servo gate NSG2 is negated.

FIG. 15 further shows circumferential positions CP150, CP151, CP152 and CP153 of track TRc. Circumferential positions CP150 to CP153 are arranged at intervals in a read/write direction in this order. Circumferential position CP150 is equivalent to a circumferential position between circumferential positions CP142 and CP151 and is equivalent to the circumferential position of the distal end portion of short servo sector SS3. Circumferential position CP151 is equivalent to a circumferential position between circumferential positions CP150 and CP144 and is equivalent to a particular circumferential position of short servo sector SS3. Circumferential position CP152 is equivalent to a circumferential position between circumferential positions CP147 and CP153 and is equivalent to the circumferential position of the distal end portion of short servo sector SS3. Circumferential position CP153 is equivalent to a circumferential position between circumferential positions CP152 and CP149 and is equivalent to a particular circumferential position of short servo sector SS3. For example, the read head 15R is located at circumferential position CP150 at time point T150. The read head 15R is located at circumferential position CP151 at time point T151. The read head 15R is located at circumferential position CP152 at time point T152. The read head 15R is located at circumferential position CP153 at time point T153.

FIG. 15 shows change FML2 in the variation margin. In change FML2 in the variation margin shown in FIG. 15, the horizontal axis indicates the circumferential position, and the vertical axis indicates the absolute value of the variation margin. In FIG. 15, the position moves in a read/write direction toward the distal end of the arrow of the horizontal axis. In FIG. 15, the absolute value of the variation margin is increased toward the distal end of the arrow of the vertical axis, and is decreased toward the side opposite to the distal end of the arrow of the vertical axis. In the vertical axis of FIG. 15, absolute value F2 of the variation margin is further shown. Absolute value F2 of the variation margin is less than absolute value F1 of the variation margin.

In the example shown in FIG. 15, in the read process of track TRc, the system controller 130 turns off a short servo mode, applies normal servo read to normal servo sector SS2 based on the first normal servo gate NSG1 of servo gate RSG of FIG. 15, and applies normal servo read to short servo sector SS3 based on the second normal servo gate NSG2 of servo gate RSG of FIG. 15.

In the example shown in FIG. 15, in the read process of track TRc, the system controller 130 reads user data from the data sector DSC in a read/write direction until time point T141. In the read process of track TRc, the system controller 130 asserts the first normal servo gate NSG1 of servo gate RSG of FIG. 15 at time point T141, starts the normal servo read of the servo data of normal servo sector SS2, negates the first normal servo gate NSG1 of servo gate RSG of FIG. 15 at time point T142, and finishes the normal servo read of the servo data of normal servo sector SS2.

In the read process of track TRc, the system controller 130 reads user data from the data sector DSC in a read/write direction until time point T151. The system controller 130 asserts the second normal servo gate NSG2 of servo gate RSG of FIG. 15 at time point T151, starts the normal servo read of the servo data of short servo sector SS3, negates the second normal servo gate NSG2 of servo gate RSG of FIG. 15 at time point T144, and finishes the normal servo read of the servo data of short servo sector SS3.

In the read process of track TRc, the system controller 130 reads user data from the data sector DSC in a read/write direction until time point T146. In the read process of track TRc, the system controller 130 asserts the first normal servo gate NSG1 of servo gate RSG of FIG. 15 at time point T146, starts the normal servo read of the servo data of normal servo sector SS2, negates the first normal servo gate NSG1 of servo gate RSG of FIG. 15 at time point T147, and finishes the normal servo read of the servo data of normal servo sector SS2.

In the read process of track TRc, the system controller 130 reads user data from the data sector DSC in a read/write direction until time point T153. In the read process of track TRc, the system controller 130 asserts the second normal servo gate NSG2 of servo gate RSG of FIG. 15 at time point T153, starts the normal servo read of the servo data of short servo sector SS3, negates the second normal servo gate NSG2 of servo gate RSG of FIG. 15 at time point T149, and finishes the normal servo read of the servo data of short servo sector SS3.

In the example shown in FIG. 15, in change FML2 in the variation margin, the absolute value of the variation margin is 0 at time points T142 and T147 immediately after the normal servo read of normal servo sector SS2 and time points T144 and T149 immediately after the normal servo read of short servo sector SS3, and the absolute value of the variation margin is maximum margin F2 at time point T145 immediately before the normal servo read of normal servo sector SS2 and at time points T150 and T152 immediately before the normal servo read of short servo sector SS3.

Figure 16:
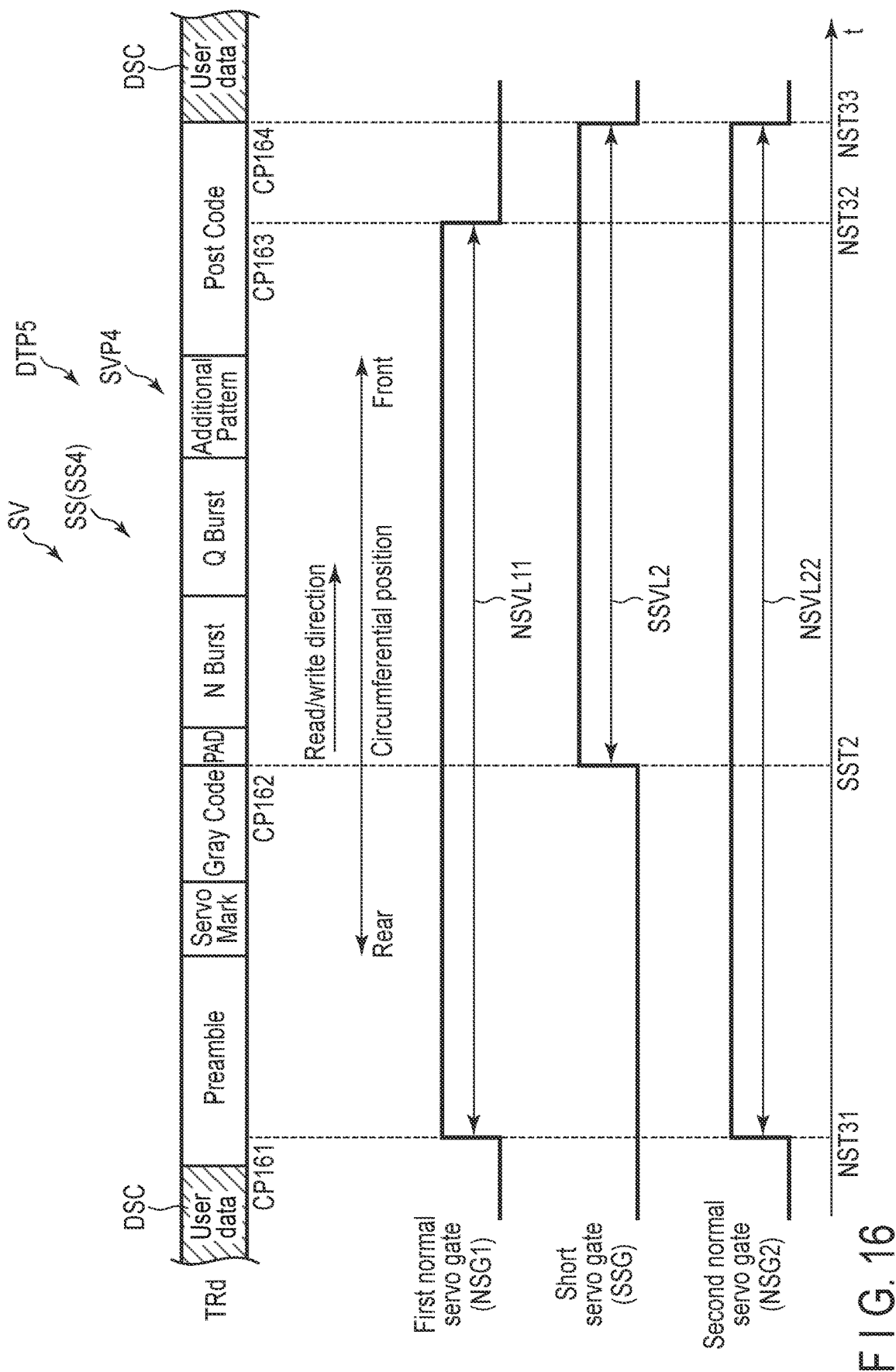
FIG. 16 is a diagram showing an example of a short servo read process and a normal servo read process.

FIG. 16 is a diagram showing an example of a short servo read process and a normal servo read process. FIG. 16 shows a second normal servo gate NSG2 and a short servo gate SSG. FIG. 16 also shows a first normal servo gate NSG1 for comparison. These gates are asserted when they rise. The gates are negated when they fall. In FIG. 16, the horizontal axes of these gates indicate time t. In the horizontal axes of FIG. 16, time points NST31, SST2, NST32 and NST33 are shown. For example, time points NST31, SST2, NST32 and NST33 are equivalent to the time points particular times after the reference time points, respectively. Time points NST31, SST2, NST32 and NST33 may be equivalent to absolute time points, respectively. Time point SST2 is equivalent to a time point after time point NST31. Time point NST32 is equivalent to a time point after time point SST2. Time point NST33 is equivalent to a time point after time point NST32. Time point NST31 is equivalent to the time point at which the first normal servo gate NSG1 and the second normal servo gate NSG2 are asserted. Time point SST2 is equivalent to the time point at which the short servo gate SSG is asserted. Time point NST32 is equivalent to the time point at which the first normal servo gate NSG1 is negated. Time point NST33 is equivalent to the time point at which the short servo gate SSG and the second normal servo gate NSG2 are negated. In FIG. 16, servo gate length NSVL22 of the second normal servo gate NSG2 is equivalent to the time from time point NST31 to time point NST33. In FIG. 16, servo gate length SSVL2 of the short servo gate SSG is equivalent to the time from time point SST2 to time point NST33. Servo gate length NSVL22 is greater than servo gate length SSVL2. Servo gate length NSVL22 is greater than servo gate length NSVL11. The difference value between servo gate length NSVL11 and servo gate length NSVL22 is equivalent to a time corresponding to the length of the additional pattern.

FIG. 16 shows track TRd of the disk 10. Track TRd includes data sectors DSC and servo sectors SS4. In FIG. 16, each servo sector SS4 is equivalent to a short servo sector SSV. In track TRd, the data sectors DSC and servo sectors SS4 are alternately provided in a circumferential direction. The data sectors DSC and servo sectors SS4 are adjacent to each other in a circumferential direction and do not include a gap, etc., between them. FIG. 16 shows circumferential positions CP161, CP162, CP163 and CP164 of track TRd. Circumferential positions CP161 to CP164 are arranged in a read/write direction in this order. Circumferential position CP161 is equivalent to the circumferential position of the distal end portion of short servo sector SS4. Circumferential position CP162 is equivalent to a circumferential position between circumferential positions CP161 and CP163 and is equivalent to the circumferential position of the distal end portion of the PAD. Circumferential position CP163 is equivalent to a circumferential position between circumferential positions CP162 and CP164 and is equivalent to a particular circumferential position of the post code. Circumferential position CP164 is equivalent to a circumferential position behind circumferential position CP163 and is equivalent to the circumferential position of the rear end portion of the post code. For example, the read head 15R is located at circumferential position CP161 at time point NST31. The read head 15R is located at circumferential position CP162 at time point SST2. The read head 15R is located at circumferential position CP163 at time point NST32. The read head 15R is located at circumferential position CP164 at time point NST33.

In the example shown in FIG. 16, the system controller 130 asserts the short servo gate SSG at time point SST2 and starts the short servo read of short servo sector SS4 from the PAD in track TRd. In the example shown in FIG. 16, the system controller 130 may assert the short servo gate SSG at a time point corresponding to the gray code before time point SST2 in track TRd. The system controller 130 applies short servo read to the PAD, N burst, Q burst, additional pattern and post code of short servo sector SS4 in track TRd in this order. The system controller 130 negates the short servo gate SSG at time point NST33 and ends the short servo read of short servo sector SS4 in the rear end portion of the post code in track TRd.

In the example shown in FIG. 16, the system controller 130 asserts the second normal servo gate NSG2 at time point NST31 and starts the normal servo read of short servo sector SS4 from the distal end portion of the preamble in track TRd. The system controller 130 applies normal servo read to the preamble, servo mark, gray code, PAD, N burst, Q burst, additional pattern and post code of short servo sector SS4 in track TRd in this order. The system controller 130 negates the second normal servo gate NSG2 at time point NST33 and ends the normal servo read of short servo sector SS4 in the rear end portion of the post code in track TRd.

In the example shown in FIG. 16, the length of the servo data subjected to normal servo read in accordance with the second normal servo gate NSG2 is greater than that of the servo data subjected to normal servo read in accordance with the first normal servo gate NSG1. In other words, the time in which normal servo read is performed in accordance with the second normal servo gate NSG2 is longer than the time in which normal servo read is performed in accordance with the first normal servo gate NSG1.

FIG. 17 is a diagram showing an example of a servo read process at the time of a write process. FIG. 17 shows a servo gate WSG at the time of a write process. In FIG. 17, servo gate WSG includes a plurality of first normal servo gates NSG1 and a plurality of short servo gates SSG. In servo gate WSG shown in FIG. 17, the first normal servo gates NSG1 and the short servo gates SSG are alternately generated at intervals between them. In FIG. 17, each first normal servo gate NSG1 corresponds to normal sector SS2, and each short servo gate SSG corresponds to short servo sector SS4. In FIG. 17, the horizontal axis of servo gate WSG indicates time t. In the horizontal axis of FIG. 17, time points T171, T172, T173 and T174 are further shown. For example, time points T171 to T174 are equivalent to the time points particular times after the reference time points, respectively. Time points T171 to T174 may be equivalent to absolute time points, respectively. Time point T171 is equivalent to a time point after time point T142 and before time point T172. Time point T172 is equivalent to a time point after time point T171 and before time point T145. Time point T173 is equivalent to a time point after time point T147 and before time point T174. Time point T174 is equivalent to a time point after time point T173. Time point T171 is equivalent to the time point at which a short servo gate SSG is asserted. Time point T172 is equivalent to the time point at which the short servo gate SSG is negated. Time point T173 is equivalent to the time point at which a short servo gate SSG is asserted. Time point T174 is equivalent to the time point at which the short servo gate SSG is negated.

FIG. 17 shows track TRe of the disk 10. Track TRe includes a plurality of sectors SS2, a plurality of sectors SS4 and a plurality of data sectors DSC. In track TRe shown in FIG. 17, sectors SS2 and sectors SS4 are alternately provided across the intervening data sectors DSC. In FIG. 17, each sector SS2 is equivalent to a normal servo sector NSV, and each sector SS4 is equivalent to a short servo sector SSV. In the example shown in FIG. 17, data patterns DTP3 and data patterns DTP5 are alternately provided in track TRe. In other words, in track TRe, in a circumferential direction, normal servo sectors SS2 and short servo sectors SS4 are alternately provided at intervals, and the data sectors DSC are provided between normal servo sectors SS2 and short servo sectors SS4. For example, when successive numbers are added to all the servo sectors of track TRe in order, normal servo sectors SS2 are equivalent to odd-numbered servo sectors, and short servo sectors SS4 are equivalent to even-numbered servo sectors.

FIG. 17 further shows circumferential positions CP171, CP172, CP173 and CP174 of track TRe. Circumferential positions CP171 to CP174 are arranged at intervals in a read/write direction in this order. Circumferential position CP171 is equivalent to a circumferential position between circumferential positions CP142 and CP172 and is equivalent to a particular circumferential position of short servo sector SS4. Circumferential position CP172 is equivalent to a circumferential position between circumferential positions CP171 and CP145 and is equivalent to the circumferential position of the rear end portion of short servo sector SS4. Circumferential position CP173 is equivalent to a circumferential position between circumferential positions CP147 and CP174 and is equivalent to a particular circumferential position of short servo sector SS4. Circumferential position CP174 is equivalent to a circumferential position behind circumferential position CP173 and is equivalent to the circumferential position of the rear end portion of short servo sector SS4. For example, the read head 15R is located at circumferential position CP171 at time point T171. The read head 15R is located at circumferential position CP172 at time point T172. The read head 15R is located at circumferential position CP173 at time point T173. The read head 15R is located at circumferential position CP174 at time point T174. FIG. 17 shows change FML1 in the variation margin.

In the example shown in FIG. 17, in the write process of track TRe, the system controller 130 turns on a short servo mode, applies normal servo read to normal servo sector SS2 based on the first normal servo gate NSG1 of servo gate WSG of FIG. 17, and applies short servo read to short servo sector SS4 based on short servo gate SSG of servo gate WSG of FIG. 17.

In the example shown in FIG. 17, in the write process of track TRe, the system controller 130 writes user data to the data sector DSC in a read/write direction until time point T171. The system controller 130 asserts short servo gate SSG of servo gate WSG of FIG. 17 at time point T171, starts the short servo read of the servo data of short servo sector SS4, negates short servo gate SSG of servo gate WSG of FIG. 17 at time point T172, and finishes the short servo read of the servo data of short servo sector SS4.

In the write process of track TRe, the system controller 130 writes user data to the data sector DSC in a read/write direction until time point T173. In track TRe, the system controller 130 asserts the short servo gate SSG of servo gate WSG of FIG. 17 at time point T173, starts the short servo read of the servo data of short servo sector SS4, negates the short servo gate SSG of servo gate WSG of FIG. 17 at time point T174, and finishes the short servo read of the servo data of short servo sector SS4.

Figure 18:
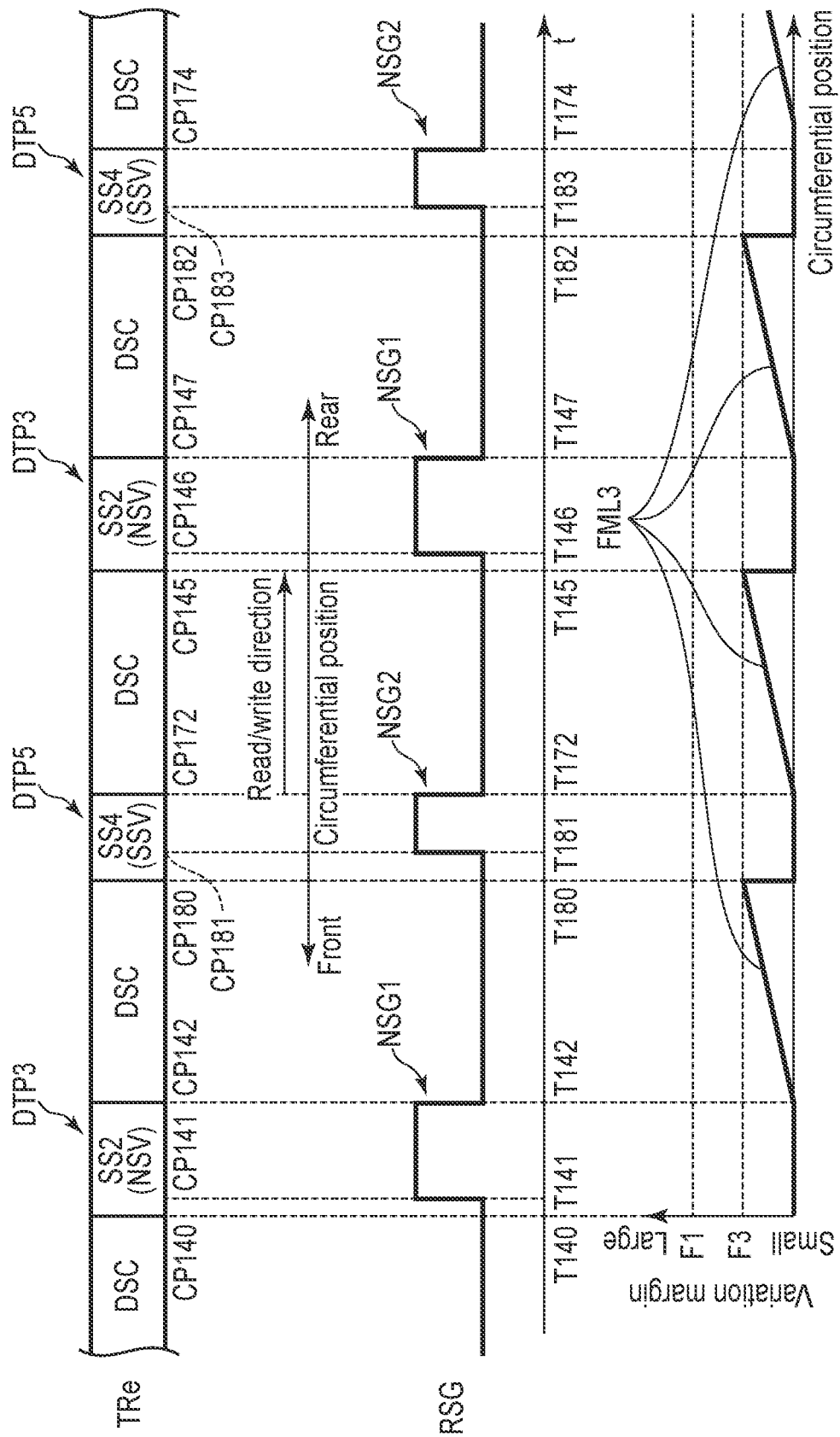
FIG. 18 is a diagram showing an example of a servo read process at the time of a read process according to the first embodiment.

FIG. 18 is a diagram showing an example of a servo read process at the time of a read process according to the present embodiment. FIG. 18 shows a servo gate RSG at the time of a read process. In FIG. 18, servo gate RSG includes a plurality of first normal servo gates NSG1 and a plurality of second normal servo gates NSG2. In servo gate RSG shown in FIG. 18, the first normal servo gates NSG1 and the second normal servo gates NSG2 are alternately generated at intervals between them. In FIG. 18, each first normal servo gate NSG1 corresponds to normal sector SS2, and each second normal servo gate NSG2 corresponds to short servo sector SS4. In FIG. 18, the horizontal axis of servo gate RSG indicates time t. In the horizontal axis of FIG. 18, time points T180, T181, T182 and T183 are further shown. For example, time points T180 to T183 are equivalent to the time points particular times after the reference time points, respectively. Time points T180 to T183 may be equivalent to absolute time points, respectively. Time point T180 is equivalent to a time point after time point T142 and before time point T181. Time point T181 is equivalent to a time point after time point T180 and before time point T172. Time point T182 is equivalent to a time point after time point T147 and before time point T183. Time point T183 is equivalent to a time point after time point T182 and before time point T174. Time point T181 is equivalent to the time point at which a second normal servo gate NSG2 is asserted. Time point T172 is equivalent to the time point at which the second normal servo gate NSG2 is negated. Time point T183 is equivalent to the time point at which a second normal servo gate NSG2 is asserted. Time point T174 is equivalent to the time point at which the second normal servo gate NSG2 is negated.

FIG. 18 further shows circumferential positions CP180, CP181, CP182 and CP183 of track TRe. Circumferential positions CP180 to CP183 are arranged at intervals in a read/write direction in this order. Circumferential position CP180 is equivalent to a circumferential position between circumferential positions CP142 and CP181 and is equivalent to the circumferential position of the distal end portion of short servo sector SS4. Circumferential position CP181 is equivalent to a circumferential position between circumferential positions CP180 and CP172 and is equivalent to a particular circumferential position of short servo sector SS4. Circumferential position CP182 is equivalent to a circumferential position between circumferential positions CP147 and CP183 and is equivalent to the circumferential position of the distal end portion of short servo sector SS4. Circumferential position CP183 is equivalent to a circumferential position between circumferential positions CP182 and CP174 and is equivalent to a particular circumferential position of short servo sector SS4. For example, the read head 15R is located at circumferential position CP180 at time point T180. The read head 15R is located at circumferential position CP181 at time point T181. The read head 15R is located at circumferential position CP182 at time point T182. The read head 15R is located at circumferential position CP183 at time point T183.

FIG. 18 shows change FML3 in the variation margin. In change FML3 in the variation margin shown in FIG. 18, the horizontal axis indicates the circumferential position, and the vertical axis indicates the absolute value of the variation margin. In FIG. 18, the position moves in a read/write direction toward the distal end of the arrow of the horizontal axis. In FIG. 18, the absolute value of the variation margin is increased toward the distal end of the arrow of the vertical axis, and is decreased toward the side opposite to the distal end of the arrow of the vertical axis. In the vertical axis of FIG. 18, absolute value F3 of the variation margin is further shown. Absolute value F3 of the variation margin is less than absolute value F1 of the variation margin.

In the example shown in FIG. 18, in the read process of track TRe, the system controller 130 turns off a short servo mode, applies normal servo read to normal servo sector SS2 based on the first normal servo gate NSG1 of servo gate RSG of FIG. 18, and applies normal servo read to short servo sector SS4 based on the second normal servo gate NSG2 of servo gate RSG of FIG. 18.

In the example shown in FIG. 18, in the read process of track TRe, the system controller 130 reads user data from the data sector DSC in a read/write direction until time point T181. In the read process of track TRe, the system controller 130 asserts the second normal servo gate NSG2 of servo gate RSG of FIG. 18 at time point T181, starts the normal servo read of the servo data of short servo sector SS4, negates the second normal servo gate NSG2 of servo gate RSG of FIG. 18 at time point T172, and finishes the normal servo read of the servo data of short servo sector SS4.

In the read process of track TRe, the system controller 130 reads user data from the data sector DSC in a read/write direction until time point T183. In the read process of track TRe, the system controller 130 asserts the second normal servo gate NSG2 of servo gate RSG of FIG. 18 at time point T183, starts the normal servo read of the servo data of short servo sector SS4, negates the second normal servo gate NSG2 of servo gate RSG of FIG. 18 at time point T174, and finishes the normal servo read of the servo data of short servo sector SS4.

In the example shown in FIG. 18, in change FML3 in the variation margin, the absolute value of the variation margin is 0 at time points T142 and T147 immediately after the normal servo read of normal servo sector SS2 and time points T172 and T174 immediately after the normal servo read of short servo sector SS4, and the absolute value of the variation margin is maximum margin F3 at time point T145 immediately before the normal servo read of normal servo sector SS2 and time points T180 and T182 immediately before the normal servo read of short servo sector SS4.

FIG. 19 is a flowchart showing an example of the generation method of a servo gate according to the present embodiment.

The system controller 130 determines whether or not seeking is finished (B1901). In the other words, the system controller 130 determines whether the head 15 is in an on-track state for a particular track or in a seeking state for a particular track. When the system controller 130 determines that seeking is not finished (NO in B1901), the system controller 130 generates a seek servo gate (B1902), applies servo read to a servo sector based on the seek servo gate and terminates the process. In other words, when the system controller 130 determines that the head 15 is in a seeking state for a particular track, the system controller 130 generates a seek servo gate, applies servo read to a servo sector based on the seek servo gate and terminates the process. When the system controller determines that seeking is finished (YES in B1901), the system controller 130 determines whether or not a read process should be performed (B1903). In other words, when the system controller determines that the head 15 is in an on-track state for a particular track, the system controller 130 determines whether a read process should be performed or a write process should be performed. When the system controller 130 determines that a read process should be performed (YES in B1903), the system controller 130 turns off a short servo mode (B1904). The system controller 130 determines whether or not the servo sector subjected to servo read is a short servo sector (B1905). In other words, the system controller 130 determines whether the servo sector subjected to servo read is a short servo sector or a normal servo sector. When the system controller 130 determines that the servo sector subjected to servo read is a short servo sector (YES in B1905), the system controller 130 generates a second normal servo gate (B1906), applies servo read to the short servo sector based on the second normal servo gate and terminates the process. When the system controller 130 determines that the servo sector subjected to servo read is not a short servo sector (NO in B1905), the system controller 130 generates a first normal servo gate (B1907), applies servo read to the normal servo sector based on the first normal servo gate and terminates the process. In other words, when the system controller 130 determines that the servo sector subjected to servo read is a normal servo sector, the system controller 130 generates a first normal servo gate, applies servo read to the normal servo sector based on the first normal servo gate and terminates the process.

When the system controller 130 determines that a read process should not be performed, in other words, a write process should be performed (NO in B1903), the system controller 130 turns on a short servo mode (B1908). The system controller 130 determines whether or not the servo sector subjected to servo read is a short servo sector (B1909). In other words, the system controller 130 determines whether the servo sector subjected to servo read is a short servo sector or a normal servo sector. When the system controller 130 determines that the servo sector subjected to servo read is not a short servo sector (NO in B1909), the system controller 130 proceeds to the process of B1907. In other words, when the system controller 130 determines that the servo sector subjected to servo read is a normal servo sector, the system controller 130 proceeds to the process of B1907. When the system controller 130 determines that the servo sector subjected to servo read is a short servo sector (YES in B1909), the system controller 130 generates a short servo gate (B1910), applies servo read to the short servo sector based on the short servo gate and terminates the process.

According to the present embodiment, the magnetic disk device 1 switches a short servo mode between on and off in accordance with an access mode. At the time of a write process, the magnetic disk device 1 turns on a short servo mode, applies normal servo read to a normal servo sector based on a first normal servo gate and applies short servo read to a short servo sector based on a short servo gate. At the time of a read process, the magnetic disk device 1 turns off a short servo mode, applies normal servo read to a normal servo sector based on a first normal servo gate and applies normal servo read to a short servo sector based on a second normal servo gate. The magnetic disk device 1 is allowed to write data (user data) to a position immediately before a servo sector SS by turning on a short servo mode at the time of a write process. The magnetic disk device 1 is allowed to read a servo mark by a short servo sector by turning off a short servo mode at the time of a read process and applying normal servo read to the short servo sector. Thus, the magnetic disk device 1 can prevent the shift in a circumferential direction at the time of a read process. The magnetic disk device 1 can make the variation margin at the time of reading smaller than a case where a short servo mode is turned on at the time of reading. The degradation in the performance because of a servo error, etc., can be prevented by improving the format efficiency and the quality of servo demodulation. Thus, the magnetic disk device 1 can improve the reliability.

Now, this specification explains a magnetic disk device according to another embodiment. In the embodiment described below, the same portions as the above first embodiment are denoted by the same reference numbers, detailed descriptions thereof being omitted.

Second Embodiment

The magnetic disk device 1 of a second embodiment is different from the magnetic disk device 1 of the first embodiment in respect that a plurality of servo sectors having different servo frequencies are present in a particular track of a disk 10.

FIG. 20 is a schematic diagram showing an example of the layout of servo regions SV in the disk 10 according to the second embodiment. In FIG. 20, a user data region 10a is divided into an inner circumferential region IR located on the internal side, an outer circumferential region OR located on the external side, and a middle circumferential region MR located between the inner circumferential region IR and the outer circumferential region OR.

The servo regions SV comprise a plurality of zone servo regions ZSV, etc. The servo regions SV may include, for example, a region including a gap, a region including servo data and a data region DTR in addition to zone servo regions ZSV. A plurality of zone servo regions ZSV are discretely arranged in a radial direction. Each zone servo region ZSV extends in a radial direction. One zone servo region ZSV in a particular track may be referred to as a zone servo sector. Zone servo region ZSV may be referred to as a zone servo sector ZSV. Servo data written to a zone servo sector may be referred to as a zone servo sector. Hereinafter, for example, the layout of some servo data items constituting a zone servo sector may be referred to as a zone servo sector pattern. Hereinafter, one servo region SV in a particular track may be referred to as a zone pattern sector. A servo region SV may be referred to as a zone pattern sector. For example, at least one data item written to a zone pattern sector may be referred to as a zone pattern sector. A zone pattern sector includes at least one zone servo sector. Hereinafter, the data pattern of a zone pattern sector may be referred to as a zone data pattern.

Of the zone servo regions ZSV provided from the internal side to the external side in a particular region, the servo frequency of the zone servo region provided on the external side is greater than that of the zone servo region provided on the internal side. The servo frequency of the zone servo sector provided on the external side in a particular zone servo region ZSV is greater than that of the zone servo sector provided on the internal side in the zone servo region ZSV. The linear speed of a head 15 with respect to the disk 10 at a radial position on the external side is faster than that at a radial position on the internal side. Thus, it is possible to improve the format efficiency by making the servo frequency of the servo region on the external side greater than the servo frequency of the servo region on the internal side in the disk 10 as described above.

In the example shown in FIG. 20, the servo regions SV comprise zone servo regions ZSV1, ZSV2 and ZSV3. Zone servo regions ZSV1, ZSV2 and ZSV3 are arranged in a staggered shape in a radial direction. Zone servo region ZSV1 is located on the internal side in comparison with zone servo region ZSV2. Zone servo region ZSV3 is located on the external side in comparison with zone servo region ZSV2. For example, zone servo region ZSV1 is provided from the inner circumferential region IR to the middle circumferential region MR. Zone servo region ZSV2 is provided from the inner circumferential region IR to the outer circumferential region OR. Zone servo region ZSV3 is provided from the middle circumferential region MR to the outer circumferential region OR. Hereinafter, in a particular servo region SV, a particular region in a radial direction in which a plurality of zone servo regions ZSV are provided in a circumferential direction may be referred to as a zone servo boundary ZB. Zone servo regions ZSV1 and zone servo region ZSV2 are provided in track TRk. In other words, zone servo region ZSV1 and zone servo region ZSV2 are provided in zone servo boundary ZB1. Zone servo region ZSV2 and zone servo region ZSV3 may be provided in track TRm. In other words, zone servo region ZSV2 and zone servo region ZSV3 are provided in zone servo boundary ZB2. For example, the servo frequency of zone servo region ZSV2 is greater than that of zone servo region ZSV1. The servo frequency of zone servo region ZSV3 is greater than that of zone servo region ZSV2.

The servo regions SV comprise, for example, servo regions (main servo regions) SVO and servo regions (secondary servo regions) SVE different from servo regions SVO. Hereinafter, one main servo region SVO in a particular track may be referred to as a main zone pattern sector SVO. One secondary servo region SVE in a particular track may be referred to as a secondary zone pattern sector SVE. A main servo region SVO may be referred to as a main zone pattern sector SVO. A secondary servo region SVE may be referred to as a secondary zone pattern sector SVE. The data pattern of a main zone pattern sector (in other words, a main zone data pattern) may be the same as or different from that of a secondary zone pattern sector (in other words, a secondary zone data pattern).

In the example shown in FIG. 20, the main servo regions SVO and the secondary servo regions SEV are alternately provided at intervals in a circumferential direction. For example, in a circumferential direction, one main servo region SVO is provided between two secondary servo regions SVE successively arranged at an interval. In other words, in a circumferential direction, one secondary servo region SVE is provided between two main servo regions SVO successively arranged at an interval. For example, when successive numbers are added to all the servo regions SV of the disk 10 in order, the main servo regions SVO are equivalent to odd-numbered servo regions SV, and the secondary servo regions SVE are equivalent to even-numbered servo regions SV. In a circumferential direction, two or more secondary servo regions SVE may be provided between two main servo regions SVO successively arranged at an interval.

Figure 23:
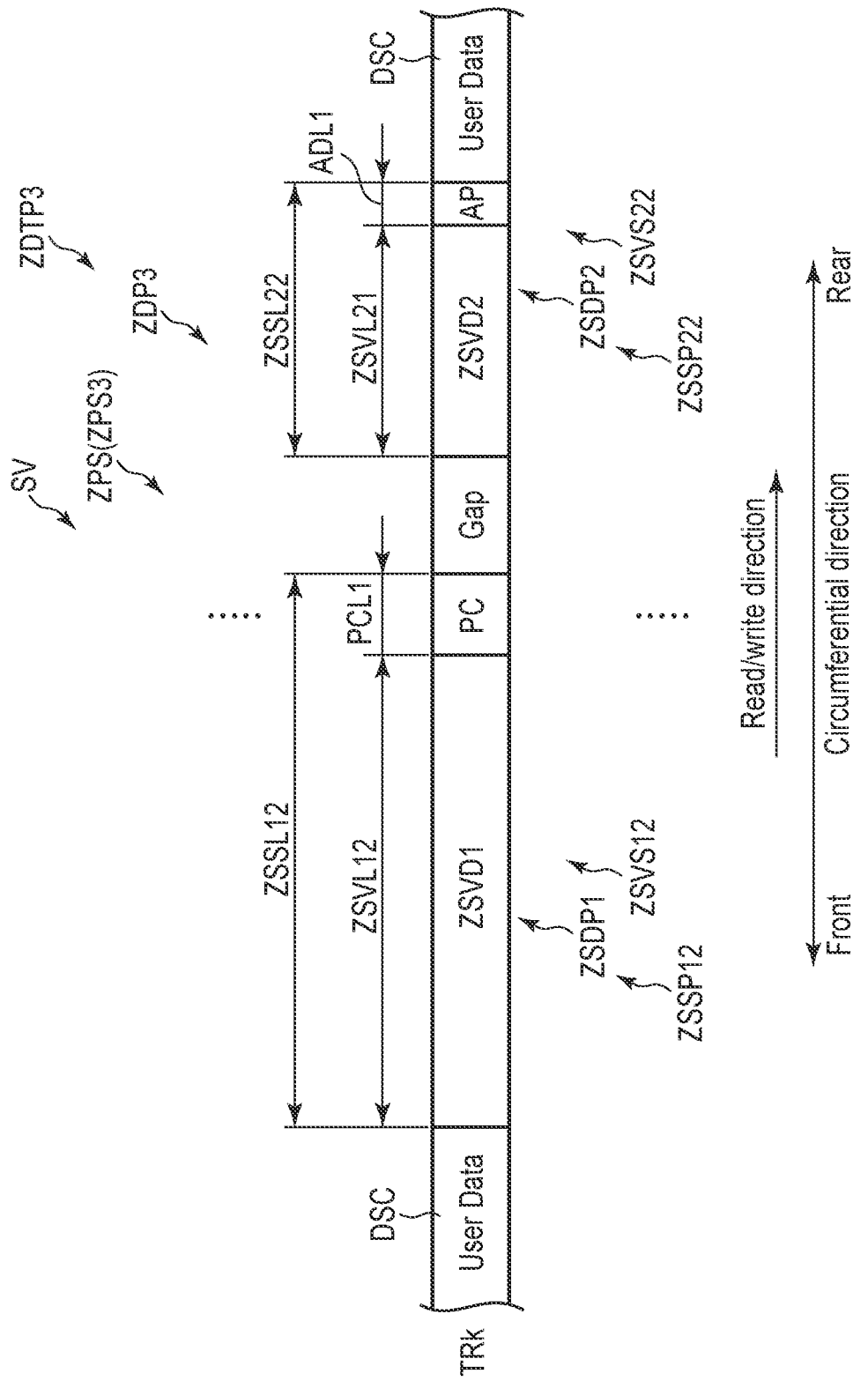
FIG. 23 is a schematic diagram showing an example of the data pattern of the track of the disk.

Now, this specification shows examples of the data pattern of a particular track of the disk 10 with reference to FIG. 21, FIG. 22 and FIG. 23.

FIG. 21 is a schematic diagram showing an example of data pattern ZDTP1 of track TRk of the disk 10.

In the example shown in FIG. 21, track TRk comprises data pattern ZDTP1. Data pattern ZDTP1 includes zone pattern sector ZPS1 and data sectors DSC. In the example shown in FIG. 21, data pattern ZDTP1 comprises zone pattern sector ZPS1 between two data sectors DSC arranged at an interval in a circumferential direction. Zone pattern sector ZPS1 includes zone data pattern ZDP1. Zone data pattern ZDP1 includes at least one data item, for example, zone servo sector ZSVS11, a gap (Gap) and zone servo sector ZSVS21. In zone data pattern ZDP1, zone servo sector ZSVS11, the gap (Gap) and zone servo sector ZSVS21 are arranged in this order in a read/write direction. Hereinafter, in a particular zone data pattern, a particular zone servo sector provided on the front side in a circumferential direction with respect to a particular zone servo sector may be referred to as a front zone servo sector, and a particular zone servo sector provided on the rear side in a circumferential direction with respect to a particular zone servo sector may be referred to as a rear zone servo sector. Front zone servo sector ZSVS11 includes zone servo sector pattern ZSSP11. Zone servo sector pattern ZSSP11 includes at least one servo data item, for example, zone servo data ZSVD1 and an additional pattern (AP). Servo pattern (zone servo data pattern) ZSDP1 of zone servo data ZSVD1 includes, for example, a preamble, a servo mark, a gray code, PAD, N burst and Q burst. In zone servo data pattern ZSDP1, the preamble, servo mark, gray code, PAD, N burst and Q burst are arranged in this order in a read/write direction. In the example shown in FIG. 21, in zone servo sector pattern ZSSP11, the additional pattern (AP) may be written immediately after the Q burst of zone servo data ZSVD1. Rear zone servo sector ZSVS21 includes zone servo sector pattern ZSSP21. Zone servo sector pattern ZSSP21 includes at least one servo data item, for example, zone servo data ZSVD2 and a post code (PC). Zone servo data pattern ZSDP2 of zone servo data ZSVD2 includes, for example, a preamble, a servo mark, a gray code, PAD, N burst and Q burst. In the example shown in FIG. 21, in zone servo data pattern ZSDP2, the preamble, servo mark, gray code, PAD, N burst and Q burst are arranged in this order in a read/write direction. In the example shown in FIG. 21, in zone servo sector pattern ZSSP21, the post code (PC) may be written immediately after the Q burst of zone servo data ZSVD2. For example, length ZSSL11 of front zone servo sector ZSVS11 is greater than length ZSSL2 of rear zone servo sector ZSVS21. For example, length ZSVL11 of zone servo data ZSVD1 is greater than length ZSVL21 of zone servo data ZSVD2.

FIG. 22 is a schematic diagram showing an example of data pattern ZDTP2 of track TRk of the disk 10.

In the example shown in FIG. 22, track TRk comprises data pattern ZDTP2. Data pattern ZDTP2 includes zone pattern sector ZPS2 and data sectors DSC. In the example shown in FIG. 22, data pattern ZDTP2 comprises zone pattern sector ZPS2 between two data sectors DSC arranged at an interval in a circumferential direction. Zone pattern sector ZPS2 includes zone data pattern ZDP2. Zone data pattern ZDP2 includes at least one data item, for example, front zone servo sector ZSVS11, a gap (Gap) and rear zone servo sector ZSVS22. In zone data pattern ZDP2, front zone servo sector ZSVS11, the gap (Gap) and rear zone servo sector ZSVS22 are arranged in this order in a read/write direction. Front zone servo sector ZSVS11 includes zone servo sector pattern ZSSP11. Rear zone servo sector ZSVS22 includes zone servo sector pattern ZSSP22. Zone servo sector pattern ZSSP22 includes at least one servo data item, for example, zone servo data ZSVD2 and an additional pattern (AP). In the example shown in FIG. 22, in zone servo sector pattern ZSSP22, the additional pattern (AP) may be written immediately after the Q burst of zone servo data ZSVD2. For example, length ZSSL22 of rear zone servo sector ZSV22 shown in FIG. 22 is less than length ZSSL21 of zone servo sector ZSVS21 shown in FIG. 21. For example, the difference value between length ZSSL21 and length ZSSL22 is equivalent to the difference value between length PCL1 of the post code and length ADL1 of the additional pattern.

FIG. 23 is a schematic diagram showing an example of data pattern ZDTP3 of track TRk of the disk 10.

In the example shown in FIG. 23, track TRk comprises data pattern ZDTP3. Data pattern ZDTP3 includes zone pattern sector ZPS3 and data sectors DSC. In the example shown in FIG. 23, data pattern ZDTP3 comprises zone pattern sector ZPS3 between two data sectors DSC arranged at an interval in a circumferential direction. Zone pattern sector ZPS3 includes zone data pattern ZDP3. Zone data pattern ZDP3 includes at least one data item, for example, front zone servo sector ZSVS12, a gap (Gap) and rear zone servo sector ZSVS22. In zone data pattern ZDP3, front zone servo sector ZSVS12, the gap (Gap) and rear zone servo sector ZSVS22 are arranged in this order in a read/write direction. Front zone servo sector ZSVS12 includes zone servo sector pattern ZSSP12. Zone servo sector pattern ZSSP12 includes at least one servo data item, for example, zone servo data ZSVD1 and a post code (PC). In the example shown in FIG. 23, in zone servo sector pattern ZSSP12, the post code (PC) may be written immediately after the Q burst of zone servo data ZSVD1. Rear zone servo sector ZSVS22 includes zone servo sector pattern ZSSP22. For example, length ZSSL12 of front zone servo sector ZSV12 shown in FIG. 23 is greater than length ZSSL22 of rear zone servo sector ZSVS22 shown in FIG. 23. For example, length ZSSL12 of front zone servo sector ZSVS12 shown in FIG. 23 is greater than length ZSSL11 of front zone servo sector ZSVS11 shown in FIG. 21 and FIG. 22. Length ZSVL12 of zone servo sector ZSVD1 shown in FIG. 23 is greater than length ZSVL11 of zone servo data ZSVD1 shown in FIG. 21 and FIG. 22.

When the track which is in an on-track state with respect to the head 15 is provided in a zone servo boundary ZB, a system controller 130 determines whether the position of the head 15 should be determined based on the rear zone servo sector of a zone pattern sector or the position of the head 15 should be determined based on the front zone servo sector of the zone pattern sector in the track.

For example, when the system controller 130 determines the position of the head 15 based on a rear zone servo sector in a track provided in a zone servo boundary ZB, the system controller 130 turns off a short servo mode, and determines whether the servo sector subjected to servo read by the head 15 is a main zone pattern sector SVO or a secondary zone pattern sector SVE. When the system controller 130 determines that the servo sector subjected to servo read by the head 15 is a main zone pattern sector SVO, the system controller 130 generates a first normal servo gate, and performs a write process or a read process based on the servo data obtained by the normal servo read of the rear zone servo sector based on the first normal servo gate. When the system controller 130 determines that the servo sector subjected to servo read by the head 15 is a secondary zone pattern sector SVE, the system controller 130 generates a second normal servo gate, and performs a write process or a read process based on the servo data obtained by the normal servo read of the rear zone servo sector based on the second normal servo gate. When the system controller 130 determines the position of the head 15 based on a rear zone servo sector in a track provided in a zone servo boundary ZB, the system controller 130 negates a write gate so as not to overwrite a front zone servo sector with data to apply servo read to the front zone servo sector when seeking from another track is applied with respect to the head 15.

When the system controller 130 determines the position of the head 15 based on a front zone servo sector in a track provided in a zone servo boundary ZB, the system controller 130 switches a short servo mode between on and off in accordance with an access mode.

For example, when the system controller 130 performs a read process based on a front zone servo sector in a track provided in a zone servo boundary ZB, the system controller 130 turns off a short servo mode, and determines whether the servo sector subjected to servo read by the head 15 is a main zone pattern sector SVO or a secondary zone pattern sector SVE. When the system controller 130 determines that the servo sector subjected to servo read by the head 15 is a main zone pattern sector SVO, the system controller 130 generates a first normal servo gate, and performs a read process based on the servo data obtained by the normal servo read of the front zone servo sector based on the first normal servo gate. When the system controller 130 determines that the servo sector subjected to servo read by the head 15 is a secondary zone pattern sector SVE, the system controller 130 generates a second normal servo gate, and performs a read process based on the servo data obtained by the normal servo read of the front zone servo sector based on the second normal servo gate.

For example, when the system controller 130 performs a write process based on a front zone servo sector in a track provided in a zone servo boundary ZB, the system controller 130 turns on a short servo mode, and determines whether the servo sector subjected to servo read by the head 15 is a main zone pattern sector SVO or a secondary zone pattern sector SVE. When the system controller 130 determines that the servo sector subjected to servo read by the head 15 is a main zone pattern sector SV, the system controller 130 generates a first normal servo gate, and performs a write process based on the servo data obtained by the normal servo read of the front zone servo sector based on the first normal servo gate. When the system controller 130 determines that the servo sector subjected to servo read by the head 15 is a secondary zone pattern sector SVE, the system controller 130 generates a short servo gate, and performs a write process based on the servo data obtained by the short servo read of the front zone servo sector based on the short servo gate.

Figure 24:
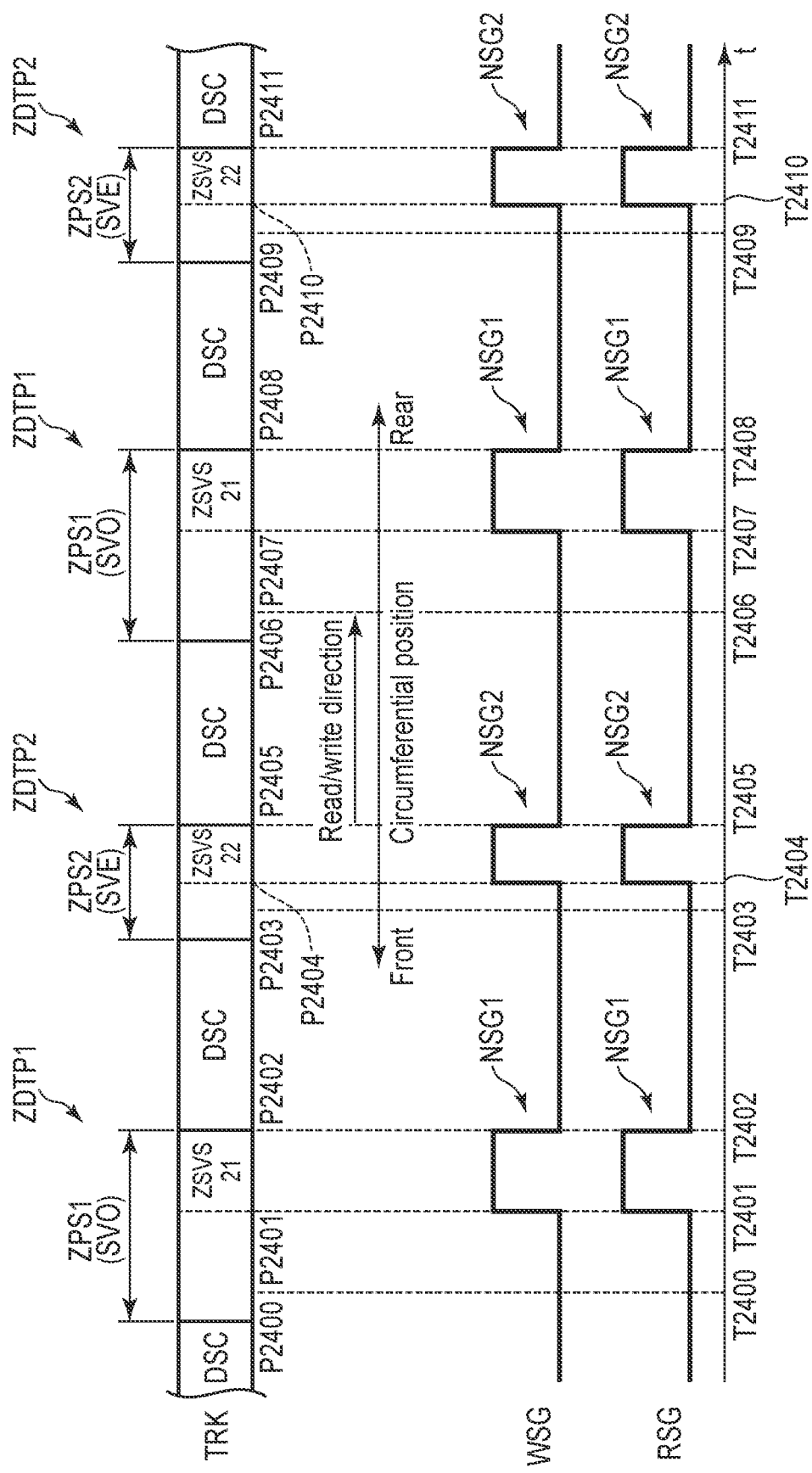
FIG. 24 is a diagram showing an example of a servo read process according to the second embodiment.

FIG. 24 is a diagram showing an example of a servo read process according to the second embodiment. FIG. 24 shows a servo gate WSG at the time of a write process and a servo gate RSG at the time of a read process. Each of servo gates WSG and RSG includes a plurality of first normal servo gates NSG1 and a plurality of second normal servo gates NSG2. In servo gates WSG and RSG shown in FIG. 24, the first normal servo gates NSG1 and the second normal servo gates NSG2 are alternately generated at intervals between them. In FIG. 24, each first normal servo gate NSG1 corresponds to front zone servo sector ZSVS21, and each second normal servo gate NSG2 corresponds to rear zone servo sector ZSVS22. In FIG. 24, the horizontal axes of servo gates WSG and RSG indicate time t. In the horizontal axes of FIG. 24, time points T2400, T2401, T2402, T2403, T2404, T2405, T2406, T2407, T2408, T2409, T2410 and T2411 are shown. For example, time points T2400 to T2411 are equivalent to the time points particular times after the reference time points, respectively. Time points T2400 to T2411 may be equivalent to absolute time points, respectively. Time point T2400 is equivalent to a time point before time point T2401. Time point T2401 is equivalent to a time point after time point T2400. Time point T2402 is equivalent to a time point after time point T2401. Time point T2403 is equivalent to a time point after time point T2402. Time point T2404 is equivalent to a time point after time point T2403. Time point T2405 is equivalent to a time point after time point T2404. Time point T2406 is equivalent to a time point after time point T2405. Time point T2407 is equivalent to a time point after time point T2406. Time point T2408 is equivalent to a time point after time point T2407. Time point T2409 is equivalent to a time point after time point T2408. Time point T2410 is equivalent to a time point after time point T2409. Time point T2411 is equivalent to a time point after time point T2410. Time point T2401 is equivalent to the time point at which a first normal servo gate NSG1 is asserted. Time point T2402 is equivalent to the time point at which the first normal servo gate NSG1 is negated. Time point T2404 is equivalent to the time point at which a second normal servo gate NSG2 is asserted. Time point T2405 is equivalent to the time point at which the second normal servo gate NSG2 is negated. Time point T2407 is equivalent to the time point at which a first normal servo gate NSG1 is asserted. Time point T2408 is equivalent to the time point at which the first normal servo gate NSG1 is negated. Time point T2410 is equivalent to the time point at which a second normal servo gate NSG2 is asserted. Time point T2411 is equivalent to the time point at which the second normal servo gate NSG2 is negated.

FIG. 24 shows track TRk of the disk 10. Track TRk includes a plurality of zone pattern sectors ZPS1, a plurality of zone pattern sectors ZPS2 and a plurality of data sectors DSC. In track TRk shown in FIG. 24, zone pattern sectors ZPS1 and zone pattern sectors ZPS2 are alternately provided across the intervening data sectors DSC. In FIG. 24, each zone pattern sector ZPS1 is equivalent to a main zone pattern sector ZPS1, and each zone pattern sector ZPS2 is equivalent to a secondary zone pattern sector ZPS2. In the example shown in FIG. 24, data patterns ZDTP1 and data patterns ZDTP2 are alternately provided in track TRk. In other words, in track TRk, in a circumferential direction, the main zone pattern sectors ZPS1 and the secondary zone pattern sectors ZPS2 are alternately provided at intervals, and the data sectors DSC are provided between the main zone pattern sectors ZPS1 and the secondary zone pattern sectors ZPS2. For example, when successive numbers are added to all the zone servo sectors of track TRk in order, the main zone pattern sectors ZPS1 are equivalent to odd-numbered zone pattern sectors, and the secondary zone pattern sectors ZPS2 are equivalent to even-numbered zone pattern sectors.

FIG. 24 shows circumferential positions P2400, P2401, P2402, P2403, P2404, P2405, P2406, P2407, P2408, P2409, P2410 and P2411 of track TRk. Circumferential positions P2400 to P2411 are arranged in this order in a read/write direction. Circumferential position P2400 is equivalent to a particular circumferential position of the main zone pattern sector ZPS1 (the circumferential position of the distal end portion of front zone servo sector ZSVS11). Circumferential position P2401 is equivalent to a position between circumferential positions P2400 and P2402 and is equivalent to a particular circumferential position (preamble position) of rear zone servo sector ZSVS21. Circumferential position P2402 is equivalent to a circumferential position between circumferential positions P2401 and P2403 and is equivalent to the circumferential position (post code end position) of the rear end portion of rear zone servo sector ZSVS21. Circumferential position P2403 is equivalent to a circumferential position between circumferential positions P2402 and P2404 and is equivalent to a particular circumferential position of the secondary zone pattern sector ZPS2 (in other words, the circumferential position of the distal end portion of front zone servo sector ZSVS11). Circumferential position P2404 is equivalent to a circumferential position between circumferential positions P2403 and P2405 and is equivalent to a particular circumferential position (preamble position) of rear zone servo sector ZSVS22. Circumferential position P2405 is equivalent to a circumferential position between circumferential positions P2404 and P2406 and is equivalent to the circumferential position (additional pattern end position) of the rear end portion of zone servo sector ZSVS22. Circumferential position P2406 is equivalent to a circumferential position between circumferential positions P2405 and P2407 and is equivalent to a particular circumferential position of the main zone pattern sector ZPS1 (in other words, the circumferential position of the distal end portion of front zone servo sector ZSVS11). Circumferential position P2407 is equivalent to a circumferential position between circumferential positions P2406 and P2408 and is equivalent to a particular circumferential position (preamble position) of rear zone servo sector ZSVS21. Circumferential position P2408 is equivalent to a circumferential position between circumferential positions P2407 and P2409 and is equivalent to the circumferential position (post code end position) of the rear end portion of rear zone servo sector ZSVS21. Circumferential position P2409 is equivalent to a circumferential position between circumferential positions P2408 and P2410 and is equivalent to a particular circumferential position of the secondary zone pattern sector ZPS2 (in other words, the circumferential position of the distal end portion of front zone servo sector ZSVS11). Circumferential position P2410 is equivalent to a circumferential position between circumferential positions P2409 and P2411 and is equivalent to a particular position (preamble position) of rear zone servo sector ZSVS22. Circumferential position P2411 is equivalent to a circumferential position behind circumferential position P2410 and is equivalent to the circumferential position (additional pattern end position) of the rear end portion of rear zone servo sector ZSVS22. For example, the read head 15R is located at circumferential position P2400 at time point T2400. The read head 15R is located at circumferential position P2401 at time point T2401. The read head 15R is located at circumferential position P2402 at time point T2402. The read head 15R is located at circumferential position P2403 at time point T2403. The read head 15R is located at circumferential position P2404 at time point T2404. The read head 15R is located at circumferential position T2405 at time point T2405. The read head 15R is located at circumferential position P2406 at time point T2406. The read head 15R is located at circumferential position P2407 at time point T2407. The read head 15R is located at circumferential position P2408 at time point T2408. The read head 15R is located at circumferential position P2409 at time point T2409. The read head 15R is located at circumferential position P2410 at time point T2410. The read head 15R is located at circumferential position T2411 at time point T2411.

In the example shown in FIG. 24, the system controller 130 determines the position of the head 15 in a particular track based on the servo data of the rear zone servo sector of each zone data pattern in a write process. For example, in the write process of track TRk, the system controller 130 turns off a short servo mode, applies normal servo read to rear zone servo sector ZSVS21 of the main zone pattern sector ZPS1 based on the first normal servo gate NSG1 of servo gate WSG of FIG. 24, and applies normal servo read to rear zone servo sector ZSVS22 of the secondary zone pattern sector ZPS2 based on the second normal servo gate NSG2 of servo gate WSG of FIG. 24.

In the example shown in FIG. 24, in the write process of track TRk, the system controller 130 writes user data to the data sector DSC in a read/write direction until time point T2400. In the write process of track TRk, the system controller 130 asserts the first normal servo gate NSG1 of servo gate WSG of FIG. 24 at time point T2401, starts the normal servo read of the servo data of rear zone servo sector ZSVS21 of the main zone pattern sector ZPS1, negates the first normal servo gate NSG1 of servo gate WSG of FIG. 24 at time point T2402 and ends the normal servo read of the servo data of rear zone servo sector ZSVS21 of the main zone pattern sector ZPS1.

In the write process of track TRk, the system controller 130 writes user data to the data sector DSC in a read/write direction until time point T2403. In the write process of track TRk, the system controller 130 asserts the second normal servo gate NSG2 of servo gate WSG of FIG. 24 at time point T2404, starts the normal servo read of the servo data of rear zone servo sector ZSVS22 of the secondary zone pattern sector ZPS2, negates the second normal servo gate NSG2 of servo gate WSG of FIG. 24 at time point T2405 and ends the normal servo read of the servo data of rear zone servo sector ZSVS22 of the secondary zone pattern sector ZPS2.

In the write process of track TRk, the system controller 130 writes user data to the data sector DSC in a read/write direction until time point T2406. In the write process of track TRk, the system controller 130 asserts the first normal servo gate NSG1 of servo gate WSG of FIG. 24 at time point T2407, starts the normal servo read of the servo data of rear zone servo sector ZSVS21 of the main zone pattern sector ZPS1, negates the first normal servo gate NSG1 of servo gate WSG of FIG. 24 at time point T2408 and ends the normal servo read of the servo data of rear zone servo sector ZSVS21 of the main zone pattern sector ZPS1.

In the write process of track TRk, the system controller 130 writes user data to the data sector DSC in a read/write direction until time point T2409. In the write process of track TRk, the system controller 130 asserts the second normal servo gate NSG2 of servo gate WSG of FIG. 24 at time point T2410, starts the normal servo read of the servo data of rear zone servo sector ZSVS22 of the secondary zone pattern sector ZPS2, negates the second normal servo gate NSG2 of servo gate WSG of FIG. 24 at time point T2411 and ends the normal servo read of the servo data of rear zone servo sector ZSVS22 of the secondary zone pattern sector ZPS2.

In the example shown in FIG. 24, the system controller 130 determines the position of the head 15 in a particular track based on the servo data of the rear zone servo sector of each zone data pattern in a read process. For example, in the read process of track TRk, the system controller 130 turns off a short servo mode, applies normal servo read to rear zone servo sector ZSVS21 of the main zone pattern sector ZPS1 based on the first normal servo gate NSG1 of servo gate RSG of FIG. 24, and applies normal servo read to rear zone servo sector ZSVS22 of the secondary zone pattern sector ZPS2 based on the second normal servo gate NSG2 of servo gate RSG of FIG. 24.

In the example shown in FIG. 24, in the read process of track TRk, the system controller 130 reads data from the data sector DSC in a read/write direction until time point T2400. In the read process of track TRk, the system controller 130 asserts the first normal servo gate NSG1 of servo gate RSG of FIG. 24 at time point T2401, starts the normal servo read of the servo data of rear zone servo sector ZSVS21 of the main zone pattern sector ZPS1, negates the first normal servo gate NSG1 of servo gate RSG of FIG. 24 at time point T2402 and ends the normal servo read of the servo data of rear zone servo sector ZSVS21 of the main zone pattern sector ZPS1.

In the read process of track TRk, the system controller 130 reads data from the data sector DSC in a read/write direction until time point T2403. In the read process of track TRk, the system controller 130 asserts the second normal servo gate NSG2 of servo gate RSG of FIG. 24 at time point T2404, starts the normal servo read of the servo data of rear zone servo sector ZSVS22 of the secondary zone pattern sector ZPS2, negates the second normal servo gate NSG2 of servo gate RSG of FIG. 24 at time point T2405 and ends the normal servo read of the servo data of rear zone servo sector ZSVS22 of the secondary zone pattern sector ZPS2.

In the read process of track TRk, the system controller 130 reads data from the data sector DSC in a read/write direction until time point T2406. In the read process of track TRk, the system controller 130 asserts the first normal servo gate NSG1 of servo gate RSG of FIG. 24 at time point T2407, starts the normal servo read of the servo data of rear zone servo sector ZSVS21 of the main zone pattern sector ZPS1, negates the first normal servo gate NSG1 of servo gate RSG of FIG. 24 at time point T2408 and ends the normal servo read of the servo data of rear zone servo sector ZSVS21 of the main zone pattern sector ZPS1.

In the read process of track TRk, the system controller 130 reads data from the data sector DSC in a read/write direction until time point T2409. In the read process of track TRk, the system controller 130 asserts the second normal servo gate NSG2 of servo gate RSG of FIG. 24 at time point T2410, starts the normal servo read of the servo data of rear zone servo sector ZSVS22 of the secondary zone pattern sector ZPS2, negates the second normal servo gate NSG2 of servo gate RSG of FIG. 24 at time point T2411 and ends the normal servo read of the servo data of rear zone servo sector ZSVS22 of the secondary zone pattern sector ZPS2.

Figure 25:
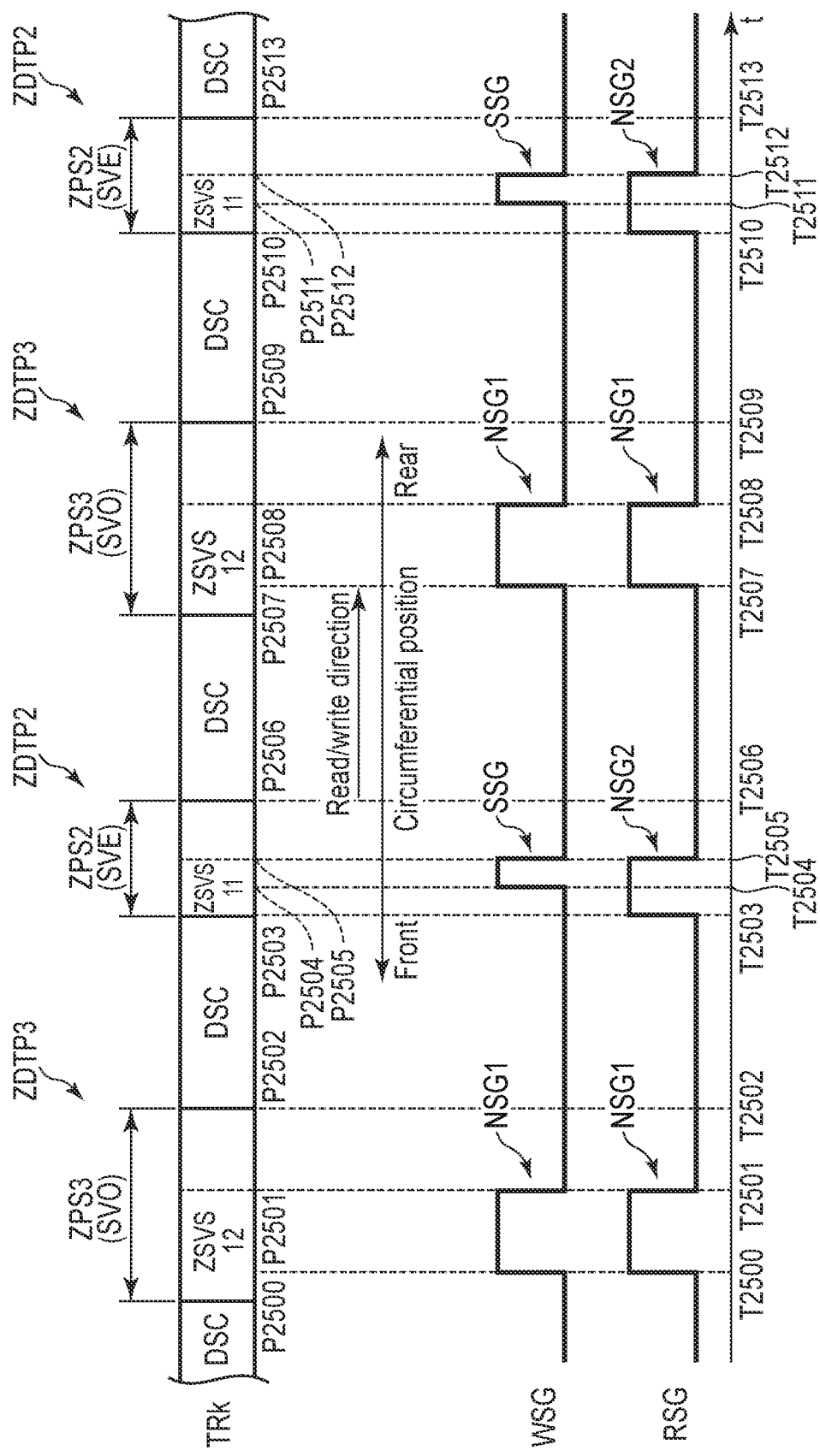
FIG. 25 is a diagram showing an example of a servo read process according to the second embodiment.

FIG. 25 is a diagram showing an example of a servo read process according to the second embodiment. FIG. 25 shows a servo gate WSG at the time of a write process and a servo gate RSG at the time of a read process. In FIG. 25, servo gate WSG includes a plurality of first normal servo gates NSG1 and a plurality of short servo gates SSG. In servo gate WSG shown in FIG. 25, the first normal servo gates NSG1 and the short servo gates SSG are alternately generated at intervals between them. In servo gate WSG shown in FIG. 25, each first normal servo gate NSG1 corresponds to front zone servo sector ZSVS12, and each short servo gate SSG corresponds to front zone servo sector ZSVS11. Servo gate RSG includes a plurality of first normal servo gates NSG1 and a plurality of second normal servo gates NSG2. In servo gate RSG shown in FIG. 25, the first normal servo gates NSG1 and the normal servo gates NSG2 are alternately generated at intervals between them. In servo gate RSG shown in FIG. 25, each first normal servo gate NSG1 corresponds to front zone servo sector ZSVS12, and each second normal servo gate NSG2 corresponds to front zone servo sector ZSVS11. In FIG. 25, the horizontal axes of servo gates WSG and RSG indicate time t. In the horizontal axes of FIG. 25, time points T2500, T2501, T2502, T2503, T2504, T2505, T2506, T2507, T2508, T2509, T2510, T2511, T2512 and T2513 are shown. For example, time points T2500 to T2513 are equivalent to the time points particular times after the reference time points, respectively. Time points T2500 to T2513 may be equivalent to absolute time points, respectively. Time point T2500 is equivalent to a time point before time point T2501. Time point T2501 is equivalent to a time point after time point T2500. Time point T2502 is equivalent to a time point after time point T2501. Time point T2503 is equivalent to a time point after time point T2502. Time point T2504 is equivalent to a time point after time point T2503. Time point T2505 is equivalent to a time point after time point T2504. Time point T2506 is equivalent to a time point after time point T2505. Time point T2507 is equivalent to a time point after time point T2506. Time point T2508 is equivalent to a time point after time point T2507. Time point T2509 is equivalent to a time point after time point T22508. Time point T2510 is equivalent to a time point after time point T2509. Time point T2511 is equivalent to a time point after time point T2510. Time point T2512 is equivalent to a time point after time point T2511. Time point T2513 is equivalent to a time point after time point T2512. Time point T2500 is equivalent to the time point at which a first normal servo gate NSG1 is asserted. Time point T2501 is equivalent to the time point at which the first normal servo gate NSG1 is negated. Time point T2503 is equivalent to the time point at which a second normal servo gate NSG2 is asserted. Time point T2504 is equivalent to the time point at which a short servo gate SSG is asserted. Time point T2505 is equivalent to the time point at which the second normal servo gate NSG2 and the short servo gate SSG are negated. Time point T2507 is equivalent to the time point at which a first normal servo gate NSG1 is asserted. Time point T2508 is equivalent to the time point at which the first normal servo gate NSG1 is negated. Time point T2510 is equivalent to the time point at which a second normal servo gate NSG2 is asserted. Time point T2511 is equivalent to the time point at which a short servo gate SSG is asserted. Time point T2512 is equivalent to the time point at which the second normal servo gate NSG2 and the short servo gate SSG are negated.

FIG. 25 shows track TRk of the disk 10. Track TRk includes a plurality of zone pattern sectors ZPS3, a plurality of zone pattern sectors ZPS2 and a plurality of data sectors DSC. In track TRk shown in FIG. 25, zone pattern sectors ZPS3 and zone pattern sectors ZPS2 are alternately provided across the intervening data sectors DSC. In FIG. 25, each zone pattern sector ZPS3 is equivalent to a main zone pattern sector ZPS3, and each zone pattern sector ZPS2 is equivalent to a secondary zone pattern sector ZPS2. In the example shown in FIG. 25, data patterns ZDTP3 and data patterns ZDTP2 are alternately provided in track TRk. In other words, in track TRk, in a circumferential direction, the main zone pattern sectors ZPS3 and the secondary zone pattern sectors ZPS2 are alternately provided at intervals, and the data sectors DSC are provided between the main zone pattern sectors ZPS3 and the secondary zone pattern sectors ZPS2. For example, when successive numbers are added to all the zone pattern sectors of track TRk in order, the main zone pattern sectors ZPS3 are equivalent to odd-numbered zone pattern sectors, and the secondary zone pattern sectors ZPS2 are equivalent to even-numbered zone pattern sectors.

FIG. 25 shows circumferential positions P2500, P2501, P2502, P2503, P2504, P2505, P2506, P2507, P2508, P2509, P2510, P2511, P2512 and P2513 of track TRk. Circumferential positions P2500 to P2513 are arranged in a read/write direction in this order. Circumferential position P2500 is equivalent to a circumferential position before circumferential position P2501 and is equivalent to a particular circumferential position (preamble position) of front zone servo sector ZSVS12 of the main zone pattern sector ZPS3. Circumferential position P2501 is equivalent to a position between circumferential positions P2500 and P2502 and is equivalent to the circumferential position (post code end position) of the rear end portion of front zone servo sector ZSVS12 of the main zone pattern sector ZPS3. Circumferential position P2502 is equivalent to a circumferential position between circumferential positions P2501 and P2503 and is equivalent to a particular circumferential position of the data sector DSC (in other words, behind the rear end portion of rear zone servo sector ZSVS22). Circumferential position P2503 is equivalent to a circumferential position between circumferential positions P2502 and P2504 and is equivalent to a particular circumferential position (preamble position) of front zone servo sector ZSVS11 of the secondary zone pattern sector ZPS2. Circumferential position P2504 is equivalent to a circumferential position between circumferential positions P2503 and P2505 and is equivalent to a particular circumferential position of front zone servo sector ZSVS11 of the secondary zone pattern sector ZPS2. Circumferential position P2505 is equivalent to a circumferential position between circumferential positions P2504 and P2506 and is equivalent to the circumferential position (additional pattern end position) of the rear end portion of front zone servo sector ZSVS11 of the secondary zone pattern sector ZPS2. Circumferential position P2506 is equivalent to a circumferential position between circumferential positions P2505 and P2507 and is equivalent to a particular circumferential position of the data sector DSC (in other words, behind the rear end portion of rear zone servo sector ZSVS22).

Circumferential position P2507 is equivalent to a circumferential position between circumferential positions P2506 and P2508 and is equivalent to a particular circumferential position (preamble position) of front zone servo sector ZSVS12 of the main zone pattern sector ZPS3. Circumferential position P2508 is equivalent to a position between circumferential positions P2507 and P2509 and is equivalent to the circumferential position (post code end position) of the rear end portion of front zone servo sector ZSVS12 of the main zone pattern sector ZPS3. Circumferential position P2509 is equivalent to a circumferential position between circumferential positions P2508 and P2510 and is equivalent to a particular circumferential position of the data sector DSC (in other words, behind the rear end portion of rear zone servo sector ZSVS22). Circumferential position P2510 is equivalent to a circumferential position between circumferential positions P2509 and P2511 and is equivalent to a particular circumferential position (preamble position) of front zone servo sector ZSVS11 of the secondary zone pattern sector ZPS2. Circumferential position P2511 is equivalent to a circumferential position between circumferential positions P2510 and P2512 and is equivalent to a particular circumferential position of front zone servo sector ZSVS11 of the secondary zone pattern sector ZPS2. Circumferential position P2512 is equivalent to a circumferential position between circumferential positions P2511 and P2513 and is equivalent to the circumferential position (additional pattern end position) of the rear end portion of front zone servo sector ZSVS11 of the secondary zone pattern sector ZPS2. Circumferential position P2513 is equivalent to a circumferential position behind circumferential position P2512 and is equivalent to a particular circumferential position of the data sector DSC (in other words, behind the rear end portion of rear zone servo sector ZSVS22).

For example, the read head 15R is located at circumferential position P2500 at time point T2500. The read head 15R is located at circumferential position P2501 at time point T2501. The read head 15R is located at circumferential position P2502 at time point T2502. The read head 15R is located at circumferential position P2503 at time point T2503. The read head 15R is located at circumferential position P2504 at time point T2504. The read head 15R is located at circumferential position P2505 at time point T2505. The read head 15R is located at circumferential position P2506 at time point T2506. The read head 15R is located at circumferential position P2507 at time point T2507. The read head 15R is located at circumferential position P2508 at time point T2508. The read head 15R is located at circumferential position P2509 at time point T2509. The read head 15R is located at circumferential position P2510 at time point T2510. The read head 15R is located at circumferential position P2511 at time point T2511. The read head 15R is located at circumferential position P2512 at time point T2512. The read head 15R is located at circumferential position T2513 at time point T2513.

In the example shown in FIG. 25, the system controller 130 determines the position of the head 15 in a particular track based on the servo data of the front zone servo sector of each zone data pattern in a write process. For example, in the write process of track TRk, the system controller 130 turns on a short servo mode, applies normal servo read to front zone servo sector ZSVS12 of the main zone pattern sector ZPS3 based on the first normal servo gate NSG1 of servo gate WSG of FIG. 25, and applies normal servo read to front zone servo sector ZSVS11 of the secondary zone pattern sector ZPS2 based on the short servo gate SSG of servo gate WSG of FIG. 25.

In the example shown in FIG. 25, in the write process of track TRk, the system controller 130 writes user data to the data sector DSC in a read/write direction until time point T2500. In the write process of track TRk, the system controller 130 asserts the first normal servo gate NSG1 of servo gate WSG of FIG. 25 at time point T2500, starts the normal servo read of the servo data of front zone servo sector ZSVS12 of the main zone pattern sector ZPS3, negates the first normal servo gate NSG1 of servo gate WSG of FIG. 25 at time point T2501 and ends the normal servo read of the servo data of front zone servo sector ZSVS12 of the main zone pattern sector ZPS3.

In the write process of track TRk, the system controller 130 writes user data to the data sector DSC in a read/write direction from time point T2502 to time point T2504. In the write process of track TRk, the system controller 130 asserts the short servo gate SSG of servo gate WSG of FIG. 25 at time point T2504, starts the normal servo read of the servo data of front zone servo sector ZSVS11 of the secondary zone pattern sector ZPS2, negates the short servo gate SSG of servo gate WSG of FIG. 25 at time point T2505 and ends the normal servo read of the servo data of front zone servo sector ZSVS11 of the secondary zone pattern sector ZPS2.

In the write process of track TRk, the system controller 130 writes user data to the data sector DSC in a read/write direction from time point T2506 to time point T2507. In the write process of track TRk, the system controller 130 asserts the first normal servo gate NSG1 of servo gate WSG of FIG. 25 at time point T2507, starts the normal servo read of the servo data of front zone servo sector ZSVS12 of the main zone pattern sector ZPS3, negates the first normal servo gate NSG1 of servo gate WSG of FIG. 25 at time point T2508 and ends the normal servo read of the servo data of front zone servo sector ZSVS12 of the main zone pattern sector ZPS3.

In the write process of track TRk, the system controller 130 writes user data to the data sector DSC in a read/write direction from time point T2509 to time point T2511. In the write process of track TRk, the system controller 130 asserts the short servo gate SSG of servo gate WSG of FIG. 25 at time point T2511, starts the normal servo read of the servo data of front zone servo sector ZSVS11 of the secondary zone pattern sector ZPS2, negates the short servo gate SSG of servo gate WSG of FIG. 25 at time point T2512 and ends the normal servo read of the servo data of front zone servo sector ZSVS11 of the secondary zone pattern sector ZPS2.

In the example shown in FIG. 25, the system controller 130 determines the position of the head 15 in a particular track based on the servo data of the front zone servo sector of each zone data pattern in a read process. For example, in the read process of track TRk, the system controller 130 turns off a short servo mode, applies normal servo read to front zone servo sector ZSVS12 of the main zone pattern sector ZPS3 based on the first normal servo gate NSG1 of servo gate RSG of FIG. 25, and applies normal servo read to front zone servo sector ZSVS11 of the secondary zone pattern sector ZPS2 based on the second normal servo gate NSG2 of servo gate RSG of FIG. 25.

In the example shown in FIG. 25, in the read process of track TRk, the system controller 130 reads data from the data sector DSC in a read/write direction until time point T2500. In the read process of track TRk, the system controller 130 asserts the first normal servo gate NSG1 of servo gate RSG of FIG. 25 at time point T2500, starts the normal servo read of the servo data of front zone servo sector ZSVS12 of the main zone pattern sector ZPS3, negates the first normal servo gate NSG1 of servo gate RSG of FIG. 25 at time point T2501 and ends the normal servo read of the servo data of front zone servo sector ZSVS12 of the main zone pattern sector ZPS3.

In the read process of track TRk, the system controller 130 reads user data from the data sector DSC in a read/write direction from time point T2502 to time point T2503. In the read process of track TRk, the system controller 130 asserts the second normal servo gate NSG2 of servo gate RSG of FIG. 25 at time point T2503, starts the normal servo read of the servo data of front zone servo sector ZSVS11 of the secondary zone pattern sector ZPS2, negates the second normal servo gate NSG2 of servo gate RSG of FIG. 25 at time point T2505 and ends the normal servo read of the servo data of front zone servo sector ZSVS11 of the secondary zone pattern sector ZPS2.

In the read process of track TRk, the system controller 130 reads user data from the data sector DSC in a read/write direction from time point T2506 to time point T2507. In the read process of track TRk, the system controller 130 asserts the first normal servo gate NSG1 of servo gate RSG of FIG. 25 at time point T2507, starts the normal servo read of the servo data of front zone servo sector ZSVS12 of the main zone pattern sector ZPS3, negates the first normal servo gate NSG1 of servo gate RSG of FIG. 25 at time point T2508 and ends the normal servo read of the servo data of front zone servo sector ZSVS12 of the main zone pattern sector ZPS3.

In the read process of track TRk, the system controller 130 reads user data from the data sector DSC in a read/write direction from time point T2509 to time point T2510. In the read process of track TRk, the system controller 130 asserts the second normal servo gate NSG2 of servo gate RSG of FIG. 25 at time point T2510, starts the normal servo read of the servo data of front zone servo sector ZSVS11 of the secondary zone pattern sector ZPS2, negates the second normal servo gate NSG2 of servo gate RSG of FIG. 25 at time point T2512 and ends the normal servo read of the servo data of front zone servo sector ZSVS11 of the secondary zone pattern sector ZPS2.

Figure 26:
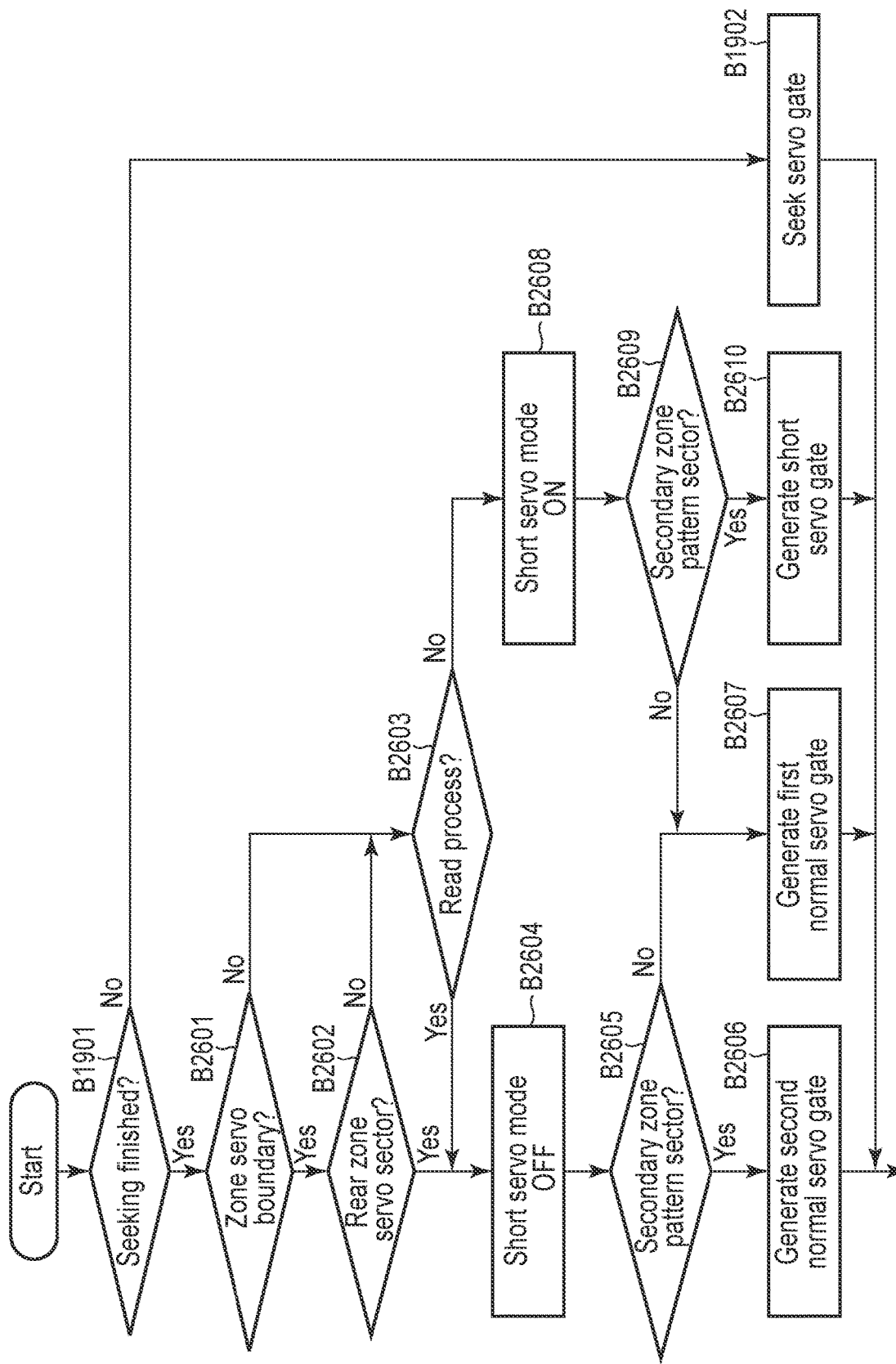
FIG. 26 is a flowchart showing an example of the generation method of a servo gate according to the second embodiment.

FIG. 26 is a flowchart showing an example of the generation method of a servo gate according to the second embodiment.

The system controller 130 determines whether or not seeking is finished (B1901). When the system controller 130 determines that seeking is not finished (NO in B1901), the system controller 130 generates a seek servo gate (B1902), performs servo read based on the seek servo gate and terminates the process. When the system controller 130 determines that seeking is finished (YES in B1901), the system controller 130 determines whether or not the track which is in an on-track state with respect to the head 15 is provided in a zone servo boundary ZB (B2601). When the system controller 130 determines that the track which is in an on-track state with respect to the head 15 is not provided in a zone servo boundary ZB (NO in B2601), the system controller 130 proceeds to the process of B2603. When the system controller 130 determines that the track which is in an on-track state with respect to the head 15 is provided in a zone servo boundary ZB (YES in B2601), the system controller 130 determines whether or not the rear zone servo sector of a particular zone pattern sector ZPS should be used to determine the position of the head 15 in the track which is in an on-track state with respect to the head 15 (B2602). In other words, when the system controller 130 determines that the track which is in an on-track state with respect to the head 15 is provided in a zone servo boundary ZB, the system controller 130 determines whether the rear zone servo sector or the front zone servo sector of a particular zone pattern sector should be used to determine the position of the head 15 in the track which is in an on-track state with respect to the head 15.

When the system controller 130 determines that the rear zone servo sector of a particular zone pattern sector should be used to determine the position of the head 15 in the track which is in an on-state with respect to the head 15 (YES in B2602), the system controller 130 proceeds to the process of B2604. When the system controller 130 determines that the rear zone servo sector of a particular zone pattern sector should not be used to determine the position of the head 15 in the track which is in an on-state with respect to the head 15 (NO in B2602), the system controller 130 determines whether or not a read process should be performed (B2603). In other words, when the system controller 130 determines that the front zone servo sector of a particular zone pattern sector should be used to determine the position of the head 15 in the track which is in an on-state with respect to the head 15, the system controller 130 determines whether a read process or a write process should be performed.

When the system controller 130 determines that a read process should be performed (YES in B2603), the system controller 130 turns off a short servo mode (B2604). The system controller 130 determines whether or not the servo sector subjected to servo read by the head 15 is a secondary zone pattern sector SVE (B2605). In other words, the system controller 130 determines whether the servo sector subjected to servo read by the head 15 is a secondary zone pattern sector SVE or a main zone pattern sector SVO. When the system controller 130 determines that the servo sector subjected to servo read by the head 15 is a secondary zone pattern sector SVE (YES in B2605), the system controller 130 generates a second normal servo gate (B2606), applies servo read to the front zone servo sector or the rear zone servo sector of the secondary zone pattern sector SVE based on the second normal servo gate and terminates the process. When the system controller 130 determines that the servo sector subjected to servo read by the head 15 is not a secondary zone pattern sector SVE (NO in B2605), the system controller 130 generates a first normal servo gate (B2607), applies servo read to the front zone servo sector or the rear zone servo sector of the main zone pattern sector SVO based on the first normal servo gate and terminates the process. In other words, when the system controller 130 determines that the servo sector subjected to servo read by the head 15 is a main zone pattern sector SVO, the system controller 130 generates a first normal servo gate, applies servo read to the front zone servo sector or the rear zone servo sector of the main zone pattern sector SVO based on the first normal servo gate and terminates the process.

When the system controller 130 determines that a read process should be performed (NO in B2603), the system controller 130 turns on a short servo mode (B2608). The system controller 130 determines whether or not the servo sector subjected to servo read by the head 15 is a secondary zone pattern sector SVE (B2609). In other words, the system controller 130 determines whether the servo sector subjected to servo read by the head 15 is a secondary zone pattern sector SVE or a main zone pattern sector SVO. When the system controller 130 determines that the servo sector subjected to servo read by the head 15 is a secondary zone pattern sector SVE (YES in B2609), the system controller 130 generates a short servo gate (B2610), applies servo read to the front zone servo sector of the main zone pattern sector SVE based on the short servo gate and terminates the process. When the system controller 130 determines that the servo sector subjected to servo read by the head 15 is not a secondary zone pattern sector SVE (NO in B2609), the system controller 130 proceeds to the process of B2607 and terminates the process. In other words, when the system controller 130 determines that the servo sector subjected to servo read by the head 15 is a main zone pattern sector SVO, the system controller 130 proceeds to the process of B2607 and terminates the process.

According to the second embodiment, the magnetic disk device 1 determines whether or not the track which is in an on-track state with respect to the head 15 is provided in a zone servo boundary ZB. When the magnetic disk device 1 determines that the track which is in an on-track state with respect to the head 15 is provided in a zone servo boundary ZB, the magnetic disk device 1 determines whether the front zone servo sector or the rear zone servo sector of a particular zone pattern sector ZPS should be used to determine the position of the head 15 in the track which is in an on-track state with respect to the head 15. When the magnetic disk device 1 determines that the rear zone servo sector of a particular zone pattern sector ZPS should be used to determine the position of the head 15 in the track which is in an on-track state with respect to the head 15, the magnetic disk device 1 turns off a short servo mode and determines whether the servo sector subjected to servo read by the head 15 is a main zone pattern sector or a secondary pattern sector. When the magnetic disk device 1 determines that the servo sector subjected to servo read by the head 15 is a main zone pattern sector, the magnetic disk device 1 generates a first normal servo gate and applies normal servo read to the rear zone servo sector of the main zone pattern sector based on the first normal servo gate. When the magnetic disk device 1 determines that the servo sector subjected to servo read by the head 15 is a secondary zone pattern sector, the magnetic disk device 1 generates a second normal servo gate and applies normal servo read to the rear zone servo sector of the secondary zone pattern sector based on the second normal servo gate.

When the magnetic disk device 1 determines that the front zone servo sector of a particular zone pattern sector ZPS should be used to determine the position of the head 15 in the track which is in an on-track state with respect to the head 15, the magnetic disk device 1 determines whether the process is a read process or a write process. When the magnetic disk device 1 determines that the process is a read process, the magnetic disk device 1 turns off a short servo mode and determines whether the servo sector subjected to servo read by the head 15 is a main zone pattern sector or a secondary zone pattern sector. When the magnetic disk device 1 determines that the servo sector subjected to servo read by the head 15 is a main zone pattern sector, the magnetic disk device 1 generates a first normal servo gate and applies normal servo read to the front zone servo sector of the main zone pattern sector based on the first normal servo gate. When the magnetic disk device 1 determines that the servo sector subjected to servo read by the head 15 is a secondary zone pattern sector, the magnetic disk device 1 generates a second normal servo gate and applies normal servo read to the front zone servo sector of the secondary zone pattern sector based on the second normal servo gate.

When the magnetic disk device 1 determines that the process is a write process, the magnetic disk device 1 turns on a short servo mode and determines whether the servo sector subjected to servo read by the head 15 is a main zone pattern sector or a secondary zone pattern sector. When the magnetic disk device 1 determines that the servo sector subjected to servo read by the head 15 is a main zone pattern sector, the magnetic disk device 1 generates a first normal servo gate and applies normal servo read to the front zone servo sector of the main zone pattern sector based on the first normal servo gate. When the magnetic disk device 1 determines that the servo sector subjected to servo read by the head 15 is a secondary zone pattern sector, the magnetic disk device 1 generates a short servo gate and applies short servo read to the front zone servo sector of the secondary zone pattern sector based on the short servo gate. The magnetic disk device 1 can make the variation margin in a zone servo boundary and at the time of reading smaller than a case where a short servo mode is turned on in a zone servo boundary and at the time of reading. Therefore, the magnetic disk device 1 can prevent the degradation in the performance because of a servo error, etc., by improving the format efficiency and the quality of servo demodulation. Thus, the magnetic disk device 1 can improve the reliability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A magnetic disk device comprising:
a disk comprising a first track comprising a first servo sector and a second servo sector which is positioned after the first servo sector and is different from the first servo sector;
a head comprising a write head which writes data to the disk, and a read head which reads data from the disk; and
a controller which generates a first normal servo gate for applying servo read to the first servo sector in its entirety and generates a short servo gate for applying servo read to a part of the second servo sector based on servo data obtained by the servo read from the first servo sector, and when the controller does not generate the short servo gate, the controller generates a second normal servo gate different from the first normal servo gate for applying servo read to the second servo sector in its entirety.

2. The magnetic disk device of claim 1, wherein the controller determines whether a short servo read process for at least applying servo read to the second servo sector based on the short servo gate should be performed in accordance with whether a write process which writes data to the disk or a read process which reads data from the disk should be applied.

3. The magnetic disk device of claim 2, wherein the controller does not perform the short servo read process when the read process is applied.

4. The magnetic disk device of claim 3, wherein the controller applies a first normal servo read process to the first servo sector based on the first normal servo gate, and applies a second normal servo read process to the second servo sector based on the second normal servo gate.

5. The magnetic disk device of claim 4, wherein the first servo sector comprises a preamble, the burst data and a post code for correcting an error with respect to a concentric circle of the disk.

6. The magnetic disk device of claim 5, wherein the second servo sector comprises a preamble, the burst data and an additional pattern for determining whether a time point for reading the burst data is shifted.

7. The magnetic disk device of claim 6, wherein the controller applies servo read to the preamble, the burst data and the post code of the first servo sector in the first normal servo read process, and applies servo read to the preamble, the burst data and the additional pattern of the second servo sector in the second normal servo read process.

8. The magnetic disk device of claim 2, wherein the controller performs the short servo read process when the write process is applied.

9. The magnetic disk device of claim 8, wherein the controller applies a first normal servo read process to the first servo sector based on the first normal servo gate, and applies the short servo read process to the second servo sector.

10. The magnetic disk device of claim 9, wherein the first servo sector comprises a preamble, the burst data and a post code for correcting an error with respect to a concentric circle of the disk.

11. The magnetic disk device of claim 10, wherein the second servo sector comprises a preamble, the burst data and an additional pattern for determining whether a time point for reading the burst data is shifted.

12. The magnetic disk device of claim 11, wherein the controller applies servo read to the preamble, the burst data and the post code of the first servo sector in the first normal servo read process, and applies servo read to the burst data and the additional pattern of the second servo sector in the short servo read process.

13. The magnetic disk device of claim 1, wherein the second servo sector has a servo frequency different from the first servo sector and arranged side by side at an interval in a direction opposite to a rotational direction with respect to the first servo sector, and the controller does not generate the short servo gate when a position of the head is determined based on the second servo sector.

14. A magnetic disk device comprising:
a disk a first track comprising a first servo sector and a second servo sector which is positioned after the first servo sector and is different from the first servo sector;
a head comprising a write head which writes data to the disk, and a read head which reads data from the disk, and
a controller which generates a first normal servo gate having a first length of time of assertion and negation for applying servo read to the first servo sector in its entirety, generates a short servo gate having a second length of time of assertion and negation for applying servo read to a part of the second servo sector, and generates a second normal servo gate having a third length of time of assertion and negation for applying servo read to the second servo sector in its entirety, wherein
the second length is less than the first length and the third length, and
the third length is different from the first length and is greater than the second length.

15. A servo gate generation method applied to a magnetic disk device comprising: a disk comprising a first track comprising a first servo sector and a second servo sector which is positioned after the first servo sector and is different from the first servo sector; and a head comprising a write head which writes data to the disk, and a read head which reads data from the disk,
the method comprising:
generating a first normal servo gate for applying servo read to the first servo sector in its entirety;
generating a short servo gate for applying servo read to a part of the second servo sector based on servo data obtained by the servo read from the first servo sector; and
when not generating the short servo gate, generating a second normal servo gate different from the first normal servo gate for applying servo read to the second servo sector in its entirety.

16. The servo gate generation method of claim 15, further comprising:
determining whether a short servo read process for at least applying servo read to the second servo sector based on the short servo gate should be performed in accordance with whether a write process which writes data to the disk or a read process which reads data from the disk should be applied.

17. The servo gate generation method of claim 16, further comprising:
not performing the short servo read process when the read process is applied.

18. The servo gate generation method of claim 17, wherein
applying a first normal servo read process to the first servo sector based on the first normal servo gate, and
applying a second normal servo read process to the second servo sector based on the second normal servo gate.

19. The servo gate generation method of claim 16, further comprising:
performing the short servo read process when the write process is applied.

20. The servo gate generation method of claim 19, wherein applying a first normal servo read process to the first servo sector based on the first normal servo gate, and
applying the short servo read process to the second servo sector.

* * * * *